(12) United States Patent
Abe et al.

(10) Patent No.: US 7,856,143 B2
(45) Date of Patent: Dec. 21, 2010

(54) UNAUTHORIZED COPY PREVENTING DEVICE AND METHOD THEREOF, AND PROGRAM

(75) Inventors: Hiroshi Abe, Shinagawa-ku (JP); Jun Hirai, Shinagawa-ku (JP)

(73) Assignee: Sony Corporation, Tokyo (JP)

( * ) Notice: Subject to any disclaimer, the term of this patent is extended or adjusted under 35 U.S.C. 154(b) by 1191 days.

(21) Appl. No.: 10/586,359

(22) PCT Filed: Jan. 21, 2005

(86) PCT No.: PCT/JP2005/001176

§ 371 (c)(1),
(2), (4) Date: Jul. 17, 2006

(87) PCT Pub. No.: WO2005/071939

PCT Pub. Date: Aug. 4, 2005

(65) Prior Publication Data

US 2007/0160401 A1    Jul. 12, 2007

(30) Foreign Application Priority Data

| Jan. 22, 2004 | (JP) | ............................. 2004-014494 |
| Feb. 18, 2004 | (JP) | ............................. 2004-041992 |
| Feb. 27, 2004 | (JP) | ............................. 2004-055498 |
| Mar. 10, 2004 | (JP) | ............................. 2004-067856 |

(51) Int. Cl.
G06K 9/34 (2006.01)
G06K 9/40 (2006.01)
B41M 5/20 (2006.01)
B32B 5/16 (2006.01)

(52) U.S. Cl. ...................... 382/181; 382/164; 382/263; 382/264; 503/202; 428/207

(58) Field of Classification Search .................. 382/181, 382/190, 192, 199, 203, 254, 162, 164, 173; 503/201, 226, 202, 211; 101/467, 458, 453, 101/465, 470; 355/22, 46; 219/121.7; 347/8, 347/102, 43, 171, 19; 428/329, 914, 172, 428/916, 207, 208, 913, 317.9, 320.2, 164, 428/165

See application file for complete search history.

(56) References Cited

U.S. PATENT DOCUMENTS 5,974,150 A * 10/1999 Kaish et al. .................. 713/179
6,650,761 B1 * 11/2003 Rodriguez et al. .......... 382/100

(Continued)

FOREIGN PATENT DOCUMENTS

EP    1 333 658 A2    8/2003

(Continued)

*Primary Examiner*—Sheela C Chawan
(74) *Attorney, Agent, or Firm*—Oblon, Spivak, McClelland, Maier & Neustadt, L.L.P.

(57) ABSTRACT

The pattern (pattern characteristic quantity) extracted from the pattern image carried by original printing paper is stored on the original printing paper and the validity of the original printing paper is verified according to the pattern stored on code-added printing paper at the time of copying the printed contents of the code-added printing paper so as to determine if the code-added printing paper is truly original or not by means of the pattern carried by the printing paper itself. Therefore, it is possible to prevent unauthorized copying with ease without using any special paper and hence appropriately protect the printed contents.

26 Claims, 44 Drawing Sheets

U.S. PATENT DOCUMENTS

| | | | |
|---|---|---|---|
| 7,054,461 B2 * | 5/2006 | Zeller et al. | 382/100 |
| 7,106,902 B2 * | 9/2006 | Nakazawa et al. | 382/182 |
| 7,143,948 B2 * | 12/2006 | Nakazawa et al. | 235/462.1 |
| 7,633,651 B2 * | 12/2009 | Tame | 358/3.28 |
| 2002/0170966 A1 | 11/2002 | Hannigan et al. | |

FOREIGN PATENT DOCUMENTS

| | | |
|---|---|---|
| EP | 1 349 370 A2 | 10/2003 |
| JP | 2001-518414 | 10/2001 |
| JP | 2001-309157 | 11/2001 |
| JP | 2001-319257 | 11/2001 |
| JP | 2002-236960 | 8/2002 |
| JP | 2003-44257 | 2/2003 |
| JP | 2003-319170 | 11/2003 |
| JP | 2004-102562 | 4/2004 |

* cited by examiner (A)

|  | RANGE OF DATA | DATA SIZE |
|---|---|---|
| COORDINATE OF THE CENTER $(x_c, y_c)$ | 0~1023 | 2×16bit |
| LONG SIDE $\ell$ | 0~1023 | 16bit |
| SHORT SIDE w | 0~1023 | 16bit |
| ANGLE BETWEEN THE LONG SIDE AND THE AXIS $\theta$ | -90~90 | 8bit |
|  | TOTAL | 72bit |

(B)

|  | AVERAGE | MAXIMAM | MINIMUM |
|---|---|---|---|
| WHITE DOMAIN | 24.7 | 30 | 21 |
| BLACK DOMAIN | 23.6 | 30 | 15 |
| TOTAL | 48.3 | 56 | 41 |
| SIZE | 435byte | 504byte | 369byte |

FIG. 12

|  | PDF417 | DATAMATRIX | MAXICODE | QRCODE |
|---|---|---|---|---|
| DEVELOPMENT COUNTRY | SYMBOL (US) | CI MATRIX (US) | URS (US) | DENSO (JN) |
| QUANTITY OF DATA — NUMBER | 2,710 | 3,116 | 138 | 2,710 |
| ALPHANUMERIC | 1,850 | 2,355 | 93 | 4,296 |
| BINARY | 1,018 | 1,556 | − | 2,953 |
| CHINESE CHARACTER | 554 | 778 | − | 1,8 |
| MAIN CHARACTER | LARGE-VOLUME DATA | SMALL-FOOTPRINT | HIGH SPEED READ | LARGE-VOLUME SMALL-FOOTPRINT LARGE-VOLUME DATA |
| MAIN PURPOSE | OA | FA | COMMODITY DISTRIBUTION | FULL FIELD |
| STANDARDIZATION | ISO AIM INTERNATIONAL | ISO AIM INTERNATIONAL | ISO AIM INTERNATIONAL | ISO JIS AIM INTERNATIONAL |

FIG. 13

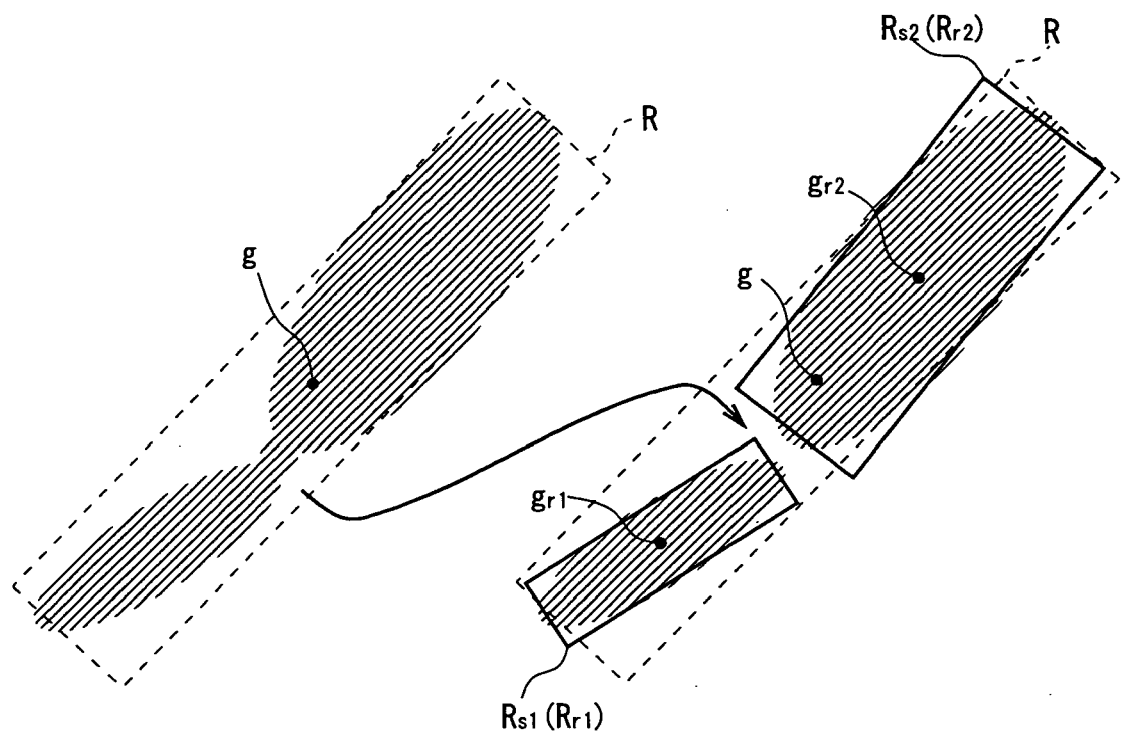
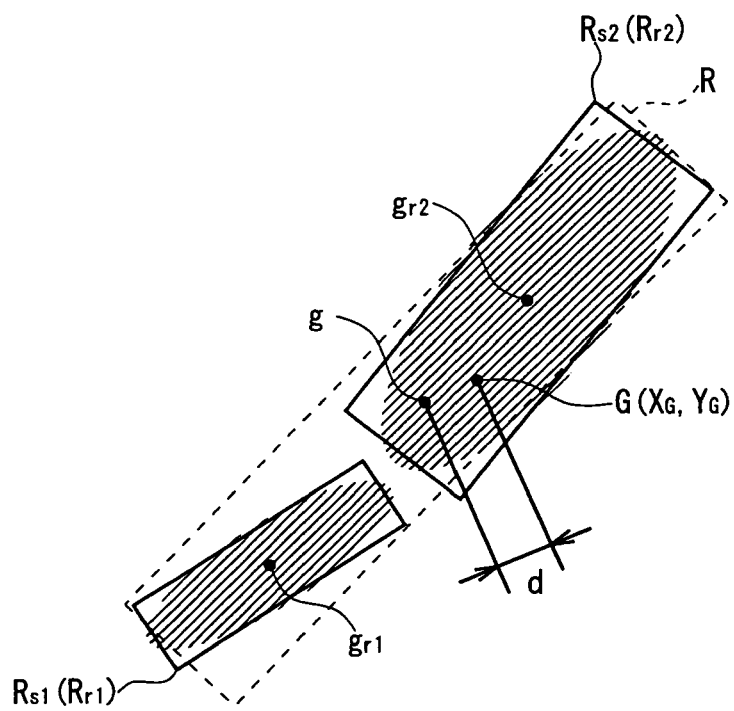
FIG. 18

| | RANGE OF DATA | DATA SIZE |
|---|---|---|
| COORDINATE OF THE CENTER (xc, yc) | 0~1023 | 2 × 16bit |
| RADIUS rd | 0~1023 | 16bit |
| | TOTAL | 48bit |

| | RANGE OF DATA | DATA SIZE |
|---|---|---|
| COORDINATE OF CONTROL POINT | 0~1023 | 2 × 16bit |
| | TOTAL | 32k(n+1)bit |

FIG. 35

(A) 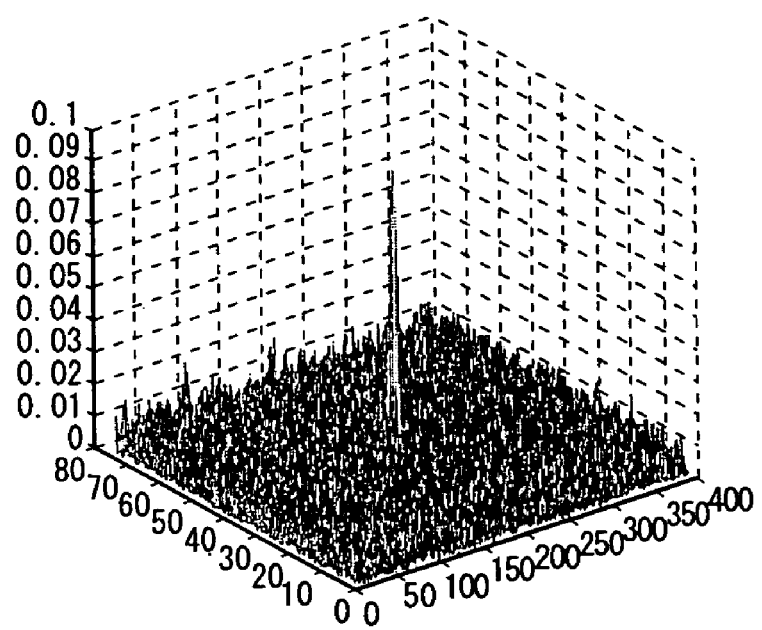
(B) 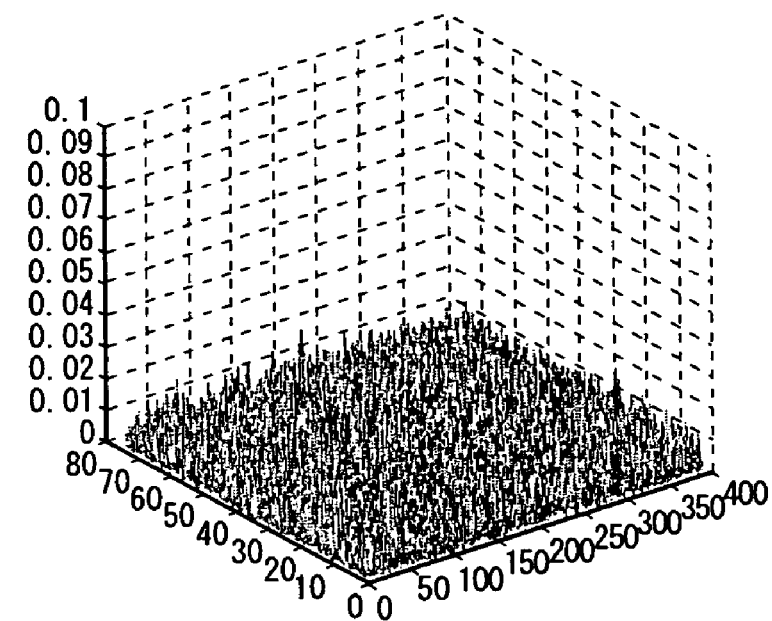
FIG. 38

「●」 ···MINIMAL POINTSPS(PS1~PSn)
「▲」 ···MAXIMAL POINTSPL(PL1~PLn)

| | RANGE OF DATA | DATA SIZE |
|---|---|---|
| POSITION OF THE MINIMAL POINTS OR MAXIMAL POINTS($x_p$, $y_p$) | 0~1023 | 2×16bit |
| LUMINANCE VALUE | 0~255 | 8bit |
| | TOTAL | 40bit |

UNAUTHORIZED COPY PREVENTING DEVICE AND METHOD THEREOF, AND PROGRAM

TECHNICAL FIELD

This invention relates to an apparatus, a method and a program for preventing unauthorized copying that can be suitably used for preventing unauthorized copying of contents printed on paper.

BACKGROUND ART

Conventionally, paper has been popularly used for printing various contents (hereinafter, referred to as printed contents). Printing paper carrying printed contents often has a high value particularly when it is used to operate as a medium of exchange for commercial goods such as paper money, as a medium of certification of contents such as certificates, as a medium of storing information such as personal works and as other mediums.

Therefore, various measures have been proposed to prevent unauthorized copying of printed contents that are printed on printing paper. Such measures include a technique of burying micro IC (integrated circuit) chips in generally available paper (to be referred to as plain paper hereinafter) and a technique of preparing special paper by specially processing ordinary paper (see, Patent Reference 1)

Patent Reference Japanese Patent Application Laid-Open Publication No. 2000-352913.

However, known measures including the above cited ones involve the use of a cumbersome technique and an operation of printing contents in limited premises to make it difficult to prevent unauthorized copying of printed contents particularly when original printing paper is prepared by printing the contents on paper that is available in ordinary homes and offices. Then, there arises a problem that printed contents printed on printing paper can hardly be protected properly.

DISCLOSURE OF THE INVENTION

In view of the above-identified problem, it is therefore the object of the present invention to provide an apparatus, a method and a program for preventing unauthorized copying for appropriately protecting printed contents.

In an aspect of the present invention, the above object is achieved by providing an apparatus for preventing unauthorized copying of printed contents printed on printing paper, the apparatus comprising: an acquisition means for acquiring pattern information according to the pattern carried by the printing paper; a storage means for storing the pattern information acquired by the acquisition means on the printing paper; and a verification means for verifying the validity of the printing paper according to the pattern information stored by the storage means.

In another aspect of the present invention, there is provided a method for preventing unauthorized copying of printed contents printed on printing paper, the method comprising: a first step of acquiring pattern information according to the pattern carried by the printing paper; a second step of storing the acquired pattern information on the printing paper; and a third step of verifying the validity of the printing paper according to the stored pattern information.

In still another aspect of the present invention, there is provided a program for causing a control device to execute a program comprising: a first process of extracting pattern information according to the image information acquired as a result of shooting pattern carried by printing paper also carrying predetermined contents; a second process of storing the extracted pattern information on the printing paper; and a third process of verifying the validity of the printing paper according to the pattern information stored on the printing paper.

In still another aspect of the present invention, there is provided an apparatus for preventing unauthorized copying of printed contents printed on printing paper, the apparatus comprising: an image pickup means for picking up an image of the pattern carried by the printing paper; an extraction means for dividing the pattern image obtained as a result of the image pickup operation of the image pickup means to define a plurality of regions and extracting each of the regions obtained as a result of the division as pattern information and showing a predetermined profile as pattern information; a storage means for storing the pattern information extracted by the extraction means on the printing paper; and a verification means for verifying the validity of the printing paper according to the pattern information stored by the storage means.

In still another aspect of the present invention, there is provided a method for preventing unauthorized copying of printed contents printed on printing paper, the method comprising: a first step of picking up an image of the pattern carried by the printing paper; a second step of dividing the pattern image obtained as a result of the image pickup operation to define a plurality of regions and extracting each of the regions obtained as a result of the division as pattern information and showing a predetermined profile as pattern information; a third step of storing the extracted pattern information on the printing paper; and a fourth step of verifying the validity of the printing paper according to the stored pattern information.

In still another aspect of the present invention, there is provided a program for causing a control device to execute a program comprising: a first process of dividing the pattern image obtained as a result of the image pickup operation of the pattern carried by printing paper on which predetermined printed contents are printed to define a plurality of regions; a second process of extracting each of the regions obtained as a result of the division as pattern information and showing a predetermined profile as pattern information; a third process of storing the extracted pattern information on the printing paper; and a fourth process of verifying the validity of the printing paper according to the pattern information stored on the printing paper.

In still another aspect of the present invention, there is provided an apparatus for preventing unauthorized copying of printed contents printed on printing paper, the apparatus comprising: an image pickup means for picking up an image of the pattern carried by the printing paper; an extraction means for extracting characteristics of the pattern image picked up by the image pickup means; a storage means for storing the characteristics extracted by the extraction means on the printing paper; and a verification means for reconfiguring the pattern image according to the characteristics stored by the storage means and verifying the validity of the printing paper according to the reconfigured pattern image.

In still another aspect of the present invention, there is provided a method for preventing unauthorized copying of printed contents printed on printing paper, the apparatus comprising: a first step of picking up an image of the pattern carried by the printing paper; a second step of extracting characteristics of the pattern image obtained as a result of the image pickup operation; a third step of storing the extracted characteristics on the printing paper; and a fourth step of reconfiguring the pattern image according to the stored characteristics and verifying the validity of the printing paper according to the reconfigured pattern image.

In still another aspect of the present invention, there is provided a program for causing a control device to execute a program comprising: a first process of extracting characteristics of the pattern image obtained as a result of the image pickup operation of the pattern carried by printing paper on which predetermined printed contents are printed; a second process of storing the extracted characteristics on the printing paper; a third process of reconfiguring the pattern image according to the stored characteristics; and a fourth process of verifying the validity of the printing paper according to the reconfigured pattern image.

In still another aspect of the present invention, there is provided an apparatus for preventing unauthorized copying of printed contents printed on printing paper, the apparatus comprising: a pattern dividing/region defining means for dividing the pattern carried by the printing paper to define regions of a predetermined unit; an extraction means for determining a plurality of points for generating curves approximating the contour of each of the regions defined by the pattern dividing/region defining means on the basis of a point on the contour of the region and extracting the points as pattern information; a storage means for storing the pattern information extracted by the extraction means on the printing paper; and a verification means for reconfiguring each of the regions from the pattern information stored by the storage means and verifying the validity of the printing paper, using each of the reconfigured regions.

In still another aspect of the present invention, there is provided a method for preventing unauthorized copying of printed contents printed on printing paper, the method comprising: a first step of dividing the pattern carried by the printing paper to define regions of a predetermined unit; a second step of determining a plurality of points for generating curves approximating the contour of each of the defined regions on the basis of a point on the contour of the region and extracting the points as pattern information; a third step of storing the pattern information extracted in the extracting step on the printing paper; and a fourth step of reconfiguring each of the regions from the pattern information stored in the storage step and verifying the validity of the printing paper, using each of the reconfigured regions.

In still another aspect of the present invention, there is provided a program for causing a control device to execute a program comprising: a first process of dividing the pattern of the pattern image carried by printing paper to define regions of a predetermined unit, the image being acquired as a result of shooting the pattern carried by the printing paper also carrying predetermined contents; a second process of determining a plurality of points for generating curves approximating the contour of each of the defined regions on the basis of a point on the contour of the region and extracting the points as pattern information; a third process of storing the determined points on the printing paper as pattern information; and a fourth process of reconfiguring each of the regions from the pattern information stored on the printing paper and verifying the validity of the printing paper, using each of the reconfigured regions.

Thus, according to the invention, the pattern information acquired according to the pattern carried by printing paper is stored on the printing paper and the validity of the pattern is verified according to the pattern information. Thus, it is possible to determine if the printing paper is original or not from the information based on the specific pattern carried by the printing paper. Therefore, it is possible to prevent unauthorized copying with ease without using any special paper and hence appropriately protect the printed contents.

According to the invention, the pattern of a pattern image carried by printing paper is divided to define a plurality of regions and pattern information for expressing the regions by predetermined respective shapes is stored on the printing paper. Subsequently, the validity of the printing paper is verified according to the pattern information stored on the printing paper so that the printing paper can be accurately identified on the basis of the detailed characteristics of the specific pattern carried by the printing paper itself. Therefore, it is possible to prevent unauthorized copying with ease highly reliably without using any special paper and hence appropriately protect the printed contents.

According to the invention, characteristics of a pattern image obtained as a result of shooting the pattern carried by printing paper on which predetermined printed contents are printed are extracted and stored on the printing paper. Then, the pattern image is reconfigured according to the characteristics stored on the printing paper and the validity of the printing paper is verified according to the reconfigured pattern image. Thus, it is possible to determine if the printing paper is original or not according to the invention based on the specific pattern carried by the printing paper itself. Therefore, it is possible to prevent unauthorized copying with ease without using any special paper and hence appropriately protect the printed contents.

According to the present invention, the pattern carried by printing paper is divided to define regions of a predetermined unit and a plurality of points are determined to generate curves approximating the contour of each of the defined regions according to points on the contour of the region. Then, the points are stored on the printing paper as pattern information and the validity of the printing paper is verified according to the stored pattern information so that the pattern carried by the printing paper can be reproduced accurately. Therefore, it is possible to prevent unauthorized copying with ease highly reliably without using any special paper and hence appropriately protect the printed contents.

BRIEF DESCRIPTION OF THE DRAWINGS

FIG. 12 is schematic illustrations of the results of an experiment (1).

FIG. 13 is a schematic illustration of two-dimensional bar codes.

FIG. 18 is a schematic illustration of separation of domains.

FIG. 35 is a schematic illustration of data size.

FIG. 38 is schematic illustrations of the result of phase-limited correlation.

BEST MODE FOR CARRYING OUT THE INVENTION

Unauthorized Copying Prevention Technique

Principle

Figure 1:
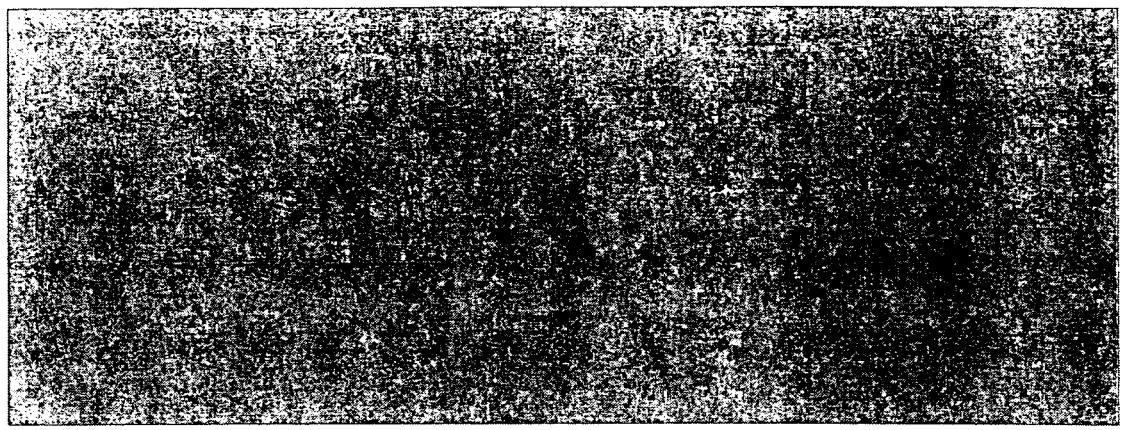
FIG. 1 is a schematic illustration of a pattern carried by paper.

As shown in FIG. 1, paper has a specific pattern (hereinafter, referred to as a pattern) not on the surface but in the inside thereof that is formed by complicatedly entangled fibers. It is possible to obtain an image of such a pattern (to be referred to as pattern image hereinafter) typically by means of a transmission type scanner as will be appreciated from the fact that the pattern can be seen when it is placed between light and the eyes of the viewer.

With the technique of preventing unauthorized copying that is used in this embodiment, the pattern of the pattern image of printing paper is extracted in order to prevent the printed contents printed on the printing paper from being copied without authorization.

Figure 2:
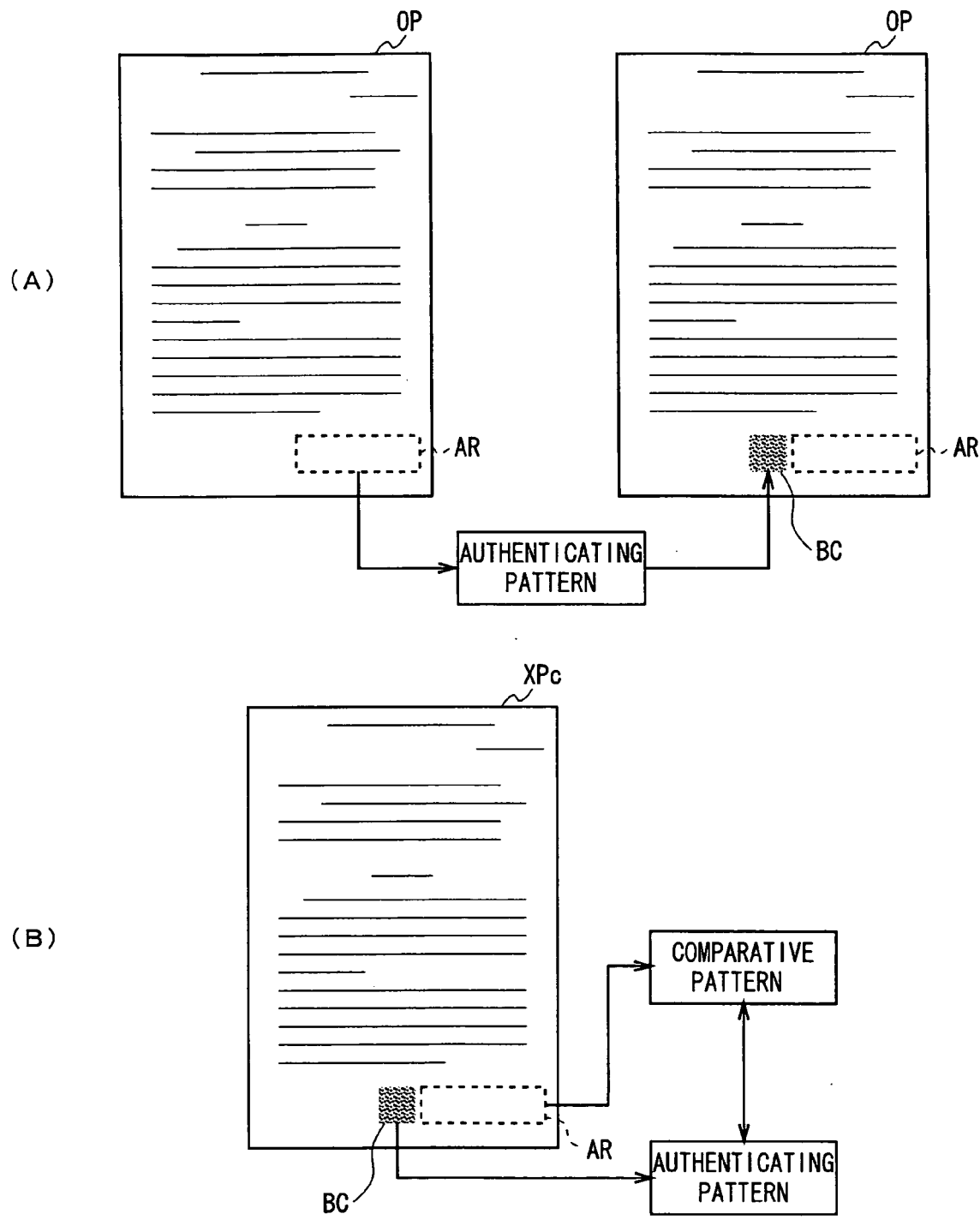
FIG. 2 is schematic illustrations of a technique of preventing unauthorized copying.

As shown in FIG. 2(A), for instance, an unauthorized copying preventing apparatus according to the invention extracts the pattern of a region AR specified in advance (to be referred to as specified region hereinafter) out of the pattern image of the printing paper of an original (to be referred to as original printing paper hereinafter) as authenticating information of the original printing paper OP.

Then, the unauthorized copying preventing apparatus prints the pattern (to be referred to as authenticating pattern hereinafter) as two-dimensional barcode (to be referred to as authenticating pattern code) BC on part of the printing paper so as to store the authenticating pattern on the original printing paper OP.

On the other hand, as shown in FIG. 2(B), when the printed contents of the printing paper XPc carrying the authenticating pattern code BC (to be referred to as code-added printing paper hereinafter) are copied, the unauthorized copying preventing apparatus extracts the pattern in the specified region AR out of the pattern image of the code-added printing paper XPc as comparative information to be used for comparing it with the authenticating pattern.

Then, the unauthorized copying preventing apparatus verifies the validity of the code-added printing paper XPc (if the original printing paper OP or not) by collating the pattern (to be referred to as comparative pattern) and the authenticating pattern according to the authenticating pattern code BC.

If the unauthorized copying preventing apparatus obtains an agreement rate higher than a predetermined reference agreement rate as a result of the collation, it determines the code-added printing paper XPc as proper original printing paper OP and authorizes copying the printed contents printed on the code-added printing paper XPc.

If, on the other hand, the unauthorized copying preventing apparatus obtains an agreement rate lower than the predetermined reference agreement rate as a result of the collation, it determines the code-added printing paper XPc as not proper original printing paper OP but as printing paper of a copy and prohibits copying the printed contents printed on the code-added printing paper XPc.

Thus, with the technique of preventing unauthorized copying, while the printed contents of the original printing paper OP may be copied limitlessly, the pattern in the specified region AR is not copied on the printing paper that is used for copying the printed contents. Therefore, the printed contents of the printing paper that is used for copying the printed contents (the original printed contents) cannot be copied.

Figure 3:
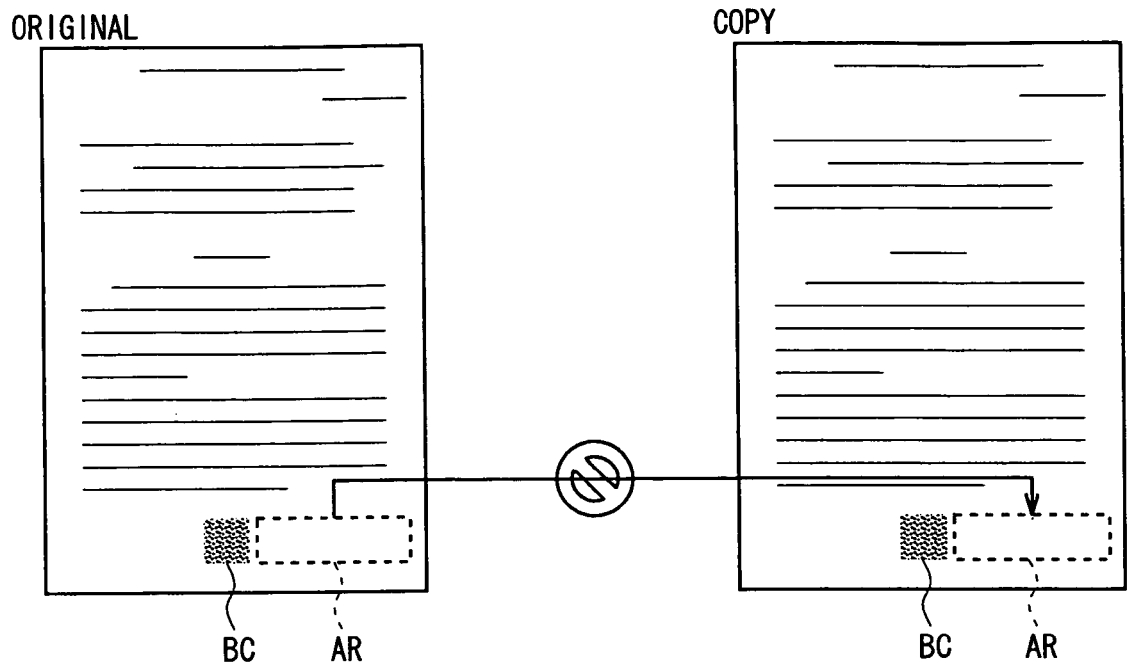
FIG. 3 is a schematic illustration of a technique of making a copy of original printing paper.

In this way, as shown in FIG. 3, with the technique of preventing unauthorized copying, the validity of the code-added printing paper XPc (FIG. 2(B)) (if the original printing paper OP or not) is verified according to pattern (the authenticating pattern or the comparative pattern) to prevent the printed contents printed on the original printing paper OP from being copied without authorization.

Configuration of the Embodiment of Unauthorized Copying Preventing Apparatus

Figure 4:
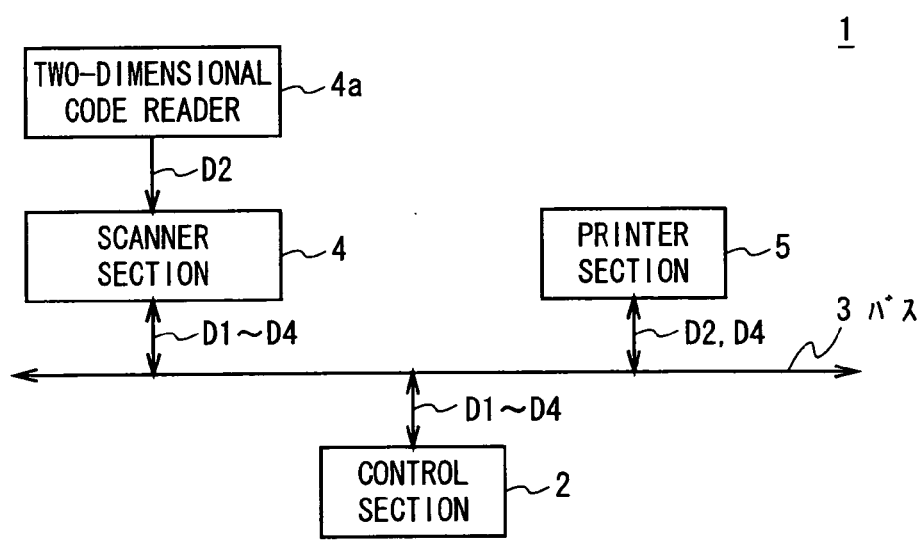
FIG. 4 is a block diagram of an unauthorized copying preventing apparatus according to the invention.

Now, referring to FIG. 4, reference symbol 1 in FIG. 4 denotes the unauthorized copying preventing apparatus of this embodiment as a whole, which comprises a control section 2 for controlling the overall operation of the unauthorized copying preventing apparatus, a scanner section 4 and a printer section 5, the scanner section 4 and printer section 5 being connected to the control section 2 by way of a bus 3.

The control section 2 has a central processing unit, a work memory and an information storage memory. The information storage memory stores various pieces of information including positional information on the specified region AR (FIG. 2) on sheets of printing paper of each standardized size (to be referred to as region position information hereinafter) and character string information for two-dimensional bar codes (to be referred to as code character string information hereinafter) and programs. The control section 2 is adapted to carry out various processing operations according to the program loaded in the work memory, appropriately using the various pieces of information stored in the information storage memory.

In operation, as a predetermined command for printing an authenticating pattern code BC (FIG. 2(A)) is given from an operating section (not shown), the control section 2 transmits a pattern image read command to the scanner section 4.

Then, as data on the pattern image (to be referred to as original pattern image data) D1 of the original printing paper OP (FIG. 2(A)) is given from the scanner section 4 in response to the command, the control section 2 moves itself into a first mode (to be referred to as code printing mode hereinafter) of operation.

Then, the control section 2 extracts the authenticating pattern from the pattern image of the original pattern image data D1. Thereafter, it generates a character string data for a two-dimensional bar code (to be referred to as authenticating pattern code data) D2 from the authenticating pattern and transmits it to the printer section 5. The printer section 5 prints the authenticating pattern code data D2 on the original printing paper OP (FIG. 2(A)) as authenticating pattern code BC (FIG. 2(A)).

Additionally, as a predetermined copying command is given from the operating section, the control section 2 transmits a pattern image read command and a code read command to the scanner section 4.

Then, as data on the pattern image on a sheet of code-added printing paper XPc (FIG. 2(B)) (to be referred to as code-added pattern image data hereinafter) and the authenticating pattern code data D2 obtained as a result of reading the authenticating pattern code BC printed on the sheet of code-added printing paper XPc are given from the scanner section 4 in response to the commands, the control section 2 moves itself into a second mode (to be referred to as verification mode hereinafter).

Then, the control section 2 extracts a comparative pattern from the pattern image of the code-added pattern image data D3 and collates the comparative pattern and the authenticating pattern obtained according to the authenticating pattern code data D2.

The control section 2 generates a copying authorizing command only when an agreement rate higher than a predetermined reference agreement rate is obtained as a result of the collation and transmits it to the scanner section 4. Then, the printed contents of the code-added printing paper XPc (FIG. 2(B)) are read by the scanner section 4 and printed by the printer section 5 as copy.

In this way, the control section 2 is adapted to have the authenticating pattern extracted from the original printing paper OP printed on the original printing paper OP as authenticating pattern code BC and authorize copying the printed contents only when the code-added printing paper XPc has a comparative pattern that agrees with the authenticating pattern of the authenticating pattern code BC it has printed.

On the other hand, the scanner section 4 is adapted to operate in a transmission mode, in a reflection mode and in a code read mode. More specifically, it operates in a transmission mode, in a reflection mode and in a code read mode respectively in response to a pattern image read command, a copying authorization command and a code read command given from the control section 2.

In a transmission mode, the scanner section 4 irradiates light onto the original printing paper OP or the code-added printing paper XPc placed on the original table and forms an image of a pattern obtained by the light transmitted through the printing paper OP or XPc on a solid state image pickup element by way of an optical system. Then, the scanner section 4 executes an A/D (analog/digital) conversion process for the pattern image signal obtained from the solid state image pickup element and the original pattern image data D1 or the code-added pattern image data D3 obtained as a result of A/D conversion is transmitted to the control section 2.

In a reflection mode, the scanner section 4 irradiates light onto the original printing paper OP placed on the original table and forms an image of the printed contents obtained by the light reflected by the printing paper OP on a solid state image pickup element by way of an optical system. Then, the scanner section 4 executes an A/D conversion process for the printed contents image signal obtained from the solid state image pickup element and the printed contents image data D4 obtained as a result of A/D conversion is transmitted to the printer section 5.

In a code read mode, the scanner section 4 drives the two-dimensional code reader 4a connected to the scanner section 4 to start operating and transmits the authenticating pattern code data D2 supplied from the two-dimensional code reader 4a as a result of reading the code to the control section 2.

In this way, the scanner section 4 operates in a mode corresponding to any of the commands that can be given from the control section 2 to read a pattern image, an authenticating pattern code BC (FIG. 2) or printed contents.

On the other hand, the printer section 5 stores various pieces of information including font information on two-dimensional codes (to be referred to as code font information hereinafter) and positional information on authenticating pattern codes BC (FIG. 2) for different standard sizes of pieces of paper (to be referred to as code position information hereinafter) in the internal memory thereof and executes printing processes, appropriately using any of the various pieces of information stored in the internal memory.

As the authenticating pattern code data D2 is given from the control section 2, the printer section 5 executes a pulse width modulation process and other processes on the authenticating pattern code data D2 and transmits the printing image data obtained as a result to a printing head section. Then, the printing head section is driven to operate according to the printing image data, the code font information and the code position information so that the authenticating pattern code BC (FIG. 2(A)) is printed on the predetermined position on the printing paper (original printing paper OP) placed on the printing paper table of the printer section 5.

On the other hand, as the printed contents image data D4 is given from the scanner section 4, the printer section 5 executes a pulse width modulation process and other processes on the printed contents image data D4 and transmits the printing image data obtained as a result to the printing head section. Then, the printing head section is driven to operate according to the printing image data so that the printed contents of the original printing paper OP are copied on the printing paper placed on the printing paper table of the printer section 5.

Thus, the printer section 5 is adapted to print the authenticating pattern code BC (FIG. 2) according to the authenticating pattern code data D2 supplied from the control section 2 and copy the printed contents according to the printed contents image data D4.

Processing Operations of the Control Section

The processing operations of the control section 2 will be described below in terms of the first and second embodiments.

Processing Operations of the Control Section of the First Embodiment

The processing operations of the control section 2 of the first embodiment will be sequentially described below in terms of first through fourth processing procedures.

First Processing Procedure

Firstly, the processing operations of the control section 2 that follow the first processing procedure will be described.

Figure 5:
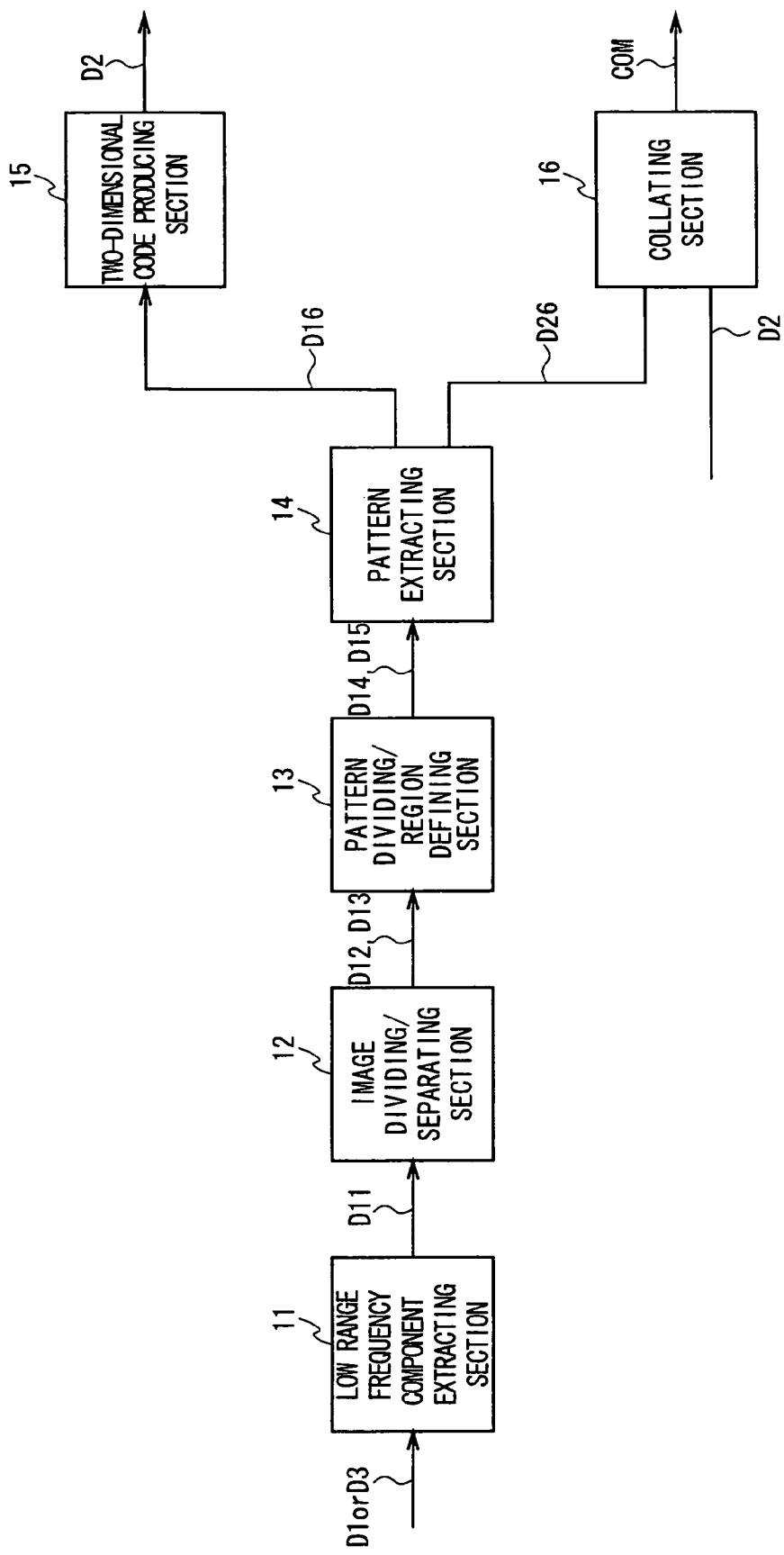
FIG. 5 is a block diagram of the control section of the first embodiment of the invention, illustrating the first processing procedure thereof.

FIG. 5 is a schematic block diagram of the control section 2 of the first embodiment of the invention adapted to follow the first processing procedure thereof. Referring to FIG. 5, the control section 2 comprises a low range frequency component extracting section 11 for extracting a pattern image of a low range frequency component (to be referred to as low range pattern image hereinafter) from a pattern image, an image dividing/separating section 12 for separating the low range pattern image into an image of a low luminance component (to be referred to as white component pattern image hereinafter) and an image of a high luminance component (to be referred to as black component pattern image hereinafter), a pattern dividing/region defining section 13 for dividing the pattern contained in the white component pattern image and the pattern contained in the black component pattern image into a plurality of regions, a pattern extracting section 14 for extracting the patterns, computing the characteristic quantity of each region, a two-dimensional code producing section 15 for transforming each pattern (each characteristic quantity) into a two-dimensional bar code and a collating section 16 for verifying the validity of the code-added printing paper XPc (FIG. 2(B)), using each pattern (each characteristic quantity).

In a code printing mode, the control section 2 carries out various processing operations on the original pattern image data D1 given from the scanner section 4 sequentially by means of the low range frequency component extracting section 11, the image dividing/separating section 12, the pattern dividing/region defining section 13, the pattern extracting section 14 and the two-dimensional code producing section 15 and transmits the obtained authenticating pattern code data D2 obtained as a result to the printer section 5.

In a verification mode, the control section 2 carries out various processing operations on the code-added pattern image data D3 given from the scanner section 4 sequentially by means of the low range frequency component extracting section 11, the image dividing/separating section 12, the pattern dividing/region defining section 13 and the pattern extracting section 14 and subsequently executes a collating process on the basis of the outcome of the processing operations and the authenticating pattern code data D2 given from the scanner section 4 by means of the collating section 16.

Now, the low range frequency component extracting process of the low range-frequency extracting section 11, the image dividing process of the image dividing/separating section 12, the pattern dividing/region defining process of the pattern dividing/region defining section 13, the pattern extracting process of the pattern extracting section 14, the two-dimensional code producing process of the two-dimensional code producing section 15 and the collating process of the collating section 16 will be described individually in greater detail below.

Low Range Frequency Component Extracting Process

Figure 6:
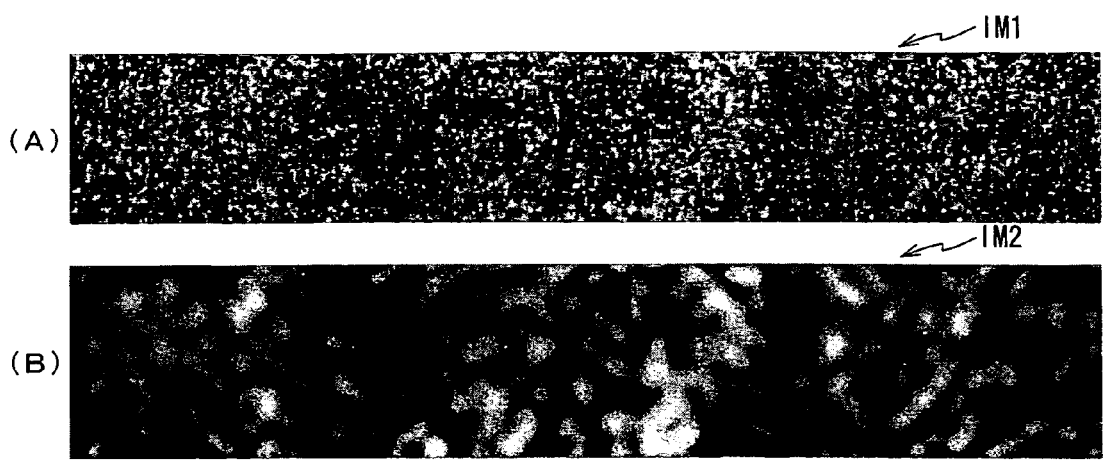
FIG. 6 is schematic illustrations of a process of extracting a low frequency component.

Referring to FIGS. 6(A) and 6(B), the low range frequency component extracting section 11 acquires a pattern image of the specified region AR (FIGS. 2(A) and 2(B)) IM1 (FIG. 6(A)) (to be referred to as region pattern image hereinafter) of the pattern image on the original printing paper OP (FIG. 2(A)) or the pattern image on the code-added printing paper XPc (FIG. 2(B)) and extracts a low range component pattern image IM2 (FIG. 6(B)) from the region pattern image IM1.

More specifically, the low range frequency component extracting section 11 acquires data on the region pattern image IM1 from the original pattern image data D1 or the code-added pattern image data D3 given from the scanner section 4 according to the region position information stored in the internal memory and generates data for the frequency component by carrying out a Fourier transformation on the acquired data on the region pattern image IM1.

Then, after making the data value of the high frequency component higher than a predetermined threshold value equal to "0", the low range frequency component extracting section 11 carriers out an inverse Fourier transformation on the data of this frequency component to generate data on the low range component pattern image IM2 (to be referred to as low range pattern image data hereinafter) D11 and transmits the generated data to the image dividing/separating section 12.

Thus, the low range frequency component extracting section 11 is adapted to remove the various noise components generally contained in a high frequency component of an image such as the noises of the solid state image pickup element in the scanner section 4 by extracting the low range component pattern image IM2.

As a result, the low range frequency component extracting section 11 can avoid the degradation of the pattern (characteristic quantity) extraction accuracy at the pattern extracting section 14 that is attributable to various noise components and hence improve the reliability of the outcome of the collation in the collating process of the collating section 16.

Image Separating Process

Typically as shown in FIGS. 7(A), 7(B) and 7(C), the image dividing/separating section 12 divides the low range component pattern image IM2 (FIG. 7(A)) extracted by the low range frequency component extracting section 11 into a white component pattern image WIM (FIG. 7(B)) and a black component pattern image BIM (FIG. 7(C)) and separates the images produced by the division.

More specifically, the image dividing/separating section 12 sequentially detects luminance values of the low range component pattern image IM2 of the low range pattern image data D11 supplied from the low range frequency component extracting section 11 on a pixel by pixel basis and shifts the luminance levels of the pixels other than those having a luminance value not higher than a predetermined low luminance threshold value (to be referred to as white threshold value hereinafter) to the highest luminance level so as to extract a white component pattern image WIM (FIG. 7(B)) and subsequently transmits the white component pattern image WIM as data (to be referred to as white component pattern image data hereinafter) D12 to the pattern dividing/region defining section 13.

Additionally, the image dividing/separating section 12 shifts the luminance levels of the pixels other than those having a luminance value not lower than a predetermined high luminance threshold value (to be referred to as black threshold value hereinafter) to the lowest luminance level so as to extract a black component pattern image BIM (FIG. 7(C)) and subsequently transmits the black component pattern image BIM as data (to be referred to as black component pattern image data hereinafter) D13 to the pattern dividing/region defining section 13.

Thus, the image dividing/separating section 12 is adapted to reduce the complexity of the pattern by separating the white component pattern image WIM (FIG. 7(B)) and the black component pattern image BIM (FIG. 7(C)).

As a result, the image dividing/separating section 12 can avoid the degradation of the pattern (characteristic quantity) extraction accuracy at the pattern extracting section 14 that is attributable to a high degree of complexity of the pattern and hence improve the reliability of the outcome of the collation in the collating process of the collating section 16.

Additionally, the image dividing/separating section 12 is also adapted to regulate the white threshold value and the black threshold value so as to make the ratio of the area of the white component pattern image WIM (FIG. 7(B)) to that of the low component pattern image IM2 (FIG. 7(A)) and the ratio of the area of the black component pattern image BIM (FIG. 7(C)) to that of the low component pattern image IM2 (FIG. 7(A)) typically equal to 20[%].

Figure 7:
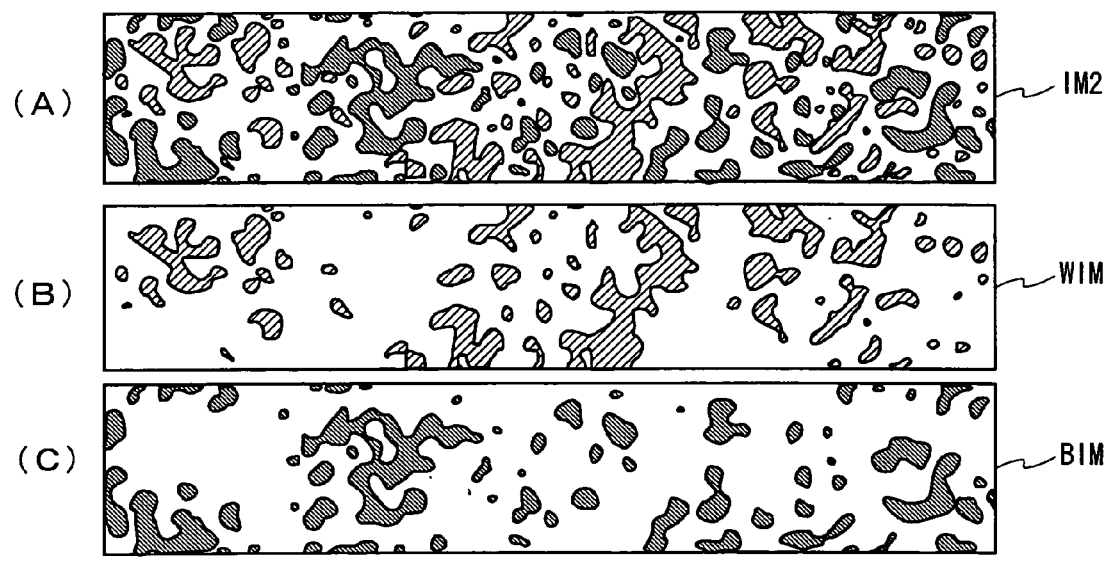
FIG. 7 is schematic illustrations of image separation.
Figure 8:
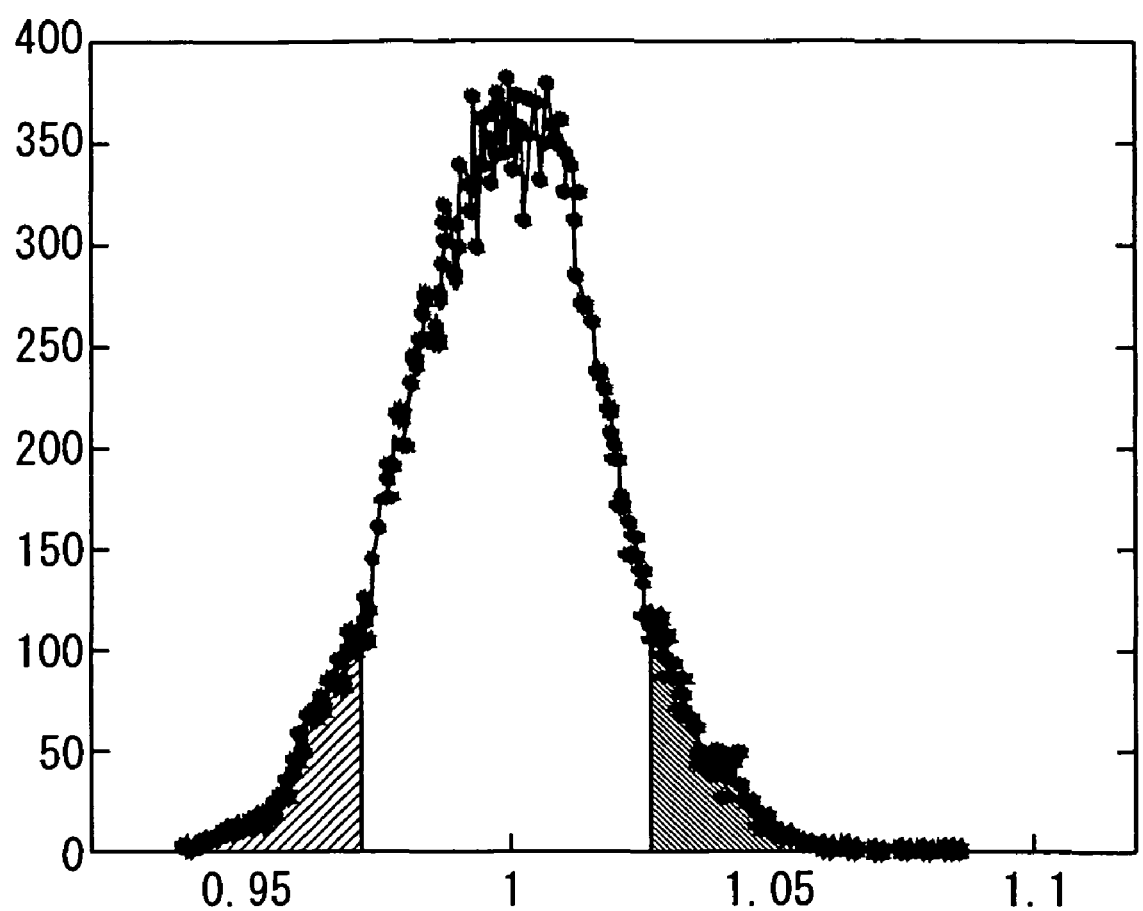
FIG. 8 is a schematic illustration of image separation using a luminance histogram.

More specifically, as the image dividing/separating section 12 sequentially detects luminance values from the low range component pattern image IM2 and extracts a white component pattern image WIM (FIG. 7(B)) and a black component pattern image BIM (FIG. 7(C)), it generates a luminance histogram showing the distribution of luminance values of the pixels of the low range component pattern image IM2 as shown in FIG. 8.

Then, the image dividing/separating section 12 determines if the number of the white pixels (black pixels) in the extracted white component pattern image WIM (black component pattern image BIM) is equal to 20[%] (shaded area in FIG. 8) of all the pixels of the low range component pattern image IM2 (FIG. 7(A)) on the basis of the luminance histogram.

If it is determined that the number of the white pixels (black pixels) is not equal to 20[%] of all the pixels, the image dividing/separating section 12 changes the white threshold value (black threshold value) and re-extracts a white component pattern image WIM (black component pattern image BIM) on the basis of the changed white threshold value (black threshold value).

Thus, the image dividing/separating section 12 is adapted to extract a white component pattern image WIM (black component pattern image BIM) so as to make the number of the pixels of the white pixel (black pixel) equal to 20[%] of all the pixels of the low range component pattern image IM2 (FIG. 7(A)) and transmits it to the pattern dividing/region defining section 13 as white component pattern image data D12 (black component pattern image data D13).

Thus, the image dividing/separating section 12 can relatively divide the low range component pattern image IM2 (FIG. 7(A)) into a white component pattern image WIM (FIG. 7(B)) and a black component pattern image BIM (FIG. 7(C)) and separate them from each other on the basis of the total number of pixels. Therefore, if the color tone of the printing paper (low range component pattern image IM2) has been changed with time, it can remove the change in the color tone.

As a result, the image dividing/separating section 12 can avoid the degradation of the pattern (characteristic quantity) extraction accuracy at the pattern extracting section 14 that is attributable to the change in the color tone and hence improve the reliability of the outcome of the collation in the collating process of the collating section 16.

Pattern Dividing/Region Defining Process

The pattern dividing/region defining section 13 divides the pattern of the white component pattern image WIM (FIG. 7(B)) into regions of units of sets of adjoining white pixels (to be referred to as white domains) as shown in FIG. 7(B) and also divides the pattern of the black component parameter image BIM (FIG. 7(C)) into regions of units of sets of adjoining black pixels (to be referred to as black domains) as shown in FIG. 7(C).

Figure 9:
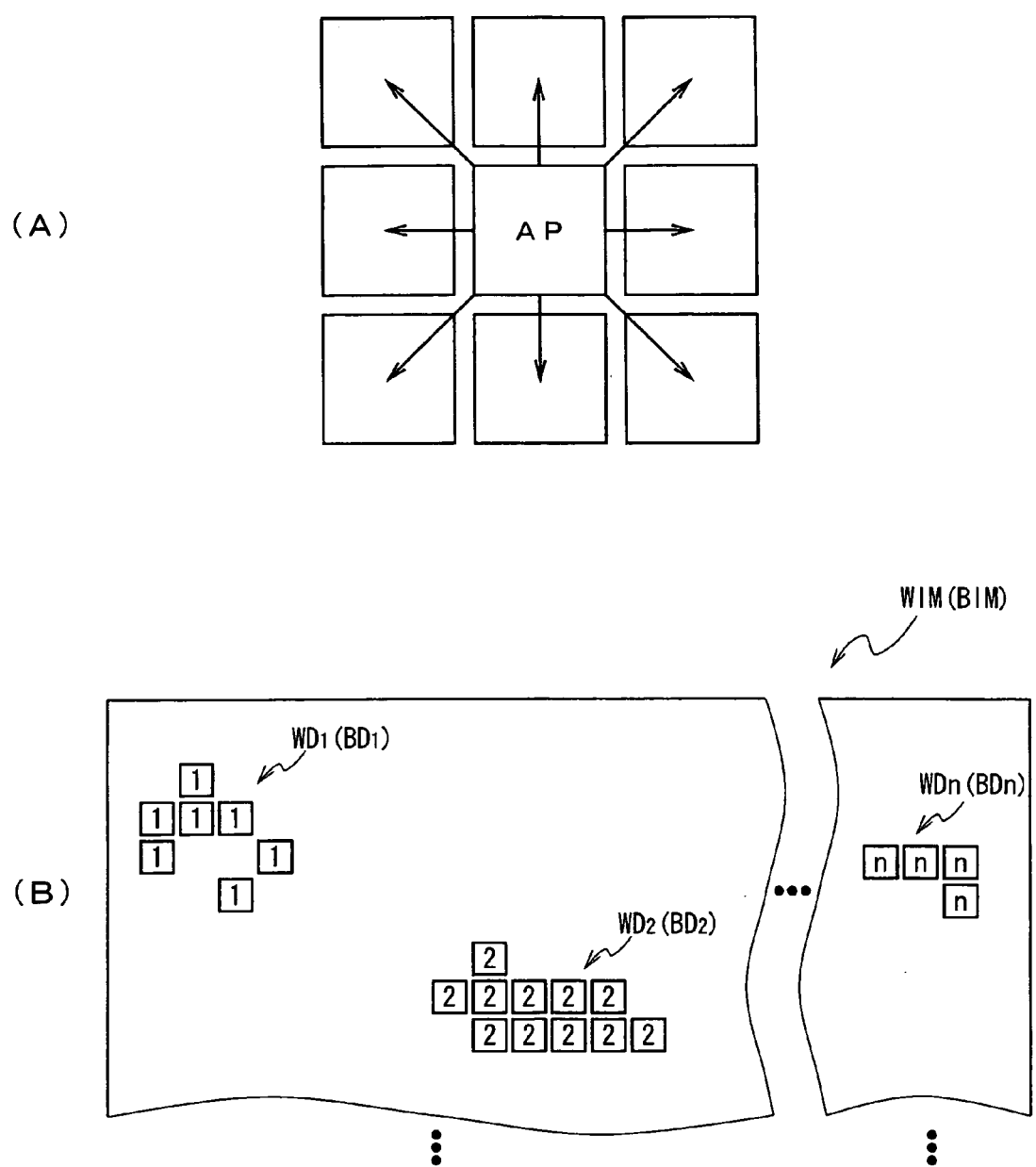
FIG. 9 is schematic illustrations of division of a white domain (black domain).

More specifically, the pattern dividing/region defining section 13 detects all the white pixels from the white component pattern image WIM (FIG. 7(B)) of the white component pattern image data D12 supplied from the image dividing/separating section 12 and then sequentially links a total of eight white pixels including four upper and lower and left and right adjoining pixels and four adjoining pixels arranged in oblique directions of an attention-attracting pixel AP (to be referred to as eight neighboring pixels) as shown in FIG. 9(A).

When no white pixel is detected in each set of eight neighboring pixels any further, the pattern dividing/region defining section 13 produces white domains $WD_1, WD_2, \ldots, WD_n$ by attaching pieces of identifying information to the respective groups, or sets, of white pixels formed by linking them.

The pattern dividing/region defining section 13 is adapted to also produce a plurality of black domains BD ($BD_1$ through $BD_n$) from the black component pattern image BIM (FIG. 7) of the black component pattern image data D13 supplied from the image dividing/separating section 12 as in the case of the white component pattern image WIM (FIG. 7(B)).

In this way, the pattern dividing/region defining section 13 can divide the pattern into a number of domains by producing a plurality of white domains WD ($WD_1$ through $WD_n$) from the white component pattern image WIM (FIG. 7(B)) and also a plurality of black domains BD ($BD_1$ through $BD_n$) from the black component pattern image BIM (FIG. 7(C))

As a result, the pattern dividing/region defining section 13 can finely analyze the pattern of the white component pattern image WIM (FIG. 7(B)) and the pattern of the black component pattern image BIM (FIG. 7(C)) so that it can improve the accuracy of extracting patterns (characteristic quantities) of the pattern extracting section 14 at the pattern extracting section 14 and hence the reliability of the result of the collating operation of the collating section 16.

Figure 10:
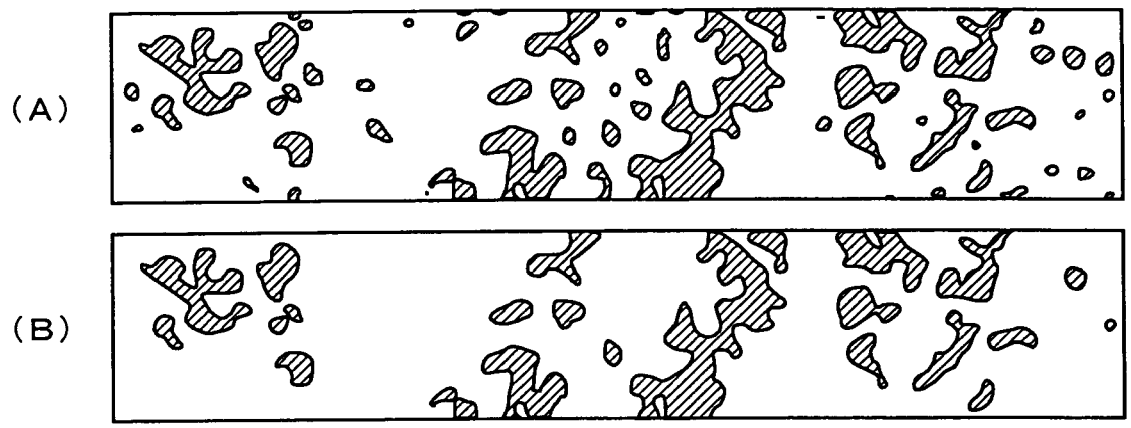
FIG. 10 is schematic illustrations of removal of small domains.
Figure 11:
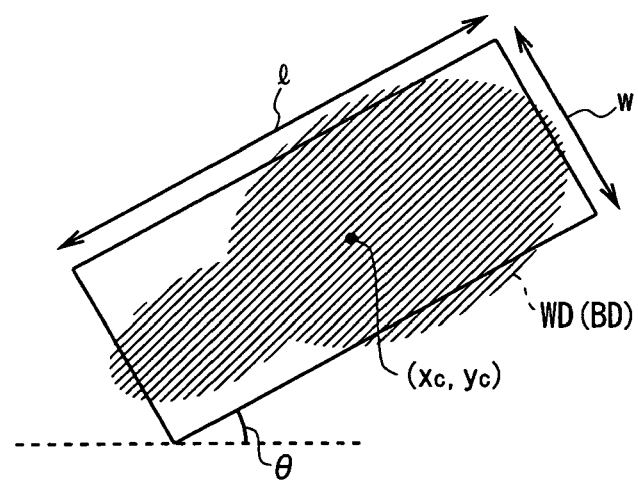
FIG. 11 is a schematic illustration of computation of a characteristic quantity.

In addition to the above described arrangement, after producing a plurality of white domains WD ($WD_1$ through $WD_n$) from the white component pattern image WIM (FIG. 7(B)) as shown in FIG. 10(A), the pattern dividing/region defining section 13 removes domains having a number of pixels smaller than a predefined number (to be referred to as small domains hereinafter) as shown in FIG. 10(B) and transmits the data on the white domains WD ($WD_1$ through $WD_n$) obtained by removing small domains (to be referred to as white domain data hereinafter) D14 to the pattern extracting section 14.

The pattern dividing/region defining section 13 removes small domains from the black domains BD ($BD_1$ through $BD_n$) as in the case of the white domains WD ($WD_1$ through $WD_n$) and transmits the data on the black domains BD ($BD_1$ through $BD_n$) obtained by removing small domains (to be referred to as black domain data hereinafter) D15 to the pattern extracting section 14.

In this way, the pattern dividing/region defining section 13 extracts only characteristic parts of the while component pattern image WIM (FIG. 7(B)) and those of the black component pattern image BIM (FIG. 7(C)) as white domains WD and black domains BD respectively so as to improve the accuracy of extracting patterns (characteristic quantities) at the pattern extracting section 14.

Pattern Extracting Process

The pattern extracting section 14 extracts patterns by computing the characteristic quantity of each of the white domains WD ($WD_1$ through $WD_n$) and the black domains BD ($BD_1$ through $BD_n$).

Since it is difficult for the pattern extracting section 14 to computationally determine the characteristic quantity of each of the white domains WD and the black domains BD, it uses a rectangle to approximate the characteristic quantity of each of the white domains WD and the black domains BD. More specifically, the pattern extracting section 14 computes the coordinates of the center ($x_c$, $y_c$), the long side l, the short side w and the angle θ between the long side l and the axis of each domain (white domain WD or black domain BD) of the rectangle (to be referred to as rectangle information values hereinafter) as characteristic quantity.

In other words, the pattern extracting section 14 computationally determines the characteristic quantity of each of the white domains WD ($WD_1$ through $WD_n$) in the white domain data D14 supplied from the pattern dividing/region defining section 13. If the luminance value of the white domain WD is I (x, y), it computes the primary image moment $M_{00}$, the secondary image moments $M_{10}$, $M_{01}$ and the tertiary image moments $M_{20}$, $M_{02}$, $M_{11}$, according to the image moment $M_{pq}$ being defined by means of the formula shown below.

$$M_{pq} = \sum_y \sum_x x^p y^p I(x, y) \quad (1)$$

Then, the pattern extracting section 14 computes the coordinates of the center ($x_c$, $y_c$), using these primary, secondary and tertiary image moments $M_{00}$, $M_{10}$, $M_{01}$, $M_{20}$, $M_{02}$, $M_{11}$ and the formula shown below.

$$x_c = \frac{M_{10}}{M_{00}} \quad (2)$$
$$y_c = \frac{M_{01}}{M_{00}}$$

The pattern extracting section 14 then computes the long side l and the short side w, using the respective formulas shown below.

$$l = \sqrt{6\left(a + c + \sqrt{b^2 + (a-c)^2}\right)} \quad (3)$$
$$w = \sqrt{6\left(a + c - \sqrt{b^2 + (a-c)^2}\right)}$$

Finally, the pattern extracting section 14 computes the angle θ, using the formula shown below.

$$\theta = \frac{1}{2}\tan^{-1}\left[\frac{b}{a-c}\right] \quad (4)$$

where, $$a = \frac{M_{20}}{M_{00}} - x_c^2$$
$$b = 2\left[\frac{M_{11}}{M_{00}} - x_c y_c\right]$$
$$c = \frac{M_{02}}{M_{00}} - y_c^2$$

In this way, the pattern extracting section 14 computationally determines the characteristic quantities (rectangle information values) of each of the white domains WD ($WD_1$ through $WD_n$).

Similarly, the pattern extracting section 14 computationally determines the characteristic quantities (rectangle information values) of each of the black domains BD ($BD_1$ through $BD_n$) in the black domain data D15 supplied from the pattern dividing/region defining section 13, using the above formulas (1) through (4), as in the case of the white domains WD ($WD_1$ through $WD_n$)).

Since the computed characteristic quantities of the white domains WD ($WD_1$ through $WD_n$) and the black domains BD ($BD_1$ through $BD_n$) represent the characteristic profile of the patterns contained in the region pattern image IM1 (FIG. 6(A)) (to be referred to as pattern characteristic quantities hereinafter), the obtained characteristic quantities represent the outcome of the operation of extracting the patterns contained in the region pattern image IM1.

Then, if the current operation is being conducted in a code printing mode, the pattern extracting section 14 transmits the pattern characteristic quantities to the two-dimensional code producing section 15 as data on the authenticating pattern (to be referred to as authenticating pattern data hereinafter) D16 (FIG. 5). If, on the other hand, the current operation is being conducted in a verification mode, the pattern extracting section 14 transmits the pattern characteristic quantities to the collating section 16 as data on the comparative pattern (to be referred to as comparative pattern data hereinafter) D26 (FIG. 5).

In this way, the pattern extracting section 14 extracts the pattern data (authenticating pattern or the comparative pattern) in the specified region AR (FIG. 2(A)) by computationally determining the pattern characteristic quantities from the rectangle information values of the while domains WD and the black domains BD.

Two-Dimensional Code Producing Process

The two-dimensional code producing section 15 stores the authenticating pattern (pattern characteristic quantities) as authenticating pattern code BC (FIG. 2(A)) on the original printing paper OP.

More specifically, the two-dimensional code producing section 15 discards the decimals of each of the pattern characteristic quantities (the rectangle information values of each of the white domains WD and the black domains BD) of the authenticating pattern data D16 supplied to it and executes a two-dimensional barcode producing process on each of the obtained pattern characteristic quantities according to the code character string information stored in the memory to generate authenticating pattern code data D2 and transmits the data to the printer section 5 at a predetermined timing.

As a result, the authenticating pattern code data D2 is printed as authenticating pattern code BC (FIG. 2(A)) at a predetermined position on the printing paper (original printing paper OP) placed on the printing paper table of the printer section 5 so as to record the authenticating pattern on the original printing paper OP (FIG. 2(A)).

If the range of data that rectangle information values (the coordinates of the center ($x_c$, $y_c$), the long side l, the short side w and the angle $\theta$) can take for a white domain WD or black domain BD is assumed to be such as the one shown in FIG. 12(A), the data size of a rectangle information value is determined to be equal to 9 [bytes] (72 [bits]) for a white domain WD or a black domain BD by an experiment.

Then, the data size of each pattern characteristic quantity (the rectangle information value for each white domain WD or black domain BD) obtained as a result of omitting redundant data by way of the low range frequency component extracting process, the image separating process, the pattern dividing/region defining process and the pattern extracting process as described above is determined to be equal to 435 [bytes] in average and 504 [bytes] at maximum by an experiment as shown in FIG. 12(B).

It may be clear from FIG. 13 that a binary data of about 1 to 3 [Kbytes] can be transformed into a two-dimensional bar code by means of a known two-dimensional bar code forming process. Therefore, the two-dimensional code producing section 15 can appropriately transform the authenticating pattern data D16 into an authenticating pattern code data D2 because the redundant data is already omitted by the low range frequency component extracting process, the image separating process, the pattern dividing/region defining process and the pattern extracting process as described above.

Collating Process

The collating section 16 collates the comparative pattern extracted from the code-added printing paper XPc (FIG. 2(B)) and the authenticating pattern stored as authenticating pattern code BC (FIG. 2(B)) on the original printing paper OP as shown in FIG. 2(B).

More specifically, the collating section 16 sequentially collates each of the white domains WD and the black domains BD expressed by the corresponding pattern characteristic quantities (rectangle information values) in the comparative pattern data D26 supplied from the pattern extracting section 14 and the corresponding one of the white domains WD and the black domains BD (to be referred to as authenticating domains hereinafter) expressed by the corresponding pattern characteristic quantities (rectangle information values) in the authenticating pattern code data D2 given from the scanner section 4.

Figure 14:
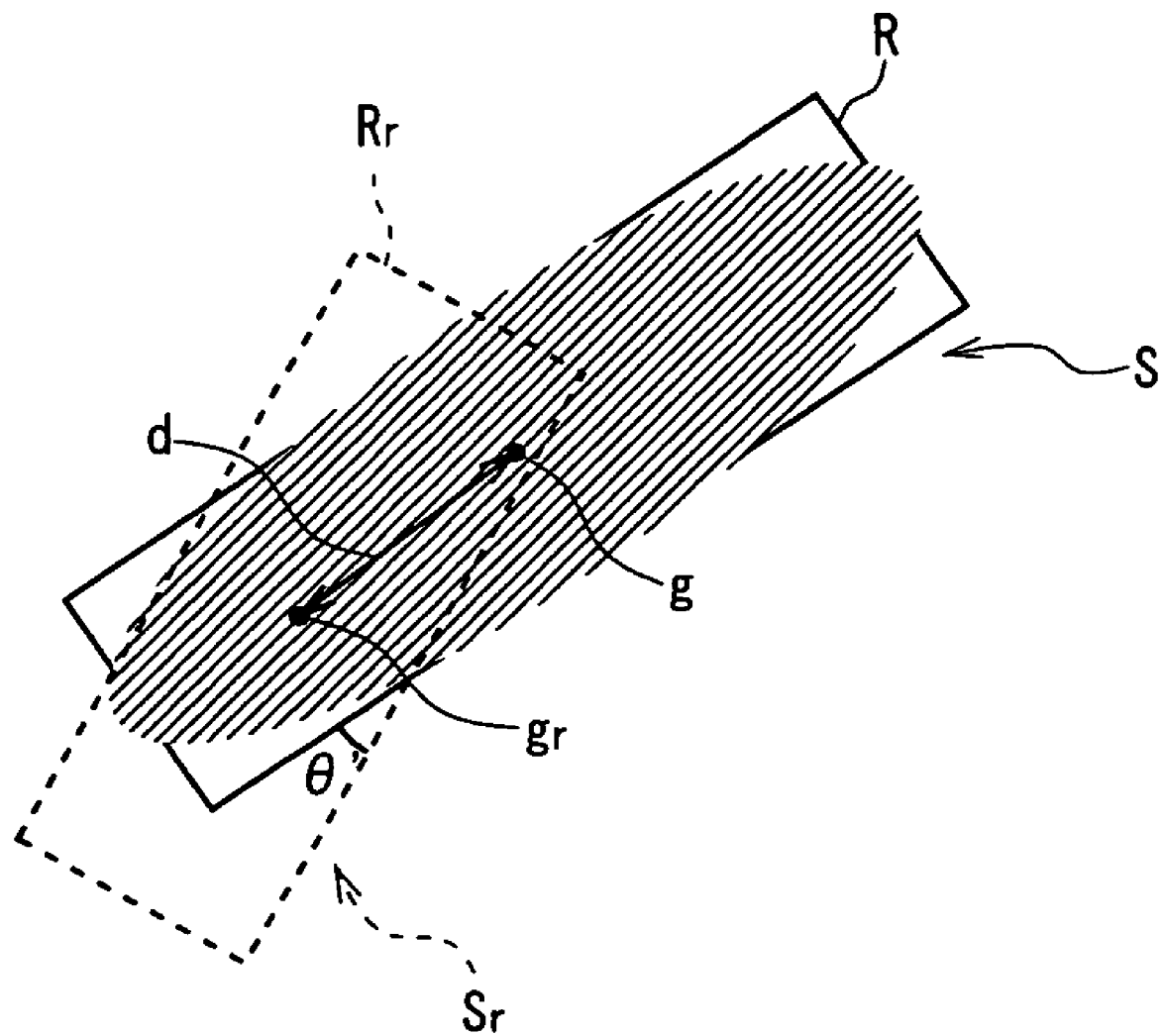
FIG. 14 is a schematic illustration of collation of domains (1).

Now, the collating process of the collating section 16 will be specifically described by referring to FIG. 14. Note that a collating process of collating a single authenticating domain and a single comparative domain will be described here for the purpose of convenience.

FIG. 14 schematically illustrates the positional relationship of a rectangle expressed by rectangle information values (the coordinates of the center ($x_c$, $y_c$), the long side l, the short side w and the angle $\theta$). In FIG. 14, $R_r$ denotes the rectangle of the authenticating domain (defined by broken lines), $S_r$ denotes the area of the authenticating domain as expressed by the long side l and the short side w thereof and $g_r$ denotes the center of the authenticating domain as expressed by the coordinates of the center ($x_c$, $y_c$), whereas R denotes the rectangle of the comparative domain (defined by solid lines), S denotes the area of the comparative domain as expressed by the long side l and the short side w and g denotes the center of the comparative domain as expressed by the coordinates of the center ($x_c'$, $y_c'$).

Additionally, in FIG. 14, d denotes the distance between the center $g_r$ of the authenticating domain and the center g of the comparative domain as computed by means of the formula shown below (to be referred to as inter-center distance hereinafter).

$$d^2 = (x_c - x_c')^2 + (y_c - y_c')^2 \quad (5)$$

Still additionally, in FIG. 14, $\theta'$ denotes difference between the angle $\theta$ between the long side and the axis of the authenticating domain and the angle $\theta$ between the long side l and the axis of the comparative domain, or the difference of the inclination of the rectangle $R_r$ and that of the rectangle R (to be referred to as inter-rectangle inclination difference hereinafter). The ellipse in FIG. 14 indicates the comparative domain.

Referring to FIG. 14, the collating section 16 firstly determines if the center $g_r$ of the authenticating domain is found in the rectangle R of the comparative domain and, at the same time, the center g of the comparative domain is found in the rectangle $R_r$ of the authenticating domain or not according to both the rectangle information values of the authenticating domain and those of the comparative domain.

If it is determined that the centers $g_r$, g of the two domains are found respectively in the rectangles R, $R_r$, the collating section 16 sequentially determines if the inter-center distance d, the inter-rectangle inclination difference $\theta'$ and the difference between the area $S_r$ of the authenticating domain and the area S of the comparative domain (to be referred to as inter-domain-area difference hereinafter) are not greater than respective predetermined threshold values or not.

If all the above differences are not greater than the respective predetermined threshold values, the collating section 16 determines that the authenticating domain and the comparative domain are identical domains. If, on the other hand, one of the above differences is greater than the corresponding threshold value, the collating section 16 determines that the authenticating domain and the comparative domain are not identical domains.

Figure 15:
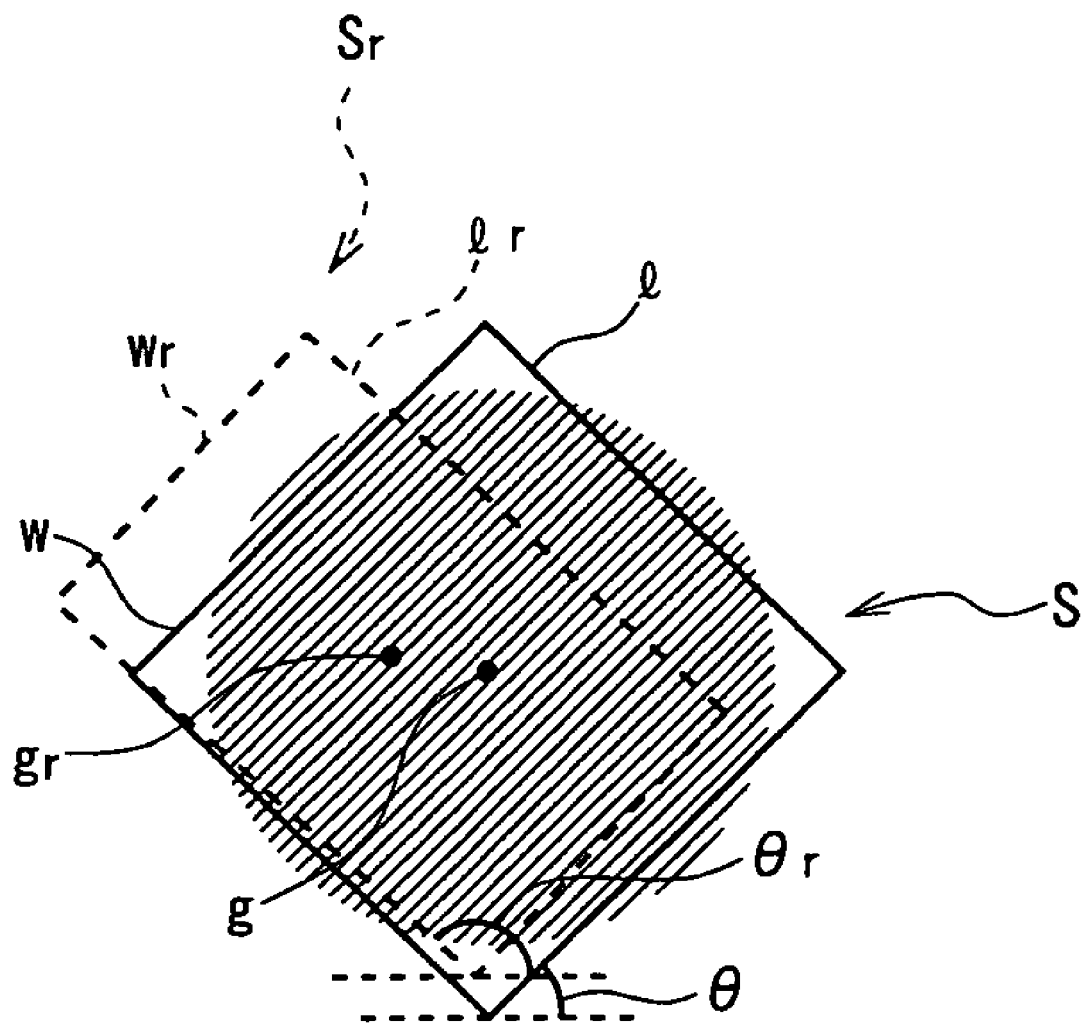
FIG. 15 is a schematic illustration of collation of domains (2).

Note, however, an authenticating domain and a comparative domain can be determined to be different domains, although they are identical domains, when both the rectangle of the authenticating domain $R_r$ and the rectangle of the comparative domain R are close to a square because the inter-rectangle inclination difference θ' can be about 90° as shown in FIG. 15, where the components same as those of FIG. 14 are denoted respectively by the same reference symbols.

Therefore, the collating section 16 is adapted to determine that the authenticating domain and the comparative domain are identical domains when the inter-rectangle inclination difference $θ_r-θ$ (or θ' in FIG. 14) is not smaller than the corresponding threshold value but the inter-domain-area difference is not greater than the corresponding threshold value if both the ratio of the long side $l_r$ to the short side $w_r$ of the authenticating domain and that of the long side l to the short side w of the comparative domain are close to "1" in order to prevent such a determination error from taking place.

In this way, the collating section 16 collates the comparative pattern extracted from the code-added printing paper XPc (FIG. 2(B)) (each of the comparative domains expressed respectively by the corresponding pattern characteristic quantities (rectangle information values)) and the authenticating pattern on the original printing paper OP (each of the authenticating domains expressed respectively by the corresponding pattern characteristic quantities (rectangle information values)) stored in the authenticating pattern code BC (FIG. 2(B)).

If an agreement rate that is higher than a predetermined reference agreement rate is obtained as a result of the collating process, the collating section 16 determines that the code-added printing paper XPc that corresponds to the comparative pattern image is valid original printing paper OP and generates a copying authorizing command COM (FIG. 5) and transmits it to the scanner section 4 (FIG. 4).

As a result, the scanner section 4 is driven to operate in a reflection mode and the printed contents on the original printing paper OP placed on the original table are transmitted to the printer section 5 as printed contents image data D4. Thus, the printer section 5 copies the printed contents of the original printing paper OP (FIG. 2(A)) on a sheet of printing paper.

It is imaginable that there arises a situation where the agreement rate of the comparative domains is low according to the code-added printing paper XPc (FIG. 2(B)) in spite of that the code-added printing paper XPc (FIG. 2(B)) is proper original printing paper OP (FIG. 2(A)).

Such a situation arises mostly when comparative domains that are supposed to be identical with respective corresponding authenticating domains are formed so as to be different from the authenticating domains by way of an inappropriate pattern dividing/region defining process due to various changes including a positional change of the original printing paper OP placed on the original table of the scanner section 4, noises that can arise in the solid state image pickup element and changes with time that occurs on the original printing paper OP (to be referred to changes with time of image pickup state hereinafter).

Figure 16:
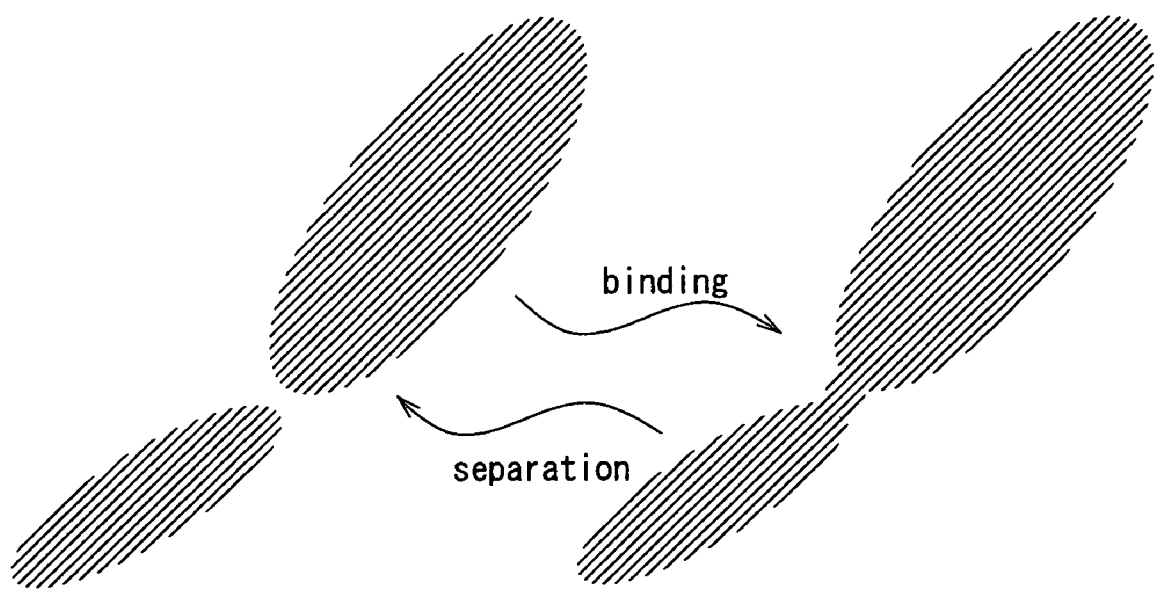
FIG. 16 is a schematic illustration of binding or separation of domains.

FIG. 16 shows a typical example of an inappropriate pattern dividing/region defining process. Referring to FIG. 16, an authenticating domain produced as a result of a pattern dividing/region defining process in a code printing mode can be defined as two different comparative domains in a verification mode and conversely two authenticating domains produced as a result of a pattern dividing/region defining process in a code printing mode can be defined as a single comparative domain in a verification mode. In each of these cases, the comparative domain that is supposed to correspond to an authenticating domain shows a different profile (rectangle information values) and, as a result, a low agreement rate can be produced for comparative domains.

As a counter measure for such a situation, the collating section 16 sequentially executes a binding/collating process and a separating/collating process for each comparative domain that does not agree with the corresponding authenticating domain when the agreement rate is found to be lower than the predetermined agreement rate as a result of the above-described collating process.

In the binding/collating process, adjacent comparative domains are bound together and the bound domain (to be referred to as comparative bound domain hereinafter) and a corresponding authenticating domain are collated. In the separating/collating process, on the other hand, the comparative domain is divided into separate domains and each of the obtained plurality of domains (to be referred to as comparative separated domains hereinafter) and a corresponding authenticating domain are collated.

Of the binding/collating process and the separating/collating process, the binding/collating process will be described specifically by referring to FIG. 17. For the convenience of explanation, a binding/collating process where two adjacent comparative domains are bound to form a comparative bound domain and the comparative bound domain and a corresponding authenticating domain are collated will be described below.

Figure 17:
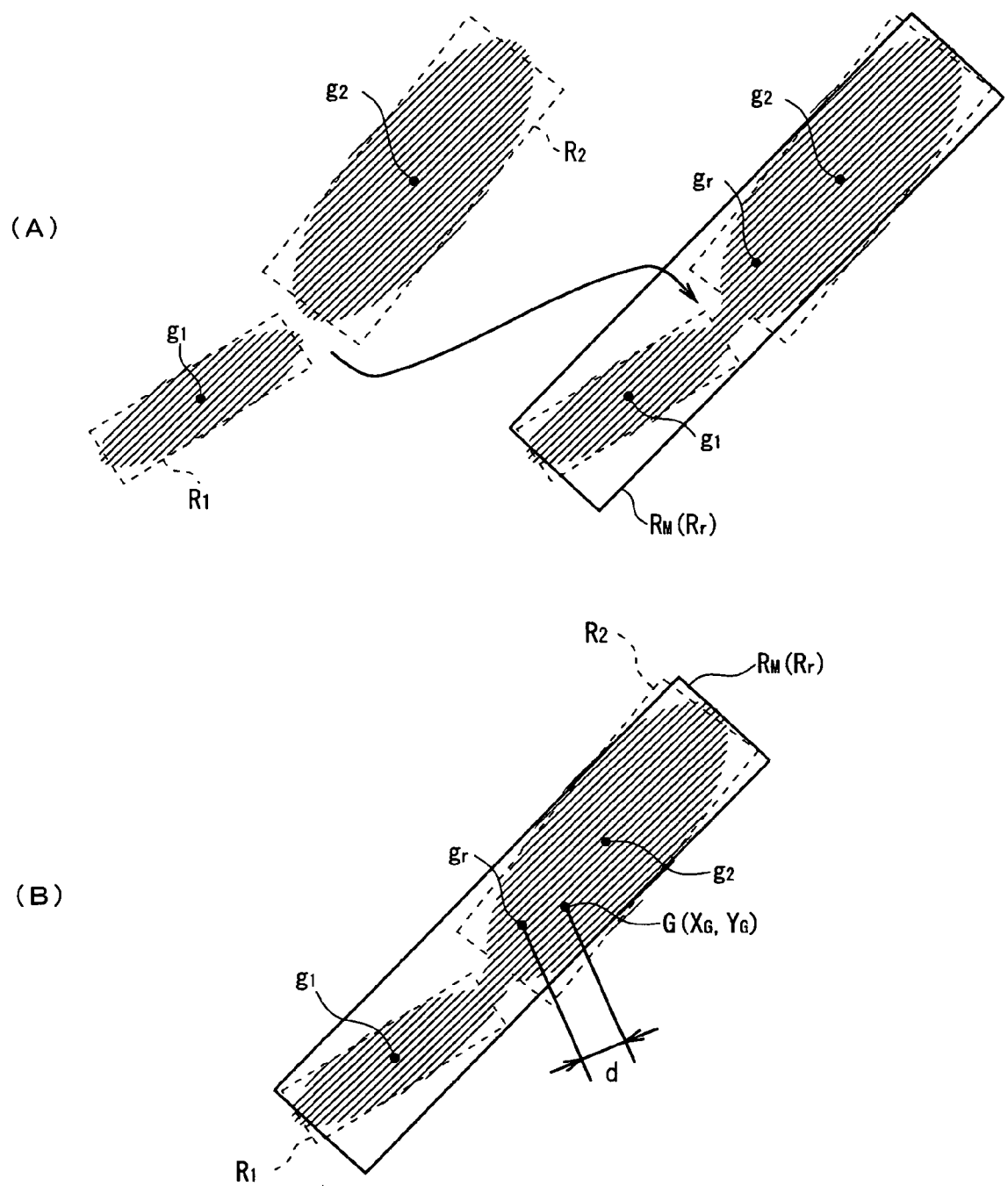
FIG. 17 is schematic illustrations of binding of domains.

As in the case of FIG. 14, FIG. 17 schematically illustrates the positional relationship of a rectangle expressed by rectangle information values (the coordinates of the center ($x_c$, $y_c$), the long side l, the short side w and the angle θ). In FIG. 17, $R_1$ and $R_2$ denote respectively the rectangles of the comparative domains (defined by broken lines) and $g_1$ and $g_2$ denote respectively the centers of the comparative domains as expressed by the coordinates of the centers ($x_c$, $y_c$), whereas $R_M$ ($R_r$) denotes the rectangle of the comparative bound domain (corresponding authenticating domain) (defined by solid lines) and $g_r$ denotes the center of the corresponding authenticating domain as expressed by the coordinates of the center ($x_c$, $y_c$).

Additionally, in FIG. 17, G denotes center of gravity ($x_G$, $y_G$) of the comparative bound domain as computed by means of the formula shown below;

$$X_c = \frac{\sum_{i=1}^{n} l_i w_i x_{ci}}{\sum_{i=1}^{n} l_i w_i} \quad (6)$$

$$Y_c = \frac{\sum_{i=1}^{n} l_i w_i y_{ci}}{\sum_{i=1}^{n} l_i w_i},$$

where i=(1−n)

and d denotes the distance between the center $g_r$ of the authenticating domain and the center of gravity of the comparative bound domain and that of the corresponding authenticating domain as computed by means of the formula (5). The ellipses in FIG. 17 show separated comparative domains and a comparative bound domain formed by binding the separated comparative domains.

Referring to FIG. 17, the collating section 16 determines if the centers $g_1$ and $g_2$ of the comparative domains to be bound are found in the rectangle $R_r$ of the corresponding authenticating domain (or the rectangle $R_M$ of the comparative bound domain formed by binding the comparative domains) or not. If it is determined that the centers $g_1$ and $g_2$ are found in the rectangle $R_r$, the collating section 16 determines the center of gravity $G(x_G, y_G)$ of the comparative bound domain obtained as a result of binding the comparative domains and then the distance d between the center of gravity G and the center $g_r$ of the corresponding authenticating domain.

If the inter-center distance d is not greater than a predetermined threshold value, the collating section 16 determines that the comparative bound domain obtained as a result of binding the separated comparative domains is identical with the corresponding authenticating domain.

In this way, the collating section 16 binds the comparative domains that do not agree with the corresponding authenticating domain and collates the comparative bound domain and the corresponding authenticating domain.

Now, the separating/collating process will be described specifically by referring to FIG. 18. For the convenience of explanation, a separating/collating process of a comparative domain to be separated into two comparative domains and corresponding authenticating domains will be described below.

As in the case of FIG. 14, FIG. 18 schematically illustrates the positional relationship of a rectangle expressed by rectangle information values (the coordinates of the center ($x_c$, $y_c$), the long side l, the short side w and the angle θ). In FIG. 18, R denotes the rectangle of the comparative domain (defined by broken lines) and g denotes the center of the comparative domain as expressed by the coordinates of the center ($x_c$, $y_c$), whereas $R_{S1}$ and $R_{S2}$ ($R_{r1}$ and $R_{r2}$) denote respectively the rectangles of the comparative separated domains (authenticating domains) (defined by solid lines) and $g_{r1}$ and $g_{r2}$ denote respectively the centers of the authenticating domains as expressed by the coordinates of the centers ($x_c$, $y_c$).

Additionally, in FIG. 18, G denotes center of gravity ($x_G$, $y_G$) of each of comparative separated domains as computed by means of the formula (6) above and d denotes the inter-center distance between the center of gravity G of the comparative separated domains as computed by means of the formula (5) and the center g of the comparative domain. The ellipses in FIG. 18 show a bound comparative domain and comparative separated domains formed by separating the bound comparative domain.

Referring to FIG. 18, the collating section 16 determines if the centers $g_{r1}$ and $g_{r2}$ of the authenticating domains are found in the rectangle R of the comparative domain before it is divided and separated into two comparative domains or not. If it is determined that the centers $g_{r1}$ and $g_{r2}$ are found in the rectangle R, the collating section 16 determines the center of gravity $G(x_G, y_G)$ of the comparative separated domains obtained as a result of separating the comparative domain and then the inter-center distance d between the center of gravity G and the center g of the comparative domain.

If the inter-center distance d is not greater than a predetermined threshold value, the collating section 16 determines that the comparative separated domains obtained as a result of separating the bound comparative domains are identical respectively with the corresponding authenticating domains.

In this way, the collating section 16 divides and separates the comparative domain that does not agree with the corresponding authenticating domains and collates each of the comparative separated domains and the corresponding authenticating domain.

Thus, since the collating section 16 is adapted to bind adjacently located domains or separates a domain to correct the domain or domains, whichever appropriate, and collate each of the domains or the domain and the corresponding authenticating domain in order to eliminate the influence of any change that has taken place before an image of the original is picked up, it is possible to remarkably improve the reliability of the collating operation.

Figure 19:
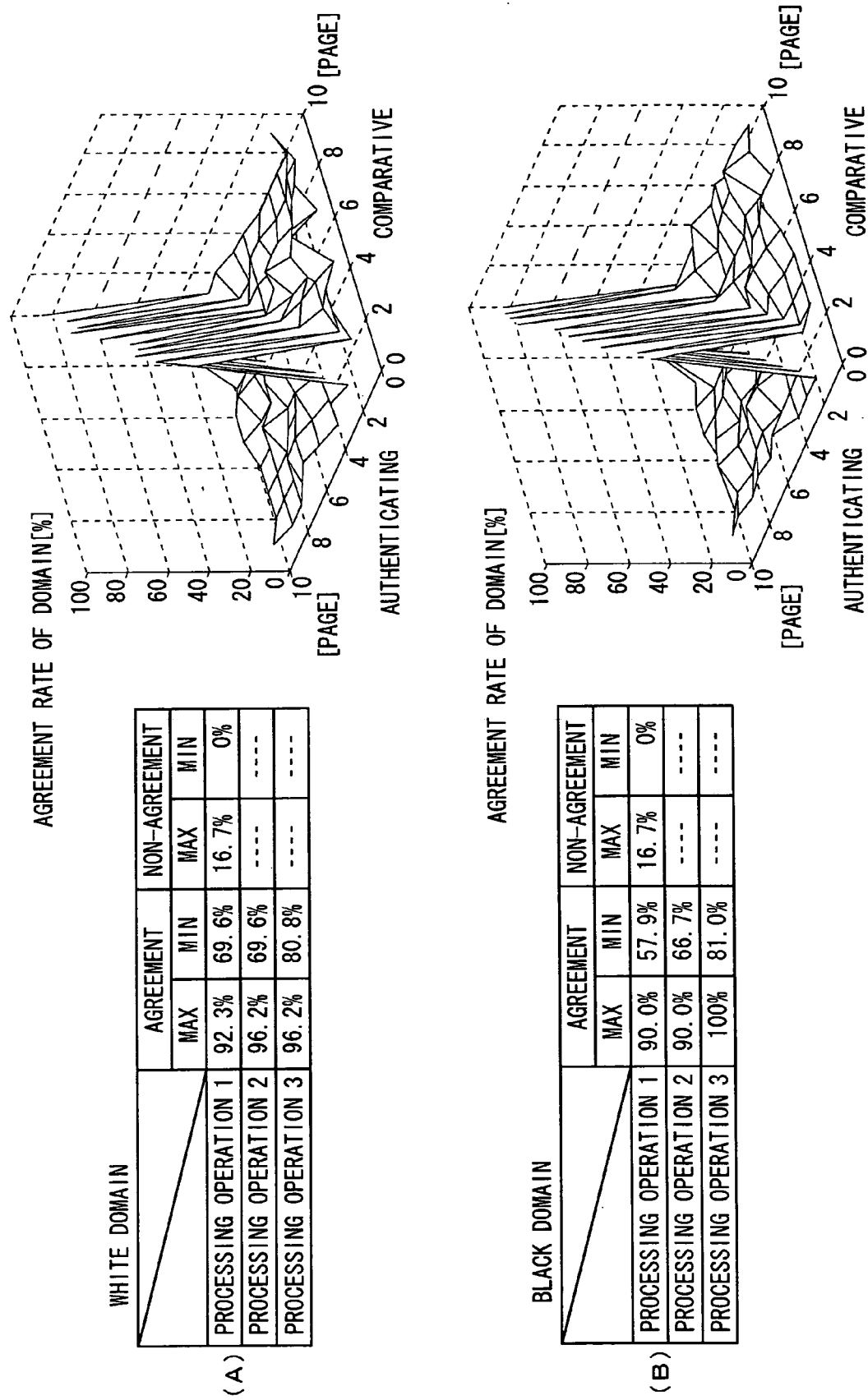
FIG. 19 is schematic illustrations of the results of an experiment (2).

FIG. 19 is a schematic illustration of the results of an experiment. In the experiment of FIG. 19, a processing operation where neither a binding/collating process nor a separating/collating process are executed (processing operation 1), a processing operation where a binding/collating process is executed (processing operation 2) and a processing operation where a binding/collating process and a separating/collating process are respectively executed (processing operation 3) are repeated ten times.

As clear from FIG. 19, it is possible to remarkably improve the reliability of the collating operation by executing a binding/collating process and a separating/collating process.

Second Processing Procedure

Now, the processing operations of the control section 2 that follow the second processing procedure will be described.

Figure 20:
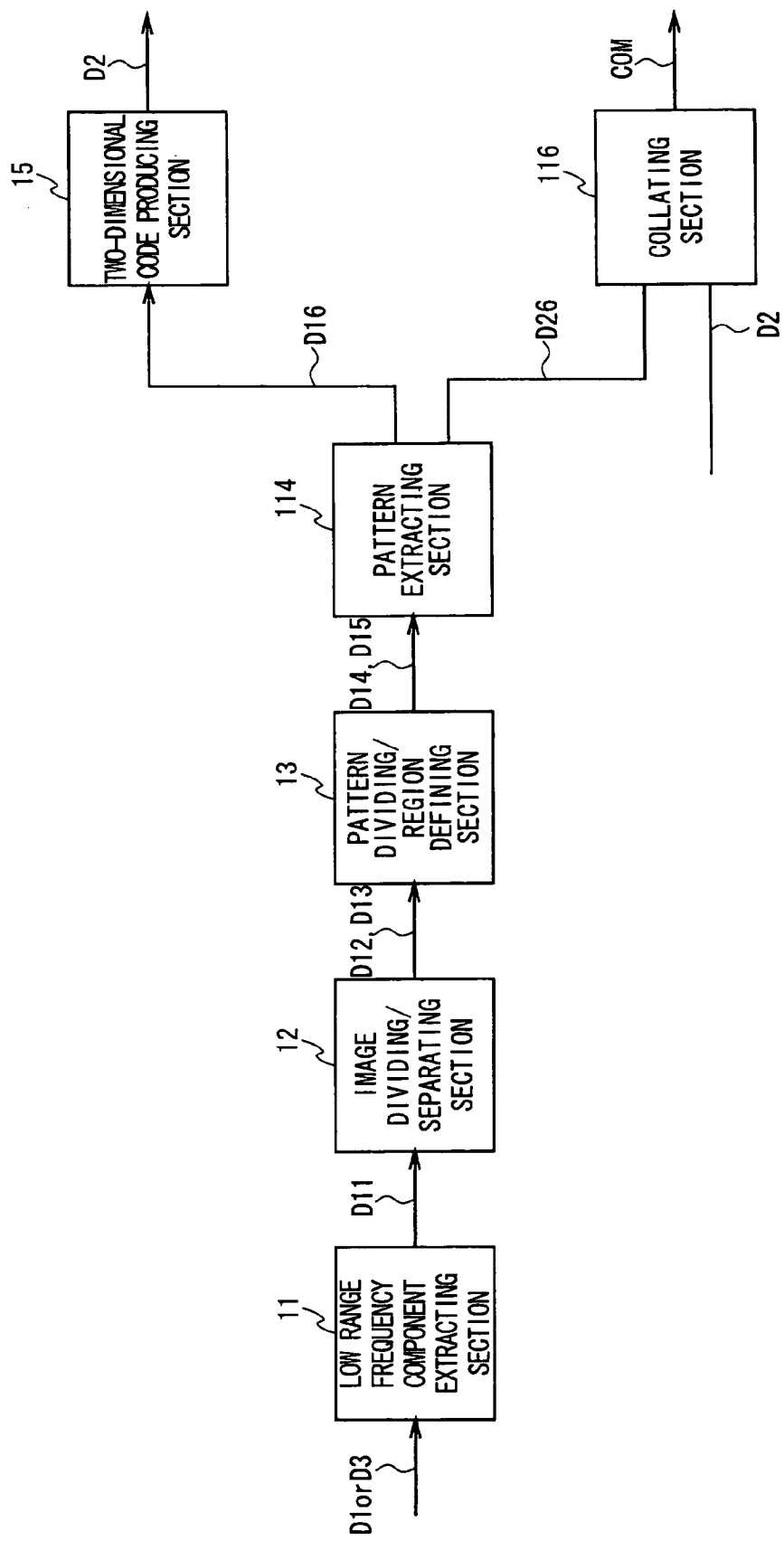
FIG. 20 is a block diagram of the control section of the first embodiment of the invention, illustrating the second processing procedure thereof.
Figure 21:
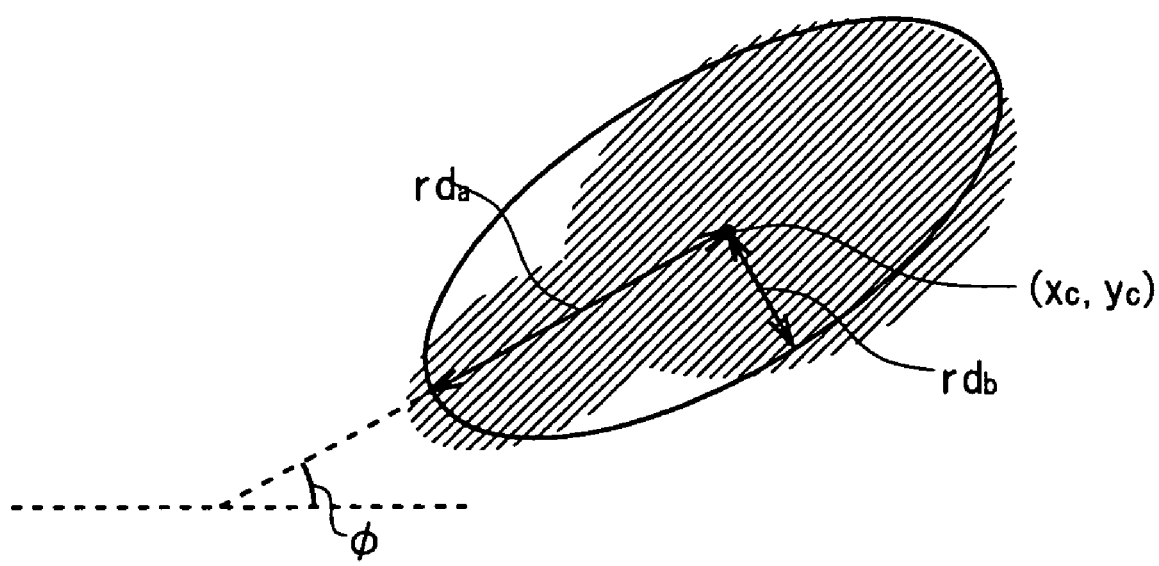
FIG. 21 is a schematic illustration of computation of a characteristic quantity using similarity of ellipses.

FIG. 20 is a schematic block diagram of the control section 2 of the first embodiment of the invention adapted to follow the second processing procedure thereof. Referring to FIG. 20, the low range frequency component extracting section 11, the image dividing/separating section 12, the pattern dividing/region defining section 13 and the two-dimensional code producing section 15 of the control section 2 operate exactly same as they do when they follow the first processing procedure as described above by referring to FIG. 5. However, the pattern extracting section 114 and the collating section 116 of the control section 2 operate differently from their counterparts that are adapted to follow the first processing procedure.

Now, the pattern extracting process of the pattern extracting section 114 and the collating process of the collating section 116 will be described below in detail.

The pattern extracting section 114 operates to approximate each of the white domains WD ($WD_1$ through $WD_n$) and each of the black domains BD ($BD_1$ through $BD_n$) to an ellipse and hence differs from the pattern extracting section 14 that operates to approximate each of the white domains WD and each of the black domains BD to an rectangle.

More specifically, the pattern extracting section 114 computes the characteristic quantity of each domain (white domain WD or black domain BD) by computationally determining the coordinates of the center ($x_c$, $y_c$), the major axis $rd_a$, the minor axis $rd_b$ and the angle θ between the major axis $rd_a$ and the horizontal axis (to be referred to as ellipse information values hereinafter).

In other words, the pattern extracting section 114 computationally determines the characteristic quantity of each of the white domains WD ($WD_1$ through $WD_n$) in the white domain data D14 supplied from the pattern dividing/region defining section 13. If the luminance value of the white domain is I(x, y), it computes the primary image moment $MA_{00}$, the secondary image moments $MA_{10}$, $MA_{01}$ and the tertiary image moments $MA_{20}$, $MA_{02}$, $MA_{11}$ according to the image moment $MA_{pq}$ being defined by means of the formula shown below.

$$MA_{pq} = \sum_y \sum_x x^p y^p I(x, y) \qquad (7)$$

Then, the pattern extracting section 114 computes the coordinates of the center $(x_c, y_c)$, using these primary, secondary and tertiary image moments $MA_{00}$, $MA_{10}$, $MA_{01}$, $MA_{20}$, $MA_{02}$, $MA_{11}$ and the formula (8) shown below.

$$x_c = \frac{MA_{10}}{MA_{00}} \qquad (8)$$
$$y_c = \frac{MA_{01}}{MA_{00}}$$

The pattern extracting section 114 then computes the major axis $rd_a$ and the minor axis $rd_b$, using the respective formulas (9) shown below.

$$rd_a = \sqrt{6\left(a + c + \sqrt{b^2 + (a-c)^2}\right)} \qquad (9)$$
$$rd_b = \sqrt{6\left(a + c - \sqrt{b^2 + (a-c)^2}\right)}$$

Finally, the pattern extracting section 114 computes the angle $\Phi$, using the formula (10) shown below.

$$\Phi = \frac{1}{2}\tan^{-1}\left[\frac{b}{a-c}\right] \qquad (10)$$
$$a = \frac{MA_{20}}{MA_{00}} - x_c^2$$

where $$b = 2\left[\frac{MA_{11}}{MA_{00}} - x_c y_c\right]$$
$$c = \frac{MA_{02}}{MA_{00}} - y_c^2$$

In this way, the pattern extracting section 114 computationally determines the characteristic quantities (ellipse information values) of each of the white domains WD ($WD_1$ through $WD_n$).

Similarly, the pattern extracting section 114 computationally determines the characteristic quantities (ellipse information values) of each of the black domains BD ($BD_1$ through $BD_n$) in the black domain data D15 supplied from the pattern dividing/region defining section 13, using the above formulas (7) through (10), as in the case of the white domains WD ($WD_1$ through $WD_n$).

Since the computed characteristic quantities of the white domains WD ($WD_1$ through $WD_n$) and the black domains BD ($BD_1$ through $BD_n$) represent the characteristic profile of the patterns contained in the region pattern image IM1 (FIG. 6(A)) (to be referred to as pattern characteristic quantities hereinafter), the obtained characteristic quantities represent the outcome of the operation of extracting the patterns contained in the region pattern image IM1.

Then, if the current operation is being conducted in a code printing mode, the pattern extracting section 114 transmits the pattern characteristic quantities to the two-dimensional code producing section 15 as data on the authenticating pattern (to be referred to as authenticating pattern data hereinafter) D16 (FIG. 20). If, on the other hand, the current operation is being conducted in a verification mode, the pattern extracting section 114 transmits the pattern characteristic quantities to the collating section 116 as data on the comparative pattern (to be referred to as comparative pattern data hereinafter) D26 (FIG. 20).

In this way, the pattern extracting section 114 extracts the pattern data (authenticating pattern or the comparative pattern) in the specified region AR (FIG. 2(A)) by computationally determining the pattern characteristic quantities from the ellipse information values of the white domains WD and the black domains BD.

If the range of data that ellipse information values (the coordinates of the center $(x_c, y_c)$, the major axis $rd_a$, the minor axis $rd_b$ and the angle $\Phi$ between the major axis $rd_a$ and the horizontal axis) can take for a white domain WD or black domain BD is assumed to be such as the one shown in FIG. 12(A), the data sizes of ellipse information values are equivalent to those shown in FIG. 12(A) and the data sizes of pattern characteristic quantities (ellipse information values for a white domain WD and a black domain BD) are equivalent to those shown in FIG. 12(B).

Collating Process

The collating section 116 sequentially collates each of the comparative domains (white domains WD and the black domains BD) expressed by the corresponding pattern characteristic quantities (ellipse information values) in the comparative pattern data D26 supplied from the pattern extracting section 114 and the corresponding one of the authenticating domains (white domains WD and the black domains BD) expressed by the corresponding pattern characteristic quantities (ellipse information values) in the authenticating pattern code data D2 given from the scanner section 4.

Figure 22:
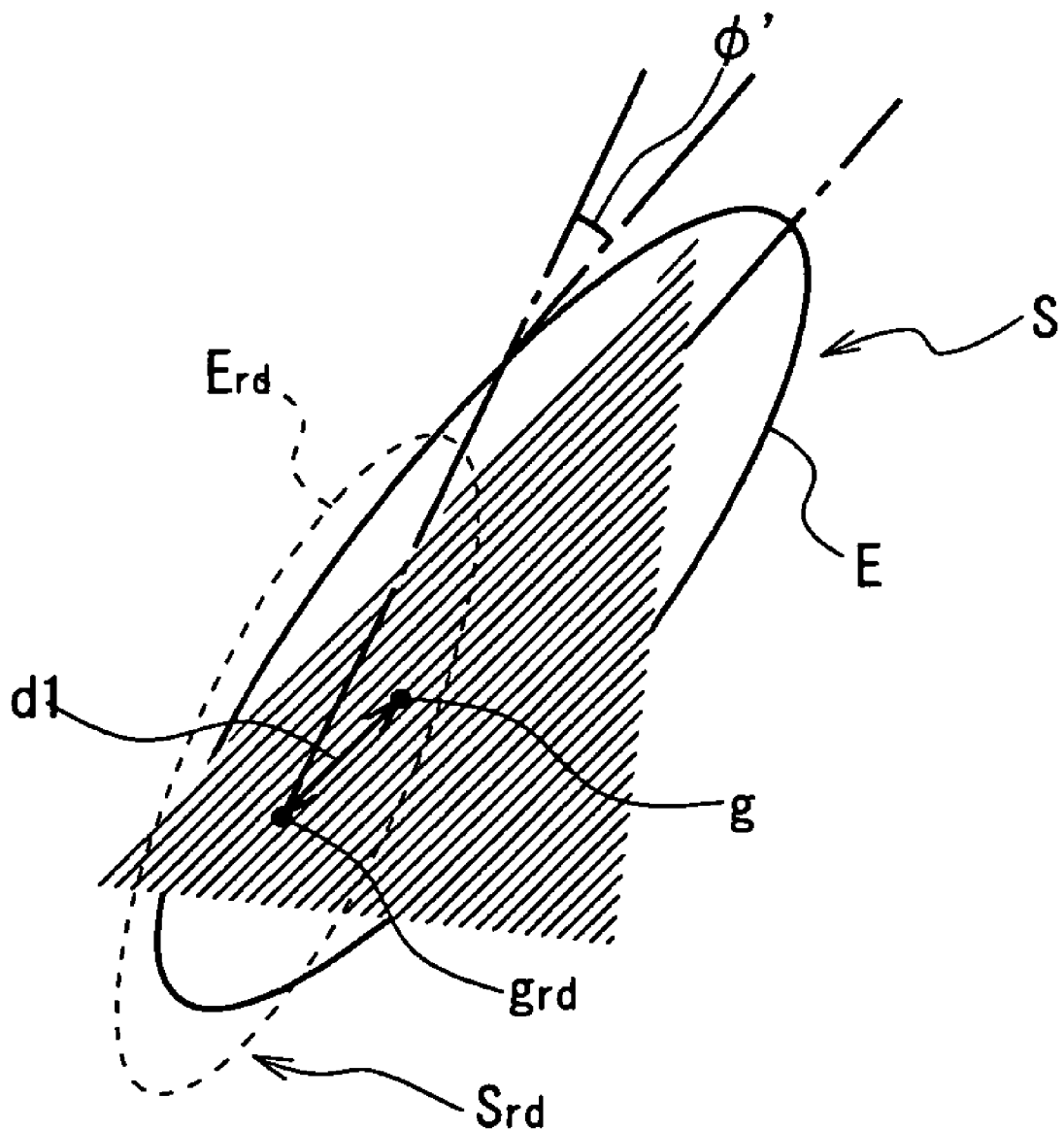
FIG. 22 is a schematic illustration of collation of domains (1) using similarity of ellipses.

Now, the collating process of the collating section 116 will be specifically described by referring to FIG. 22. Note that a collating process of collating a single authenticating domain and a single comparative domain will be described here for the purpose of convenience.

FIG. 22 schematically illustrates the positional relationship of an ellipse expressed by ellipse information values (the coordinates of the center $(x_c, y_c)$, the major axis $rd_a$, the minor axis $rd_b$ and the angle $\Phi$ between the major axis $rd_a$ and the horizontal axis). In FIG. 22, $E_{rd}$ denotes the ellipse of the authenticating domain (defined by broken lines), $S_{rd}$ denotes the area of the authenticating domain as expressed by the major axis $rd_a$ and the minor axis $rd_b$, $g_{rd}$ denotes the center of the authenticating domain as expressed by the coordinates of the center $(x_c, y_c)$, whereas E denotes the ellipse of the comparative domain (defined by solid lines), S denotes the area of the comparative domain as expressed by the major axis $rd_a$ and the minor axis $rd_b$ of the comparative domain and g denotes the center of the comparative domain as expressed by the coordinates of the center $(x_c', y_c')$.

Additionally, in FIG. 22, d1 denotes the distance between the center $g_{rd}$ of the authenticating domain and the center g of the comparative domain as computed by means of the formula shown below (to be referred to as inter-center distance hereinafter).

$$d1^2 = (x_c - x_c')^2 + (y_c - y_c')^2 \qquad (11)$$

Still additionally, in FIG. 22, $\Phi'$ denotes difference between the angle $\Phi$ between the major axis $rd_a$ the horizontal axis of the authenticating domain and the angle $\Phi$ between the major axis $rd_a$ and the horizontal axis of the comparative domain, or the difference of the inclination of the ellipse $E_{rd}$ and that of the ellipse E (to be referred to as inter-ellipse inclination difference hereinafter). The triangle in FIG. 22 indicates the comparative domain.

Referring to FIG. 22, the collating section 116 firstly determines if the center $g_{rd}$ of the authenticating domain is found in the ellipse E of the comparative domain and, at the same time, the center g of the comparative domain is found in the ellipse $E_{rd}$ of the authenticating domain or not according to both the ellipse information values of the authenticating domain and those of the comparative domain.

If it is determined that the centers $g_{rd}$, g of the two domains are found respectively in the ellipses E, $E_{rd}$, the collating section 116 sequentially determines if the inter-center distance d, the inter-ellipse inclination difference Φ' and the difference between the area $S_{rd}$ of the authenticating domain and the area S of the comparative domain (to be referred to as inter-domain-area difference hereinafter) are not greater than respective predetermined threshold values or not.

If all the above differences are not greater than the respective predetermined threshold values, the collating section 116 determines that the authenticating domain and the comparative domain are identical domains. If, on the other hand, one of the above differences is greater than the corresponding threshold value, the collating section 116 determines that the authenticating domain and the comparative domain are not identical domains.

Figure 23:
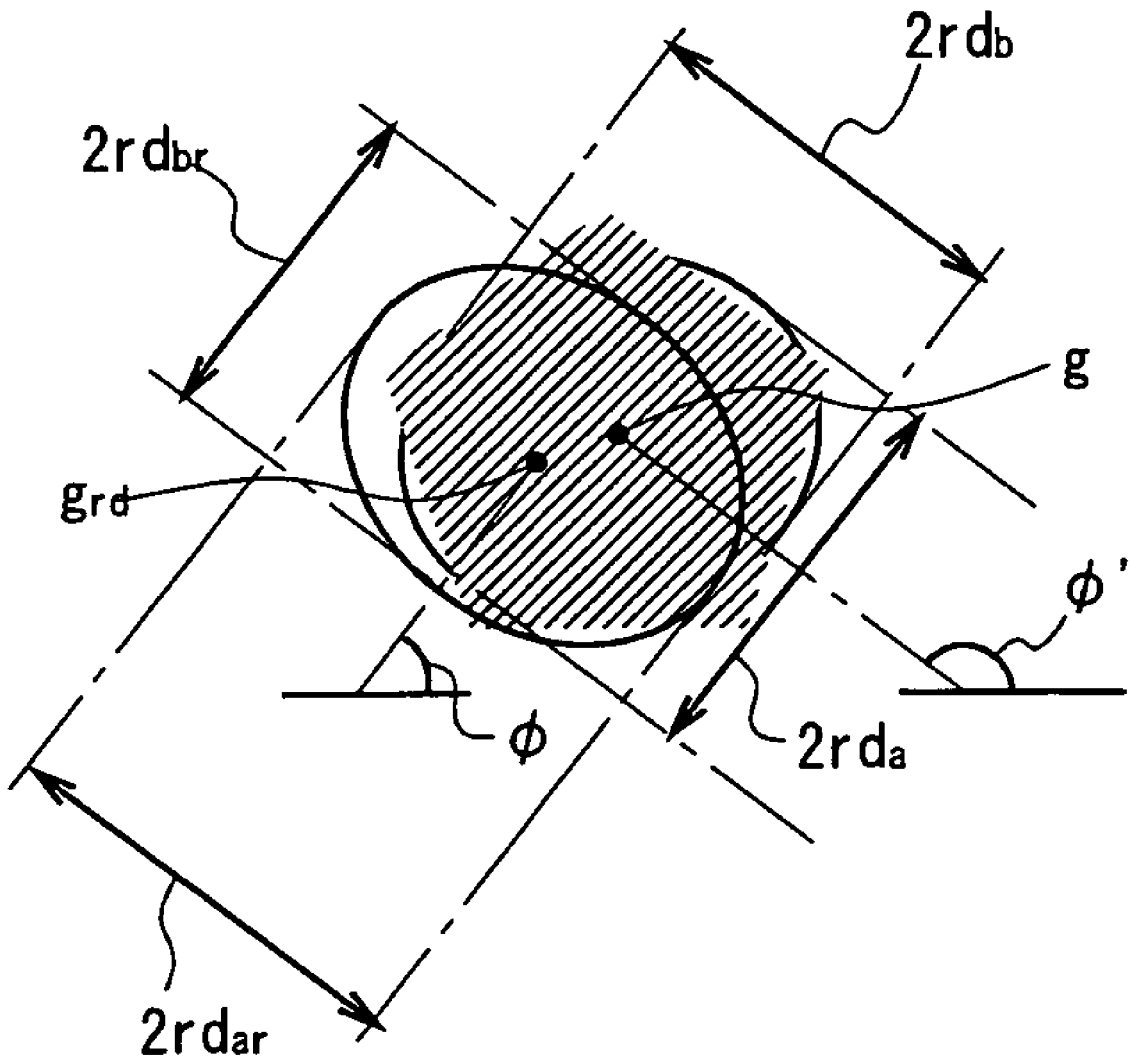
FIG. 23 is a schematic illustration of collation of domains (2) using similarity of ellipses.

Note, however, an authenticating domain and a comparative domain are caused to be determined to be different domains, although they are identical domains, when both the ellipse $E_{rd}$ of the authenticating domain and the ellipse E of the comparative domain are close to a circle because the inter-rectangle inclination difference Φ' can be about 90° as shown in FIG. 23, where the components same as those of FIG. 22 are denoted respectively by the same reference symbols.

Therefore, the collating section 116 is adapted to determine that the authenticating domain and the comparative domain are identical domains when both the ratio of the major axis $rd_a$ to the minor axis $rd_b$ of the authenticating domain and the ratio of the major axis $rd_a$ to the minor axis $rd_b$ of the comparative domain are close to "1" if the inter-ellipse inclination difference $\Phi_{rd}-\Phi$ (or Φ' in FIG. 23) is not smaller than the corresponding threshold value.

In this way, the collating section 116 collates the comparative pattern extracted from the code-added printing paper XPc (FIG. 2(B)) (each of the comparative domains expressed respectively by the corresponding pattern characteristic quantities (ellipse information values)) and the authenticating pattern on the original printing paper OP (each of the authenticating domains expressed respectively by the corresponding pattern characteristic quantities (ellipse information values)) stored in the authenticating pattern code BC (FIG. 2(B)).

If an agreement rate that is higher than a predetermined reference agreement rate is obtained as a result of the collating process, the collating section 116 determines that the code-added printing paper XPc that corresponds to the comparative pattern image is valid original printing paper OP and generates a copying authorizing command COM (FIG. 5) and transmits it to the scanner section 4 (FIG. 4).

As a result, the scanner section 4 is driven to operate in a reflection mode and the printed contents on the original printing paper OP placed on the original table are transmitted to printer section 5 as printed contents image data D4. Thus, the printer section 5 copies the printed contents of the original printing paper OP (FIG. 2(A)) on a sheet of printing paper.

Figure 24:
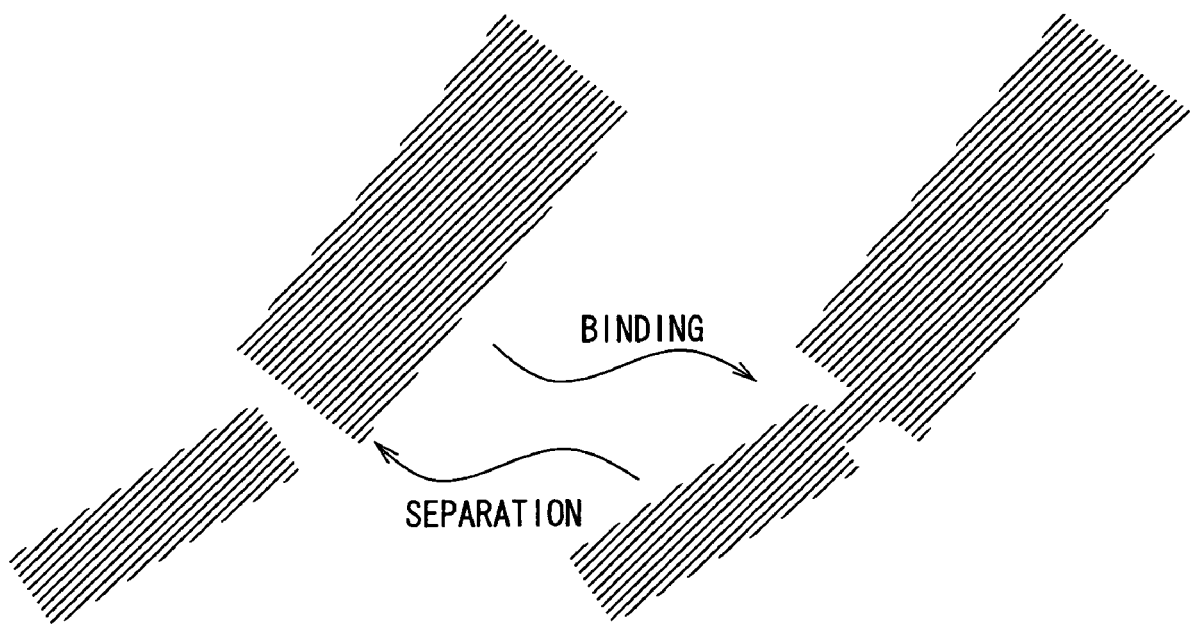
FIG. 24 is a schematic illustration of binding or separation of domains.

FIG. 24 shows a typical example of an inappropriate pattern dividing/region defining process due to changes with time of image pickup state. Referring to FIG. 24, an authenticating domain produced in a code printing mode can be defined as two different comparative domains in a verification mode and conversely two authenticating domains produced in a code printing mode can be defined as a single comparative domain in a verification mode. In each of these cases, the comparative domain that is supposed to correspond to an authenticating domain shows a different profile (ellipse information values) and, as a result, a low agreement rate can be produced for comparative domains.

As a counter measure for such a situation, the collating section 116 sequentially executes a binding/collating process and a separating/collating process for each comparative domain that does not agree with the corresponding authenticating domain when the agreement rate is found to be lower than the predetermined agreement rate as a result of the above-described collating process.

In the binding/collating process, adjacent comparative domains are bound together and the bound domain (to be referred to as comparative bound domain hereinafter) and a corresponding authenticating domain are collated. In the separating/collating process, on the other hand, the comparative domain is divided into separate domains and each of the obtained plurality of domains (to be referred to as comparative separated domains hereinafter) and a corresponding authenticating domain are collated.

Of the binding/collating process and the separating/collating process, the binding/collating process will be described specifically by referring to FIG. 25. For the convenience of explanation, a binding/collating process where two adjacent comparative domains are bound to form a comparative bound domain and the comparative bound domain and a corresponding authenticating domain are collated will be described below.

Figure 25:
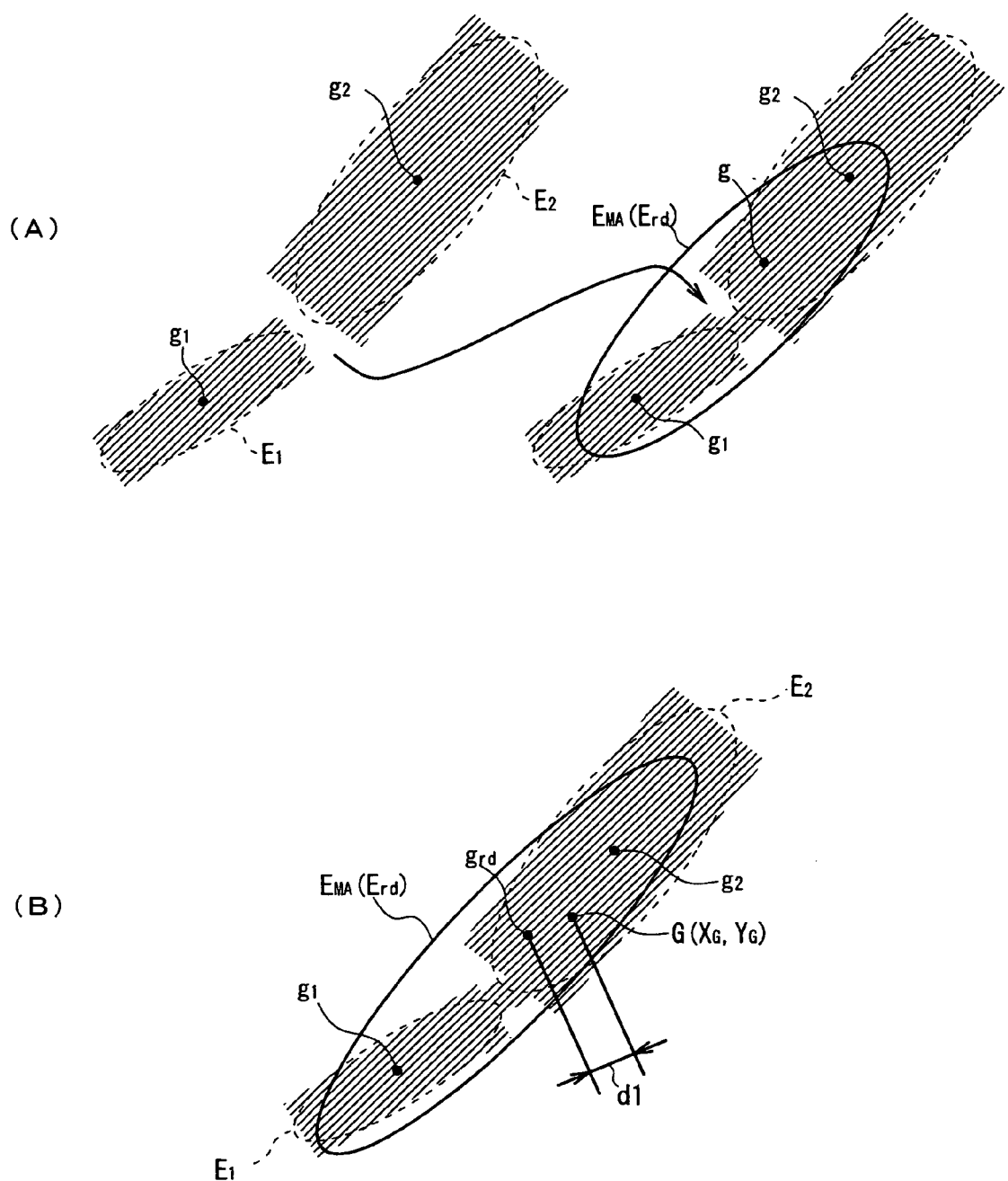
FIG. 25 is schematic illustrations of binding of domains, using similarity of ellipses.

As in the case of FIG. 22, FIG. 25 schematically illustrates the positional relationship of an ellipse expressed by ellipse information values (the coordinates of the center $(x_c, y_c)$, the major axis $rd_a$, the minor axis $rd_b$ and the angle Φ between the major axis $rd_a$ and the horizontal axis). In FIG. 25, $E_1$ and $E_2$ denote respectively the ellipses of the comparative domains (defined by broken lines) and $g_1$ and $g_2$ denote respectively the centers of the comparative domains as expressed by the coordinates of the centers $(x_c, y_c)$, whereas $E_{MA}$ ($E_{rd}$) denotes the ellipse of the comparative bound domain (corresponding authenticating domain) (defined by solid lines) and $g_{rd}$ denotes the center of the corresponding authenticating domain as expressed by the coordinates of the center $(x_c, y_c)$.

Additionally, in FIG. 25, G denotes center of gravity $(x_G, y_G)$ of the comparative bound domain as computed by means of the formula shown below;

$$X_c = \frac{\sum_{i=1}^{n} \pi rd_{ai} rd_{bi} x_{ci}}{\sum_{i=1}^{n} \pi rd_{ai}^{r} rd_{bi}}$$

$$Y_c = \frac{\sum_{i=1}^{n} \pi rd_{ai} rd_{bi} y_{ci}}{\sum_{i=1}^{n} \pi rd_{ai} rd_{bi}},$$

(12)

where i=(1−n)

and d1 denotes the inter-center distance between the center of gravity G of the comparative bound domain and the center $g_{rd}$ of the authenticating domain as computed by means of the formula (11). The rectangles in FIG. 25 show separated comparative domains and a comparative bound domain formed by binding the separated comparative domains.

Referring to FIG. 25, the collating section 116 determines if the centers $g_1$ and $g_2$ of the comparative domains to be bound are found in the ellipse $E_{rd}$ of the corresponding authenticating domain (or the ellipse $E_{MA}$ of the comparative bound domain formed by binding the comparative domains) or not. If it is determined that the centers $g_1$ and $g_2$ are found in the ellipse $E_{rd}$, the collating section 116 determines the center of gravity $G(x_G, y_G)$ of the comparative bound domain obtained as a result of binding the comparative domains and then the distance d between the center of gravity G and the center $g_{rd}$ of the corresponding authenticating domain.

If the inter-center distance d is not greater than a predetermined threshold value, the collating section 116 determines that the comparative bound domain obtained as a result of binding the separated comparative domains is identical with the corresponding authenticating domain.

In this way, the collating section 116 binds the comparative domains that do not agree with the corresponding authenticating domain and collates the comparative bound domain and the corresponding authenticating domain.

Now, the separating/collating process will be described specifically by referring to FIG. 26. For the convenience of explanation, a separating/collating process of a comparative domain to be separated into two comparative separated domains and corresponding authenticating domains will be described below.

Figure 26:
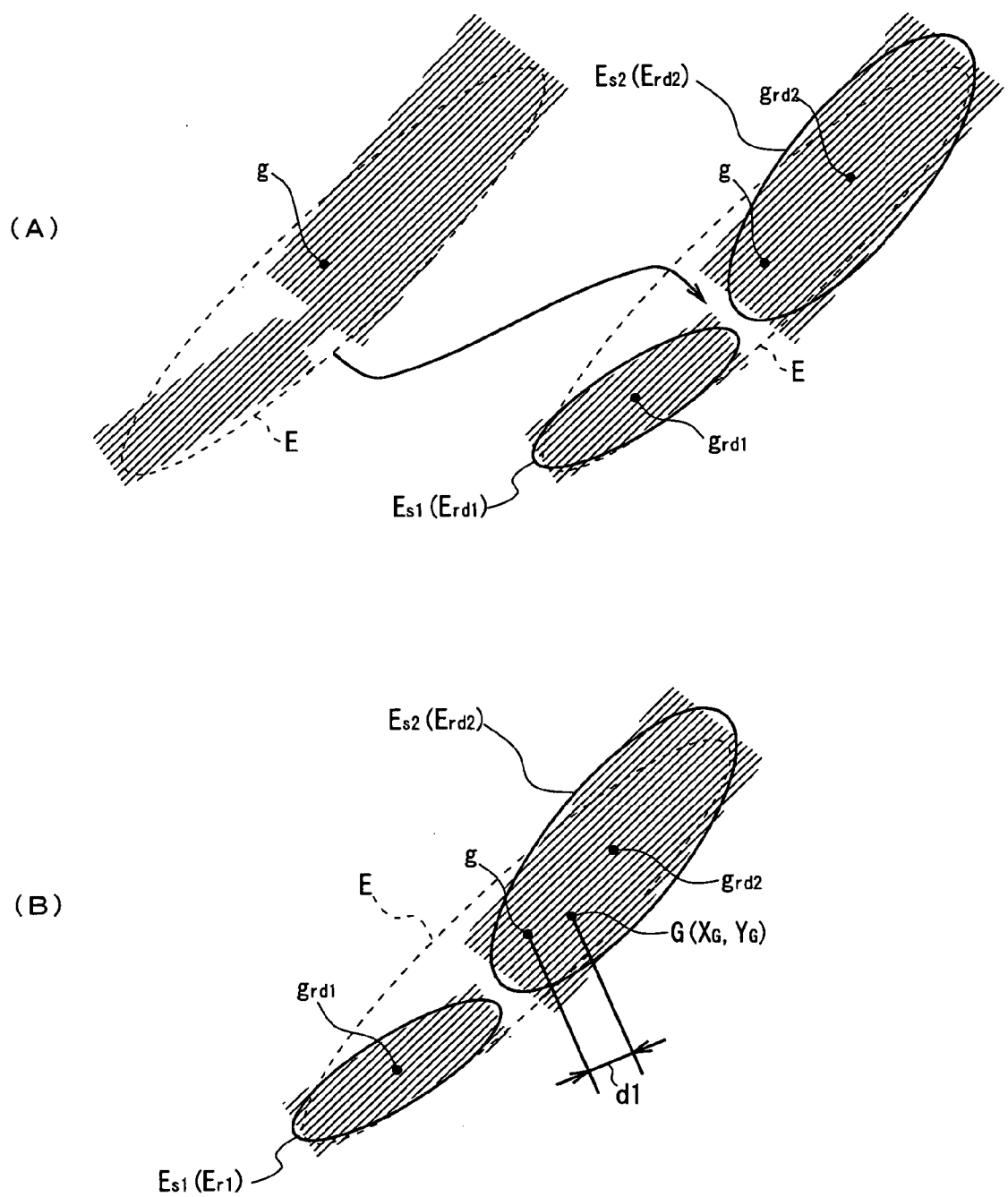
FIG. 26 is are schematic illustrations of binding of domains, using similarity of ellipses.

As in the case of FIG. 22, FIG. 26 schematically illustrates the positional relationship of an ellipse expressed by ellipse information values (the coordinates of the center $(x_c, y_c)$, the major axis $rd_a$, the minor axis $rd_b$ and the angle $\Phi$ between the major axis $rd_a$ and the horizontal axis). In FIG. 26, E denotes the ellipse of the comparative domain (defined by broken lines) and g denotes the center of the comparative domain as expressed by the coordinates of the center $(x_c, y_c)$, whereas $E_{S1}$ and $E_{S2}$ ($E_{rd1}$ and $E_{rd2}$) denote respectively the ellipses of the comparative separated domains (authenticating domains) (defined by solid lines) and $g_{rd1}$ and $g_{rd2}$ denote respectively the centers of the authenticating domains as expressed by the coordinates of the centers $(x_c, y_c)$.

Additionally, in FIG. 26, G denotes center of gravity $(x_G, y_G)$ of each of comparative separated domains as computed by means of the formula (12) above and d1 denotes the inter-center distance between the center G of the comparative separated domains as computed by means of the formula (11) and the center g of the comparative domain. The rectangles in FIG. 26 show a bound comparative domain and comparative separated domains formed by separating the bound comparative domain.

Referring to FIG. 26, the collating section 116 determines if the centers $g_{rd1}$ and $g_{rd2}$ of the authenticating domains are found in the ellipse E of the comparative domain before it is divided and separated into two comparative domains or not. If it is determined that the centers $g_{rd1}$ and $g_{rd2}$ are found in the ellipse E, the collating section 116 determines the center of gravity $G(x_G, y_G)$ of the comparative separated domains obtained as a result of separating the comparative domain and then the distance d between the center of gravity G and the center g of the comparative domain.

If the inter-center distance d1 is not greater than a predetermined threshold value, the collating section 116 determines that the comparative separated domains obtained as a result of separating the bound comparative domains are identical respectively with the corresponding authenticating domains.

In this way, the collating section 116 divides and separates the comparative domain that does not agree with the corresponding authenticating domains and collates each of the comparative separated domains and the corresponding authenticating domain.

Thus, since the collating section 116 is adapted to bind adjacently located domains or separates a domain to correct the domain or domains, whichever appropriate, and collate each of the domains or the domain and the corresponding authenticating domain in order to eliminate the influence of any change that has taken place before an image of the original is picked up, it is possible to remarkably improve the reliability of the collating operation.

Third Processing Procedure

Now, the processing operations of the control section 2 that follow the third processing procedure will be described.

Figure 27:
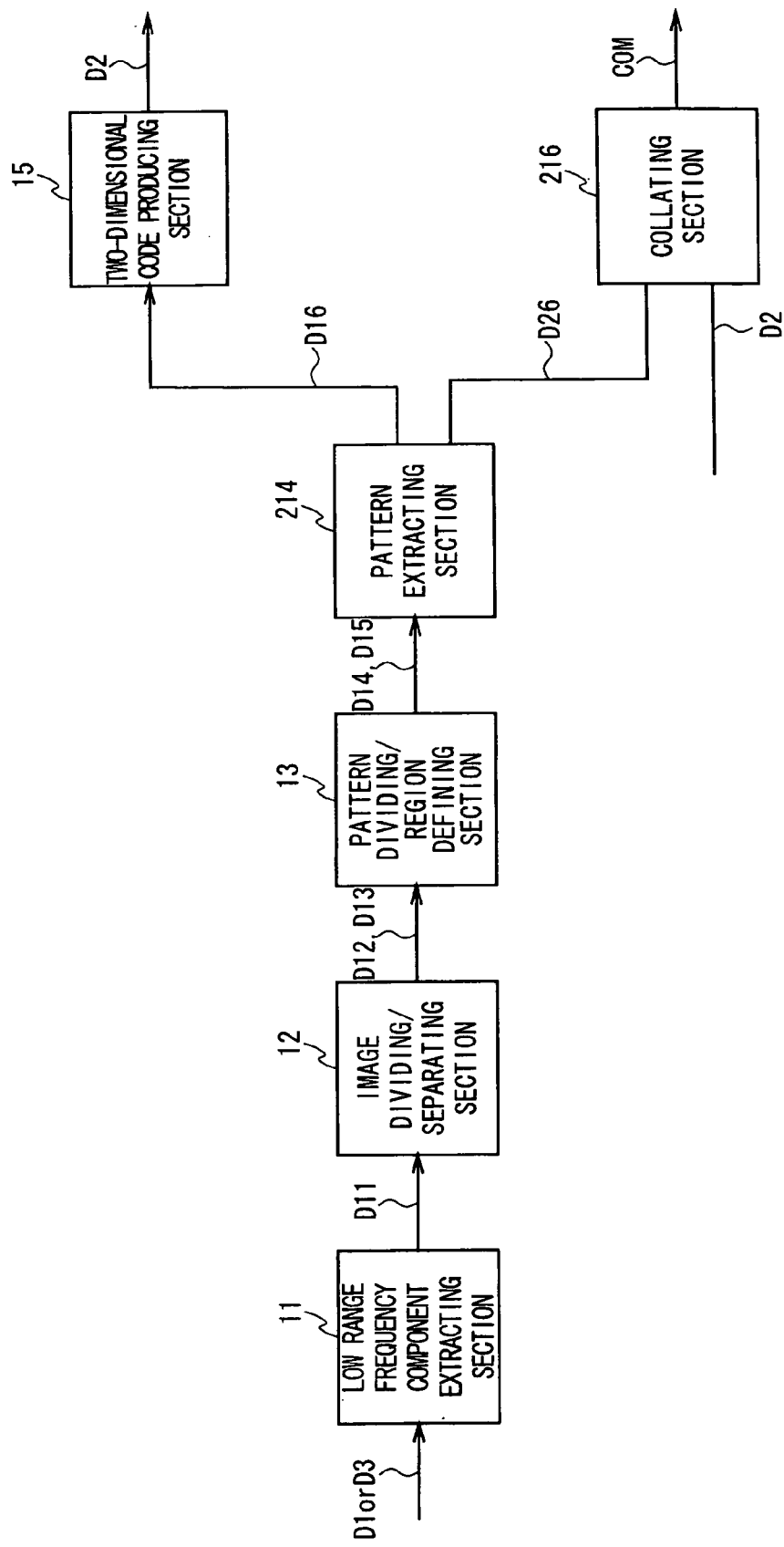
FIG. 27 is a schematic block diagram of the control section of the first embodiment of the invention, illustrating the third processing procedure thereof.

FIG. 27 is a schematic block diagram of the control section 2 of the first embodiment of the invention adapted to follow the third processing procedure thereof. Referring to FIG. 27, the low range frequency component extracting section 11, the image dividing/separating section 12, the pattern dividing/region defining section 13 and the two-dimensional code producing section 15 of the control section 2 operate exactly same as they do when they follow the first processing procedure as described above by referring to FIG. 5. However, the pattern extracting section 214 and the collating section 216 of the control section 2 operate differently from their counterparts that are adapted to follow the first processing procedure.

Now, the pattern extracting process of the pattern extracting section 214 and the collating process of the collating section 216 will be described below in detail.

The pattern extracting section 214 operates to approximate each of the white domains WD ($WD_1$ through $WD_n$) and each of the black domains BD ($BD_1$ through $BD_n$) to a circle and hence differs from the pattern extracting section 14 that operates to approximate each of the white domains WD and each of the black domains BD to an rectangle.

More specifically, the pattern extracting section 214 computes the primary image moment $MA_{00}$ and the secondary image moments $MA_{10}, MA_{01}$ by means of the formula (7) for each of the white domains WD ($WD_1$ through $WD_n$) in the white domain data D14 supplied from the pattern dividing/region defining section 13.

Figures 28, 29:
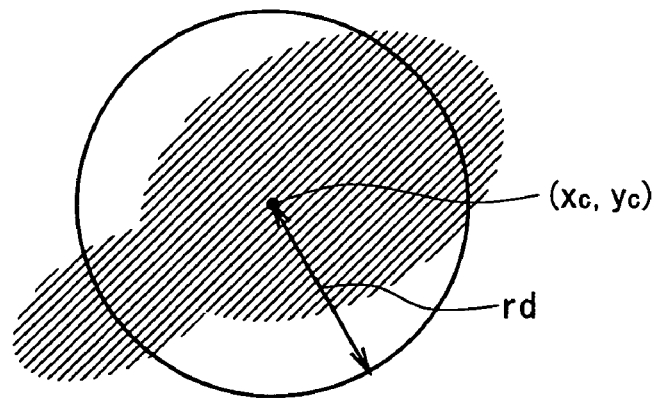
FIG. 28 is a schematic illustration of computation of a characteristic quantity obtained by using similarity of circles.
FIG. 29 is a schematic illustration of the data size of a characteristic quantity obtained by using similarity of circles.

Then, as shown in FIG. 28, the pattern extracting section 214 computationally determines the coordinates of the center $(x_c, y_c)$ of each of the white domains, using the corresponding primary and secondary image moments $MA_{00}, MA_{10}, MA_{01}$ and the formula (9), and a radius rd, using formula (13) shown below, to determine the coordinates of the center $(x_c, y_c)$ and the radius rd (to be referred to as circle information values hereinafter) for each domain (white domain WD or black domain BD) as characteristic quantity.

$$rd = \sqrt{\frac{MA_{00}}{\pi}} \quad (13)$$

Similarly, the pattern extracting section 214 computationally determines the circle information values (the coordinates of the center $(x_c, y_c)$ and the radius rd) of each of the black domains BD ($BD_1$ through $BD_n$) in the black domain data D15 supplied from the pattern dividing/region defining section 13, using the above formulas (11), (12) and (13), as in the case of the white domains WD ($WD_1$ through $WD_n$).

Then, if the current operation is being conducted in a code printing mode, the pattern extracting section 214 transmits the pattern characteristic quantity including the circle information values (the coordinates of the center ($x_c$, $y_c$) and the radius rd) of each of the white domains WD and the circle information values of each of the black domains BD to the two-dimensional code producing section 15 as authenticating pattern data D16 (FIG. 27). If, on the other hand, the current operation is being conducted in a verification mode, the pattern extracting section 214 transmits the comparative pattern data D26 to the collating section 216 (FIG. 27).

Thus, the pattern extracting section 214 can operate with a remarkably reduced load for the processing operation down to the generation of pattern data D16, D26 if compared with the corresponding processing operation of the pattern extracting section 14 (FIG. 5) adapted to computationally determine rectangle information values and that of the pattern extracting section 114 (FIG. 20) adapted to computationally determine ellipse information values because the part of the processing operation of determining the tertiary image moments $MA_{20}$, $MA_{02}$, $MA_{11}$, the major axis $rd_a$ (or the minor axis $rd_b$) and the angle $\Phi$ between the major axis $rd_a$ and the horizontal axis can be omitted.

Additionally, as clear from the results of an experiment illustrated in FIG. 29 on the data range that the circle information values (the coordinates of the center ($x_c$, $y_c$) and the radius rd) of a single white domain WD or a single black domain BD can take, if a data range as illustrated in FIG. 12(A) is assumed, the data size of the circle information values of a single white domain WD or a single black domain BD can be reduced by 24 [bits] if compared with the data size of the rectangle information values (ellipse information values) (FIG. 12(A)).

Therefore, the pattern extracting section 214 can remarkably reduce the quantity of the pattern data D16, D26 as clearly seen by referring to the number of domains (white domains and black domains) illustrated in FIG. 12(B).

Thus, the pattern extracting section 214 can make the operation of printing the two-dimensional bar code BC on the original printing paper OP according to the pattern data D16 start very quickly and hence reduce the waiting time until the start of the printing operation. Additionally, since the pattern extracting section 214 can make the operation of collating the pattern data D16 and D26 start very quickly and hence reduce the waiting time until the start of the collating operation so that the contents of the original printing paper can be copied very quickly.

Collating Process

The collating section 216 sequentially collates each of the comparative domains (white domains WD and the black domains BD) expressed by the corresponding pattern characteristic quantities (circle information values) in the comparative pattern data D26 supplied from the pattern extracting section 214 and the corresponding one of the authenticating domains (white domains WD and the black domains BD) expressed by the corresponding pattern characteristic quantities (circle information values) in the authenticating pattern code data D2 given from the scanner section 4.

Figure 30:
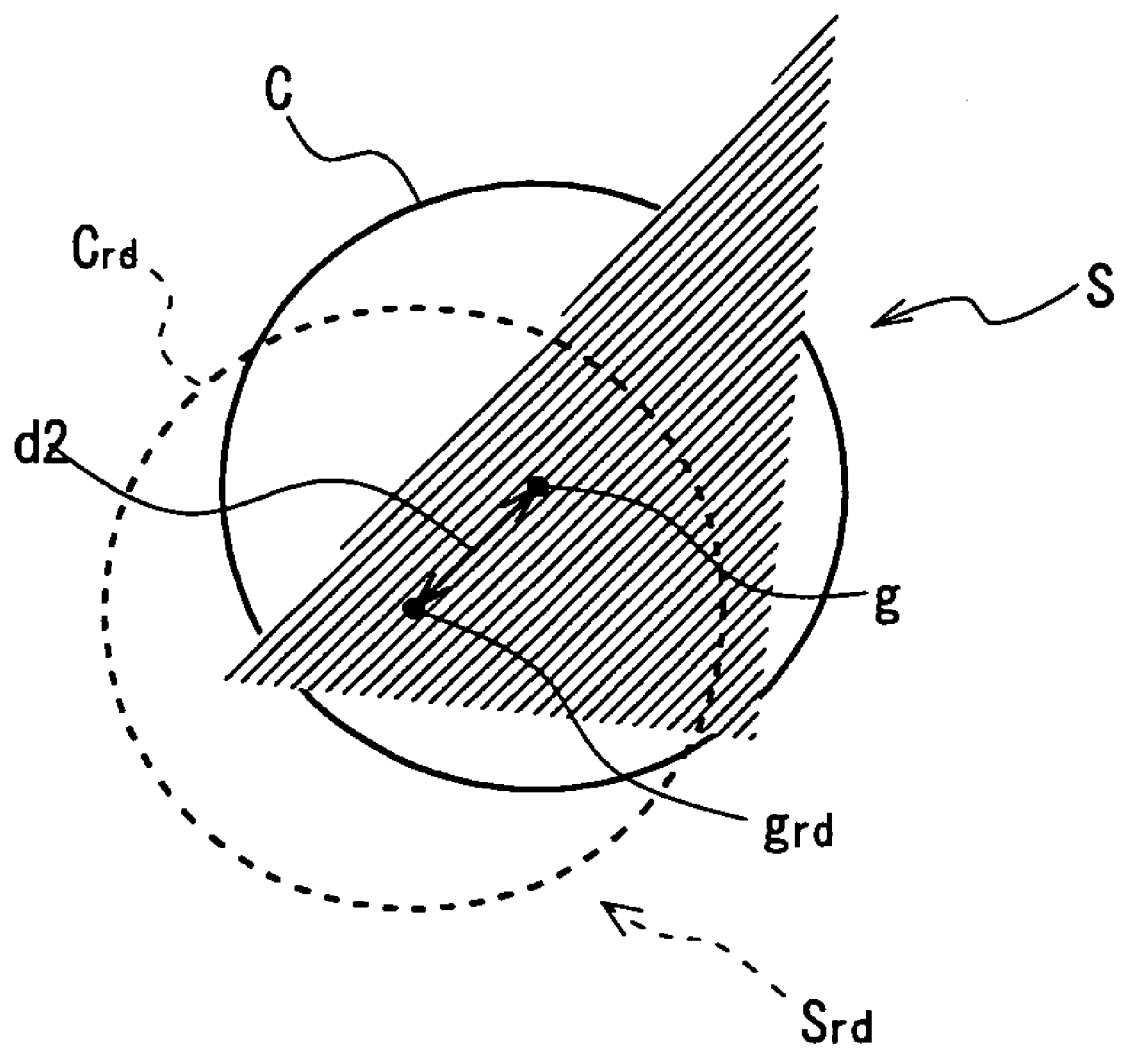
FIG. 30 is a schematic illustration of collation of domains (1) using similarity of circles.

Now, the collating process of the collating section 216 will be specifically described by referring to FIG. 30. Note that a collating process of collating a single authenticating domain and a single comparative domain will be described here just as the description given above by referring to FIG. 22.

FIG. 30 schematically illustrates the positional relationship of a circle expressed by circle information values (the coordinates of the center ($x_c$, $y_c$) and the radius rd). In FIG. 30, $C_{rd}$ denotes the circle of the authenticating domain (defined by a broken line), $S_{rd}$ denotes the area of the authenticating domain as expressed by the radius rd and $g_{rd}$ denotes the center of the authenticating domain as expressed by the coordinates of the center ($x_c$, $y_c$), whereas C denotes the circle of the comparative domain (defined by a solid line), S denotes the area of the comparative domain as expressed by the radius rd of the comparative domain and g denotes the center of the comparative domain as expressed by the coordinates of the center ($x_c$, $y_c$).

Additionally, in FIG. 30, d2 denotes the distance between the center of the authenticating domain and that of the comparative domain computed as in the computation using the formula (11). The triangle in FIG. 30 indicates the comparative domain.

Referring to FIG. 30, the collating section 216 firstly determines if the center $g_{rd}$ of the authenticating domain is found in the circle C of the comparative domain and, at the same time, the center g of the comparative domain is found in the circle $C_{rd}$ of the authenticating domain or not according to both the circle information values of the authenticating domain and those of the comparative domain.

If it is determined that the centers $g_{rd}$, g of the two domains are found respectively in the circles C, $C_{rd}$, the collating section 216 sequentially determines if the inter-center distance d and the inter-area difference between the area $S_{rd}$ of the authenticating domain and the area S of the comparative domain are not greater than respective predetermined threshold values or not.

If all the above differences are not greater than the respective predetermined threshold values, the collating section 216 determines that the authenticating domain and the comparative domain are identical domains. If, on the other hand, either one of the above differences is greater than the corresponding threshold value, the collating section 216 determines that the authenticating domain and the comparative domain are not identical domains.

It will be appreciated that the collating section 216 can determine the sameness of the domains (the authenticating domain and the comparative domain) without performing an operation of preventing an error determination as described above by referring to FIG. 23 because it operates for collation only according to the coordinates of the center ($x_c$, $y_c$) and the radius rd so that it is possible to reduce both the load of the collating process and the error rate of determination.

In this way, the collating section 216 collates the comparative pattern extracted from the code-added printing paper XPc (FIG. 2(B)) (each of the comparative domains expressed respectively by the corresponding pattern characteristic quantities (circle information values)) and the authenticating pattern on the original printing paper OP (each of the authenticating domains expressed respectively by the corresponding pattern characteristic quantities (circle information values)) stored in the authenticating pattern code BC (FIG. 2(B)).

If an agreement rate that is higher than a predetermined reference agreement rate is obtained as a result of the collating process, the collating section 216 determines that the code-added printing paper XPc that corresponds to the comparative pattern image is valid original printing paper OP and generates a copying authorizing command COM and transmits it to the scanner section 4 (FIG. 4).

As a result, the scanner section 4 is driven to operate in a reflection mode and the printed contents on the original printing paper OP placed on the original table are transmitted to the printer section 5 as printed contents image data D4. Thus, the printer section 5 copies the printed contents of the original printing paper OP (FIG. 2(A)) on a sheet of printing paper.

If only an agreement rate lower than a predetermined agreement rate is obtained as a result of the collating process due to changes with time of image pickup state and/or some other reasons, the collating section 216 sequentially executes a binding/collating process and a separating/collating process for each comparative domain that does not agree with the corresponding authenticating domain as in the case of the first and second processing procedures.

Of the binding/collating process and the separating/collating process, the binding/collating process will be described specifically by referring to FIG. 31. For the convenience of explanation, a binding/collating process where two adjacent comparative domains are bound to form a comparative bound domain and the comparative bound domain and a corresponding authenticating domain are collated will be described below just like the comparable description given above by referring to FIG. 25.

Figure 31:
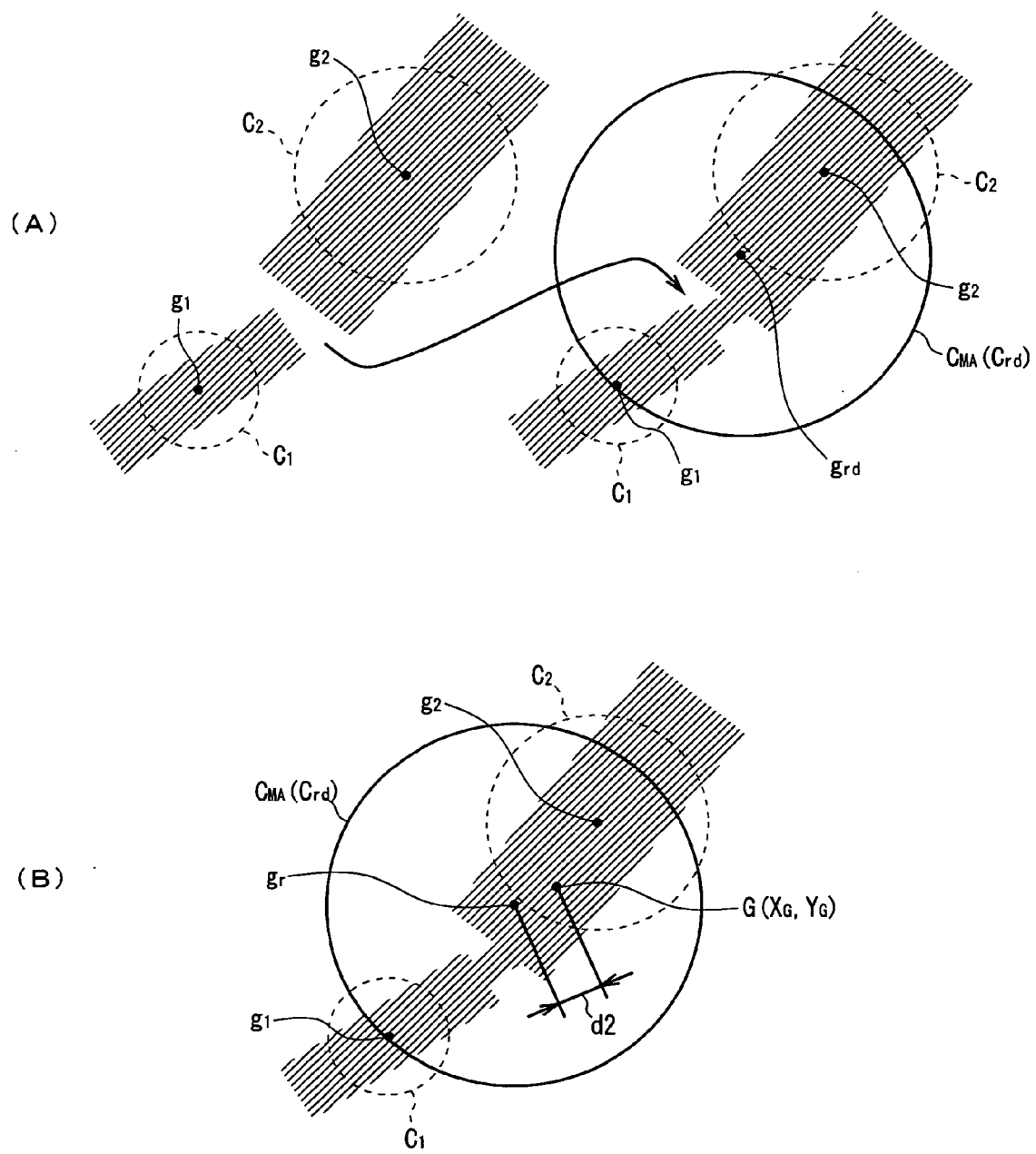
FIG. 31 is a schematic illustration of binding of domains, using similarity of circles.

As in the case of FIG. 30, FIG. 31 schematically illustrates the positional relationship of circle expressed by circle information values (the coordinates of the center ($x_c$, $y_c$) and the radius rd). In FIG. 31, $C_1$ and $C_2$ denote respectively the circles of the comparative domains (defined by broken lines) and $g_1$ and $g_2$ denote respectively the centers of the comparative domains as expressed by the coordinates of the centers ($x_c$, $y_c$), whereas $C_{MA}$ ($C_{rd}$) denotes the circle of the comparative bound domain (corresponding authenticating domain) (defined by solid lines) and $g_{rd}$ denotes the center of the corresponding authenticating domain as expressed by the coordinates of the center ($x_c$, $y_c$).

Additionally, in FIG. 31, G denotes center of gravity ($x_G$, $y_G$) of the comparative bound domain as computed by means of the formula (12) and d2 denotes the inter-center distance between the center of gravity G of the comparative bound domain and the center $g_{rd}$ of the authenticating domain as computed by means of the formula (11). The rectangles in FIG. 31 show separated comparative domains and a comparative bound domain formed by binding the separated comparative domains.

Referring to FIG. 31, the collating section 216 determines if the centers $g_1$ and $g_2$ of the comparative domains to be bound are found in the circle $C_{rd}$ of the corresponding authenticating domain (or the circle $C_{MA}$ of the comparative bound domain formed by binding the comparative domains) or not. If it is determined that the centers $g_1$ and $g_2$ are found in the circle $C_{rd}$, the collating section 216 determines the center of gravity G($x_G$, $y_G$) of the comparative bound domain obtained as a result of binding the comparative domains and then the distance d2 between the center of gravity G and the center $g_{rd}$ of the corresponding authenticating domain.

If the inter-center distance d is not greater than a predetermined threshold value, the collating section 216 determines that the comparative bound domain obtained as a result of binding the separated comparative domains is identical with the corresponding authenticating domain.

In this way, the collating section 216 binds the comparative domains that do not agree with the corresponding authenticating domain and collates the comparative bound domain and the corresponding authenticating domain.

Now, the separating/collating process will be described specifically by referring to FIG. 32. For the convenience of explanation, a separating/collating process of a comparative domain to be separated into two comparative separated domains and corresponding authenticating domains will be described below as in the case of the description given above by referring to FIG. 26.

Figure 32:
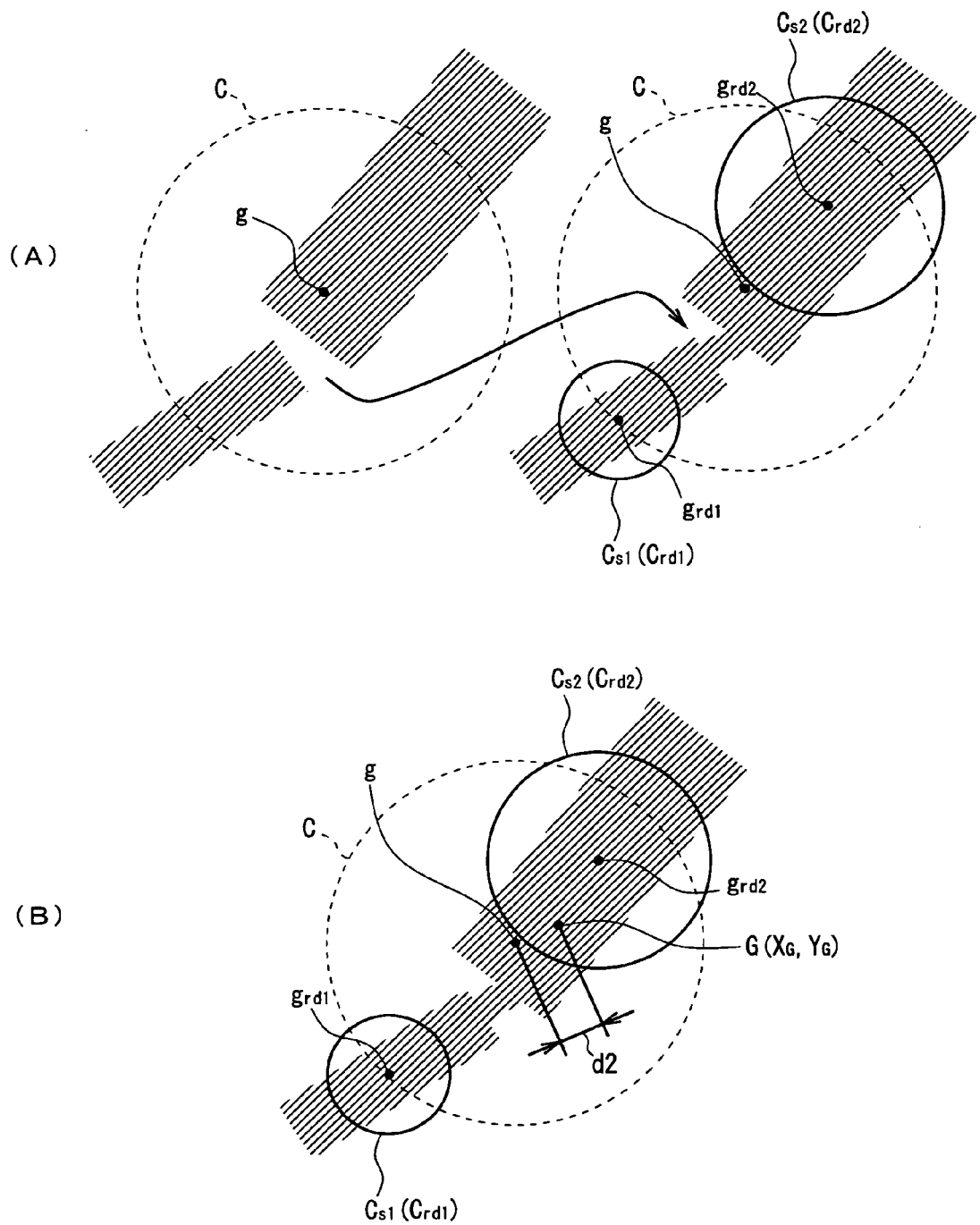
FIG. 32 is schematic illustrations of separation of domains, using similarity of circles.

FIG. 32 schematically illustrates the positional relationship of a circle expressed by circle information values (the coordinates of the center ($x_c$, $y_c$), the radius rd). In FIG. 32, C denotes the circle of the comparative domain (defined by broken lines) and g denotes the center of the comparative domain as expressed by the coordinates of the center ($x_c$, $y_c$), whereas $C_{S1}$ and $C_{S2}$ ($C_{rd1}$ and $C_{rd2}$) denote respectively the circles of the comparative separated domains (authenticating domains) (defined by solid lines) and $g_{rd1}$ and $g_{rd2}$ denote respectively the centers of the authenticating domains as expressed by the coordinates of the centers ($x_c$, $y_c$).

Additionally, in FIG. 32, G denotes center of gravity ($x_G$, $y_G$) of each of comparative separated domains as computed by means of the formula (12) above and d2 denotes the inter-center distance between the center of gravity G of the comparative separated domains as computed by means of the formula (11) and the center g of the comparative domain. The rectangles in FIG. 32 show a bound comparative domain and comparative separated domains formed by separating the bound comparative domain.

Referring to FIG. 32, the collating section 216 determines if the centers $g_{rd1}$ and $g_{rd2}$ of the authenticating domains are found in the circle C of the comparative domain before it is divided and separated into two comparative domains or not. If it is determined that the centers $g_{rd1}$ and $g_{rd2}$ are found in the circle C, the collating section 216 then determines the center of gravity G($x_G$, $y_G$) of the comparative separated domains obtained as a result of separating the comparative domain and then the distance d between the center of gravity G and the center g of the comparative domain.

If the inter-center distance d2 is not greater than a predetermined threshold value, the collating section 216 determines that the comparative separated domains obtained as a result of separating the bound comparative domains are identical respectively with the corresponding authenticating domains.

In this way, the collating section 216 divides and separates the comparative domain that does not agree with the corresponding authenticating domains and collates each of the comparative separated domains and the corresponding authenticating domain.

Thus, since the collating section 216 is adapted to bind adjacently located domains or separates a domain to correct the domain or domains, whichever appropriate, and collate each of the domains or the domain and the corresponding authenticating domain in order to eliminate the influence of any change that has taken place before an image of the original is picked up, it is possible to remarkably improve the reliability of the collating operation.

Fourth Processing Procedure

Now, the processing operations of the control section 2 that follow the fourth processing procedure will be described.

Figure 33:
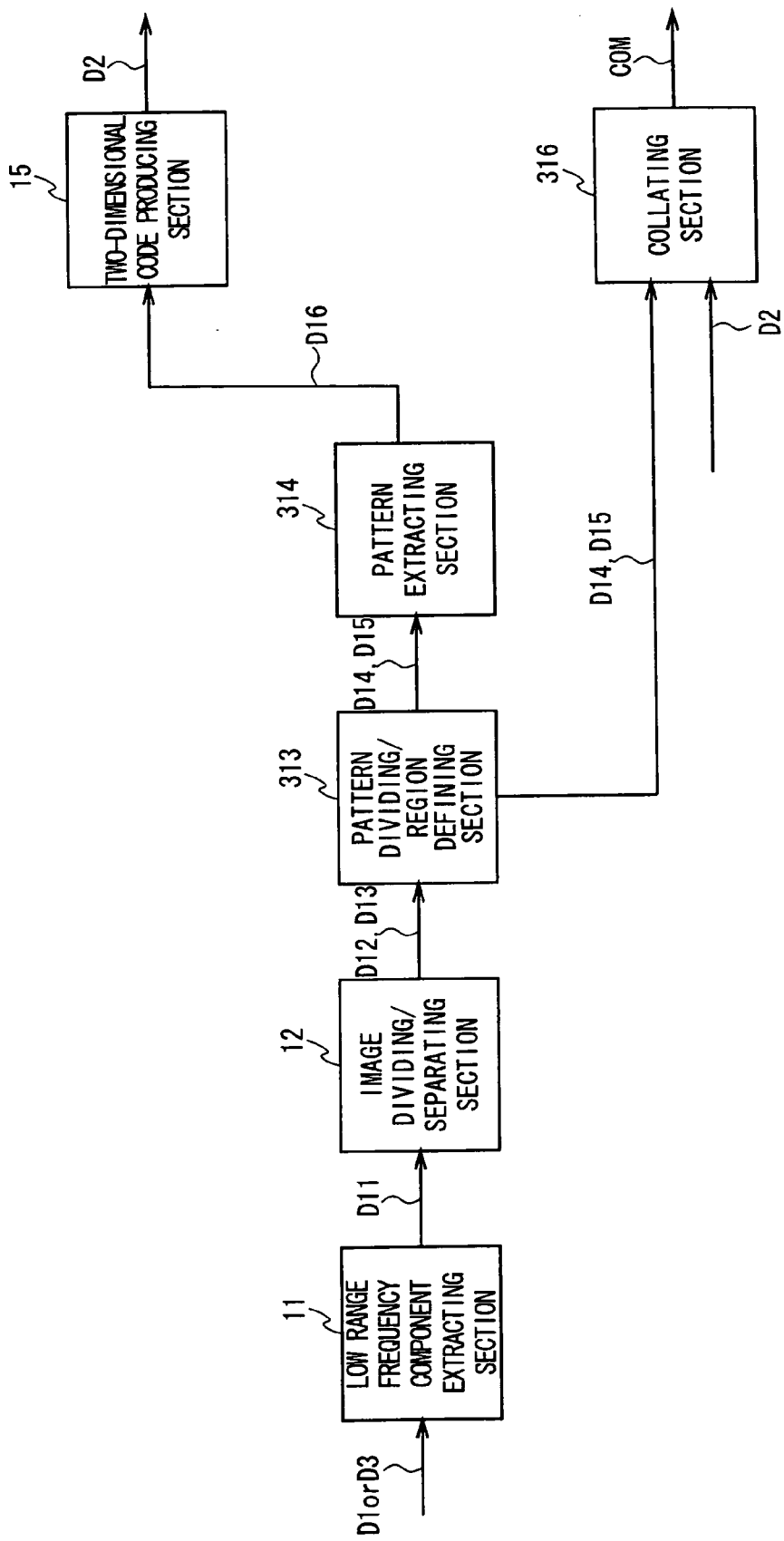
FIG. 33 is a schematic block diagram of the control section of the first embodiment of the invention, illustrating the fourth processing procedure thereof.

FIG. 33 is a schematic block diagram of the control section 2 of the first embodiment of the invention adapted to follow the fourth processing procedure thereof. Referring to FIG. 33, the low range frequency component extracting section 11, the image dividing/separating section 12 and the two-dimensional code producing section 15 of the control section 2 operate exactly same as they do when they follow the first processing procedure as described above by referring to FIG. 5. However, the pattern dividing/region defining section 313, the pattern extracting section 314 and the collating section 316 of the control section 2 operate differently from their counterparts that are adapted to follow the first processing procedure.

Now, the pattern dividing/region defining process of the pattern dividing/region defining section 313, the pattern extracting process of the pattern extracting section 314 and the collating process of the collating section 316 will be described below in detail.

Pattern Dividing/Region Defining Process

Both in a code printing mode and in a verification mode, the pattern dividing/region defining section 313 operates just like the pattern dividing/region defining section 13 in that generates white domain data D14 out of the white component pattern image data D12 supplied from the image dividing/separating section 12 and also black domain data D15 out of the black component pattern image data D13 supplied from the image dividing/separating section 12.

However, the destinations to which the pattern dividing/region defining section 313 transmits the white domain data D14 and the black domain data D15 differ from those of the pattern dividing/region defining section 13. While the pattern dividing/region defining section 13 transmits the white domain data D14 and the black domain data D15 to the pattern extracting section 14 in a code printing mode and in a verification mode, the pattern dividing/region defining section 313 transmits them to the pattern extracting section 314 in a code printing mode and to the collating section 316 in a verification mode.

Pattern Extracting Process

The pattern extracting section 114 operates to approximate each of the white domains WD ($WD_1$ through $WD_n$) and each of the black domains BD ($BD_1$ through $BD_n$) to its own profile and hence it differs from the pattern extracting section 14 that approximates each of the white domains WD and each of the black domains to a rectangle.

More specifically, the pattern extracting section 314 determines strings of control points in order to generate a Bezier curve on the basis of points on the outer periphery (to be referred to as domain outer periphery points hereinafter) of each of the white domains WD ($WD_1$ through $WD_n$) and each of the black domains BD ($BD_1$ through $BD_n$) and extracts the strings of control points as pattern.

To do this, the pattern extracting section 314 computes the area of the white domains WD ($WD_1$ through $WD_n$) of the white domain data D14 and the black domains BD ($BD_1$ through $BD_n$) of the black domain data D15 supplied from the pattern dividing/region defining section 313 (to be referred to as domain comprehensive area hereinafter) on the basis of the number of pixels and selectively determines the lattice size and the degree of the Bezier curve that correspond to the number of pixels by referring to a correspondence table for domain comprehensive areas (pixel numbers), lattice sizes of square lattice and degrees of Bezier curve stored in an internal memory in advance.

Then, the pattern extracting section 314 divides the specified region AR of the white domain data D14 and the specified region AR of the black domain data D15 by means of a square lattice of the selectively determined lattice size and determines a control point strings of "n+1" control points for each of the white domains WD and each of the black domains BD in the specified region AR in order to generate a Bezier curve of the n-th degree that is selectively determined.

Now, the technique to be used for determining such control point strings will be described below. Note that control point strings of four control points will be described here to generate a Bezier curve of the third degree for a white domain $WD_1$ by referring to FIG. 34 for the purpose of convenience.

Figure 34:
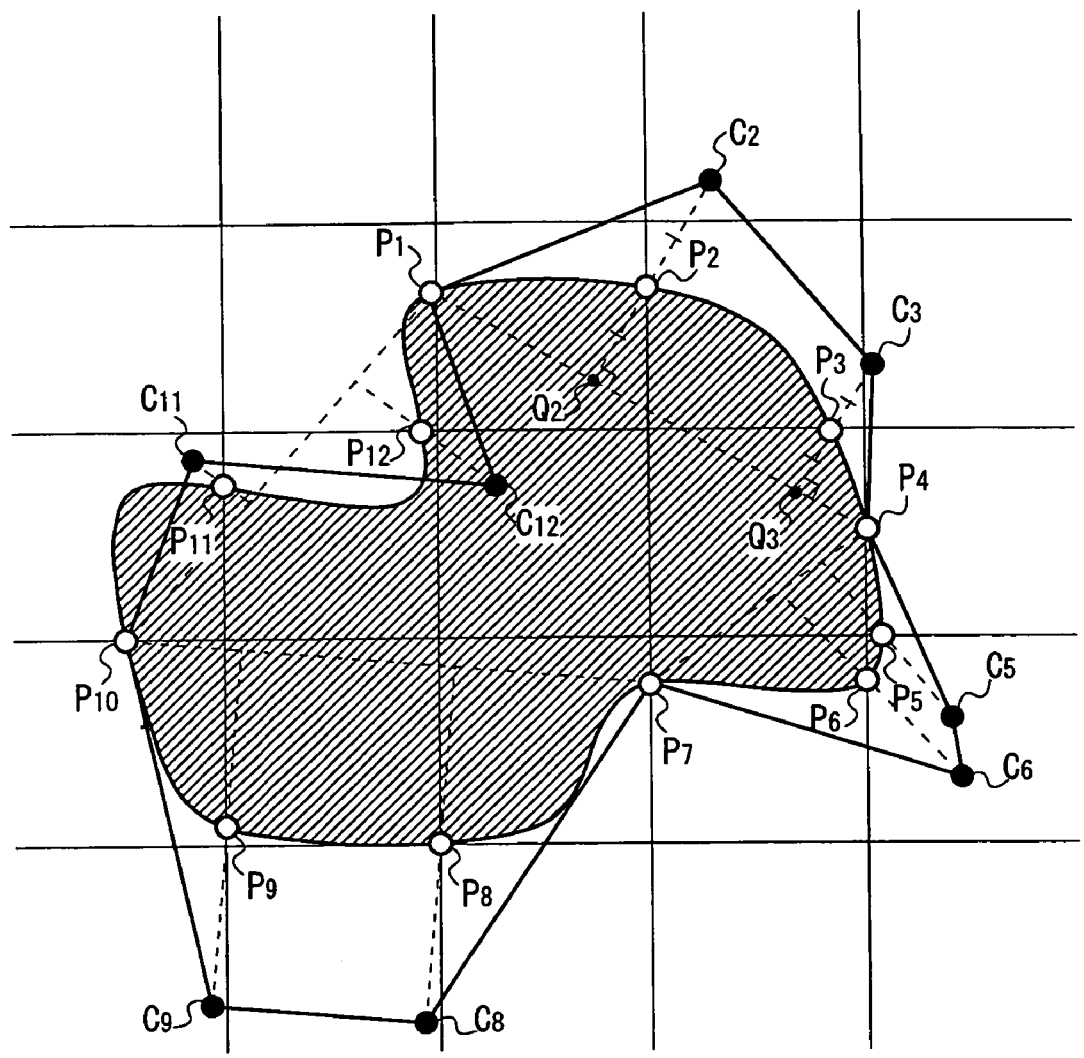
FIG. 34 is a schematic illustration of determination of a string of control points.

Referring to FIG. 34, the pattern extracting section 314 recognizes the points of intersection $P_1$ through $P_{12}$ of the square lattice and the outer periphery of the white domain $WD_1$ as control points and sequentially selects adjacently located four control points $P_1$ through $P_4$, $P_4$ through $P_7$, $P_7$ through $P_{10}$ and $P_{10}$ through $P_{12}$, starting from control point $P_1$, for control point strings.

The pattern extracting section 314 is adapted to select the terminal point of each of the control point strings $P_1$ through $P_4$, $P_4$ through $P_7$, $P_7$ through $P_{10}$ and $P_{10}$ through $P_{12}$ (or control point $P_4$, $P_7$ or $P_7$) as starting point of the immediately succeeding control point string (or control point $P_4$, $P_7$ or $P_7$). It is also adapted to select three control points of $P_{10}$ through $P_{12}$ for a control point string.

If the control point strings $P_1$ through $P_4$, $P_4$ through $P_7$, $P_7$ through $P_{10}$ and $P_{10}$ through $P_{12}$ are selected for the white domain $WD_1$, the Bezier curve generated only by using such control point strings of control points $P_1$ through $P_{12}$ may be found partly in the inside and partly at the outside of the outer periphery of the white domain $WD_1$. Then, a domain that is extremely different from the white domain $WD_1$ can be obtained.

To avoid this problem, the pattern extracting section 314 is adapted to shift the control points $P_2$ and $P_3$, $P_5$ and $P_6$, $P_8$ and $P_9$ located between the starting points and the terminal points of the respective control point strings $P_1$ through $P_4$, $P_4$ through $P_7$, $P_7$ through $P_{10}$ (to be referred to as intermediate control points hereinafter) and control points $P_{11}$ and $P_{12}$ between the starting point $P_{10}$ of the last control point string $P_{10}$ through $P_{12}$ and the starting point $P_1$ of the first control point string $P_1$ through $P_4$ (to be also referred to as intermediate control points hereinafter) either to the inside or to the outside of the outer periphery of the white domain $WD_1$.

More specifically, if the intermediate control points $P_2$ and $P_3$ are selected as centers of point symmetry, the pattern extracting section 314 detects points $C_2$ and $C_3$ that correspond to the points of intersection $Q_2$ and $Q_3$ of the perpendiculars relative to the line segment $P_1$-$P_4$ extended respectively from the intermediate control points $P_2$ and $P_3$ and the line segment $P_1$-$P_4$ and defines a control point string $P_1$-$C_2$-$C_3$-$P_4$, using the detected control points $C_2$ and $C_3$ and the control points $P_1$ and $P_4$.

Then, the pattern extracting section 314 detects points $C_5$ and $C_6$, $C_8$ and $C_9$, $C_{11}$ and $C_{12}$ and defines control point strings $P_4$-$C_5$-$C_6$-$P_7$, $P_7$-$C_8$-$C_9$-$P_{10}$ and $P_{10}$-$C_{11}$-$C_{12}$, using the detected control points $C_5$ and $C_6$, $C_8$ and $C_9$ and $C_{11}$ and $C_{12}$ the corresponding control points $P_4$ and $P_7$, $P_7$ and $P_{10}$ and $P_{10}$ and $P_{12}$ respectively for the remaining intermediate control points $P_5$ and $P_6$, $P_8$ and $P_9$ and $P_{11}$ and $P_{12}$ as it did for the intermediate control points $P_2$ and $P_3$.

Thus, the pattern extracting section 314 generates the control point strings $P_1$-$C_2$-$C_3$-$P_4$, $P_4$-$C_5$-$C_6$-$P_7$, $P_7$-$C_8$-$C_9$-$P_{10}$ and $P_{10}$-$C_{11}$-$C_{12}$ for the white domain $WD_1$.

The pattern extracting section 314 also defines control point strings for the white domains $WD_2$ through $WD_n$ and for the black domains $BD_1$ through $BD_n$ of the black domain data D15 supplied from the pattern dividing/region defining section 313 in order to generate respective Bezier curves of the third degree as in the case of the white domain $WD_1$.

Then, the pattern extracting section 314 transmits the control point strings defined for the white domains WD ($WD_1$ through $WD_n$) and the black domains BD ($BD_1$ through $BD_n$) to the two-dimensional code producing section 15 as data for authenticating patterns (to be referred to as authenticating pattern data hereinafter) D16 (FIG. 5).

Therefore, the pattern extracting section 314 is adapted to extract control point strings ($P_1$-$C_2$-$C_3$-$P_4$, $P_4$-$C_5$-$C_6$-$P_7$, $P_7$-$C_8$-$C_9$-$P_{10}$ and $P_{10}$-$C_{11}$-$C_{12}$) as pattern in order to generate a domain more approximated to the actual white domain $WD_1$ by shifting the intermediate control points ($P_2$ and $P_3$, $P_5$ and $P_6$, $P_8$ and $P_9$ and $P_{11}$ and $P_{12}$) of the selected control point strings ($P_1$ through $P_4$, $P_4$ through $P_7$, $P_7$ through $P_{10}$ and $P_{10}$ through $P_{12}$) to the inside or the outside of the outer periphery of the white domain $WD_1$.

If a data range as illustrated in FIG. 35 is assumed assigned to each single control point of a control point string and a control point string formed by using "n+1" control points to generate a Bezier curve of the n-th degree is k, the data size of the authenticating pattern data D6 was found to be 32k(n+1) [bits] as a result of an experiment.

As shown in FIG. 13, an existing two-dimensional bar code can be produced by using about 1 to 3 [Kbytes] binary data. Thus, as may be clear from FIGS. 13 and 35, it is possible to properly transform the control point strings of the authenticating pattern data D16 supplied from the pattern extracting section 314 into authenticating pattern code data D2 if a known technique is used for generating a two-dimensional bar code.

Collating Process

In a verification mode, the collating section 316 executes a collating process on the basis of the outcome of the operation of reading the authenticating pattern code BC printed on a specified region AR of the code-added printing paper XPc (FIG. 2(B)) in the scanner section 4 and the outcome of the low range frequency component extracting process, the image dividing/separating process and the pattern dividing/region defining process executed on the code-added pattern image data D3 read out from the specified region AR.

More specifically, the collating section 316 restores the authenticating pattern data D16 by conducting an inverse two-dimensional code transform operation on the authenticating pattern code data D2 supplied to it and generate white domains that correspond to the original white domains WD (to be referred to as reconfigured white domains hereinafter) and black domains that correspond to the original black domains BD (to be referred to as reconfigured black domains hereinafter).

Now, the reconfiguration technique that is used to generate reconfigured white domains and reconfigured black domains for the purpose of the invention will be described below. Note, however, only an operation of generating a reconfigured white domain that corresponds to white domain $WD_1$ that is described above by referring to FIG. 34 will be described here for the purpose of convenience.

Figure 36:
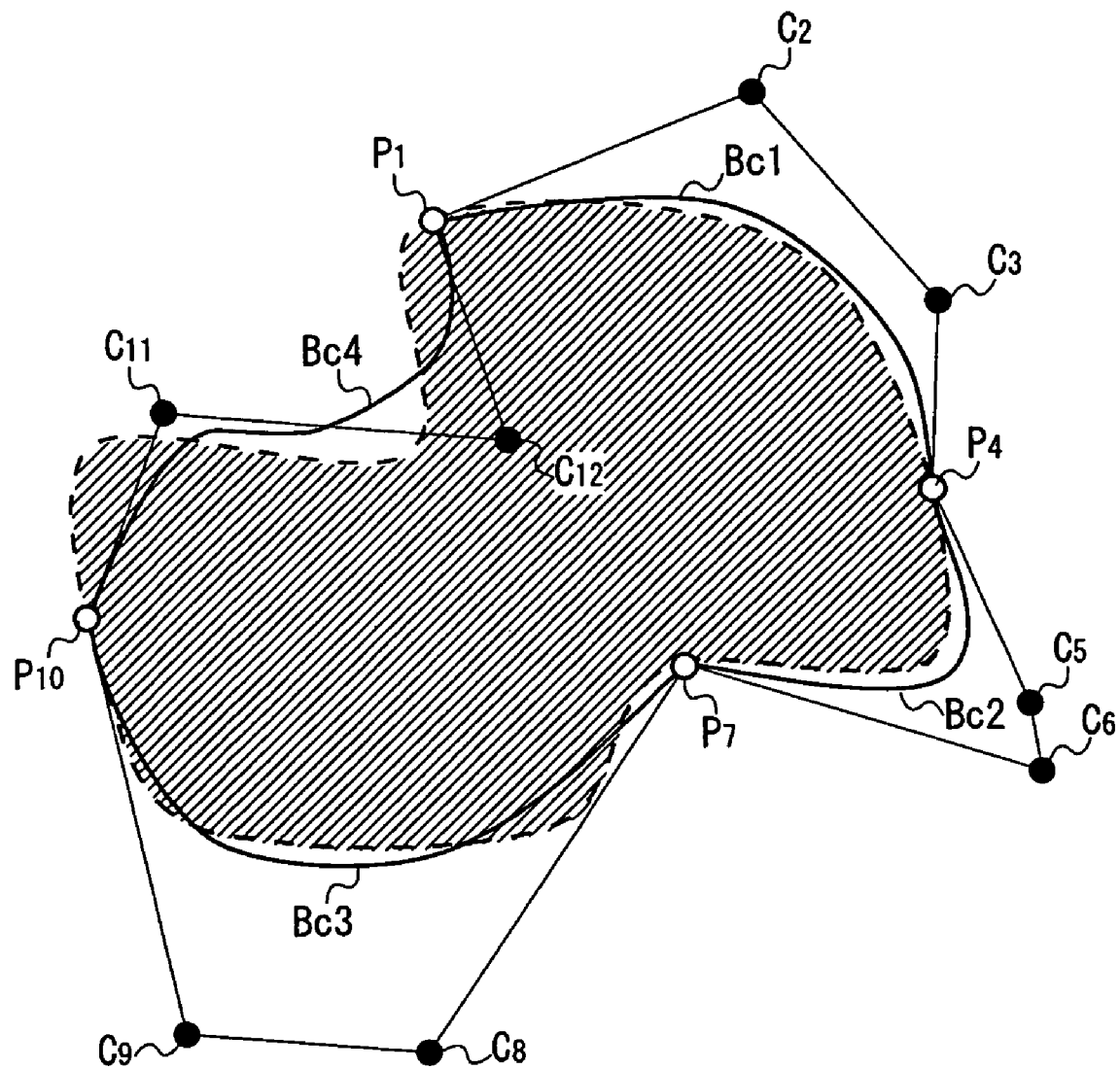
FIG. 36 is a schematic illustration of generation of a Bezier curve.

As shown in FIG. 36, the collating section 316 generates Bezier curves Bc1, Bc2, Bc3 and Bc4 respectively from the control point strings $P_1$-$C_2$-$C_3$-$P_4$, $P_4$-$C_5$-$C_6$-$P_7$, $P_7$-$C_8$-$C_9$-$P_{10}$ and $P_{10}$-$C_{11}$-$C_{12}$ for the white domain $WD_1$ (the shaded region defined by a broken line in FIG. 36) extracted by the pattern extracting section 14.

Figure 37:
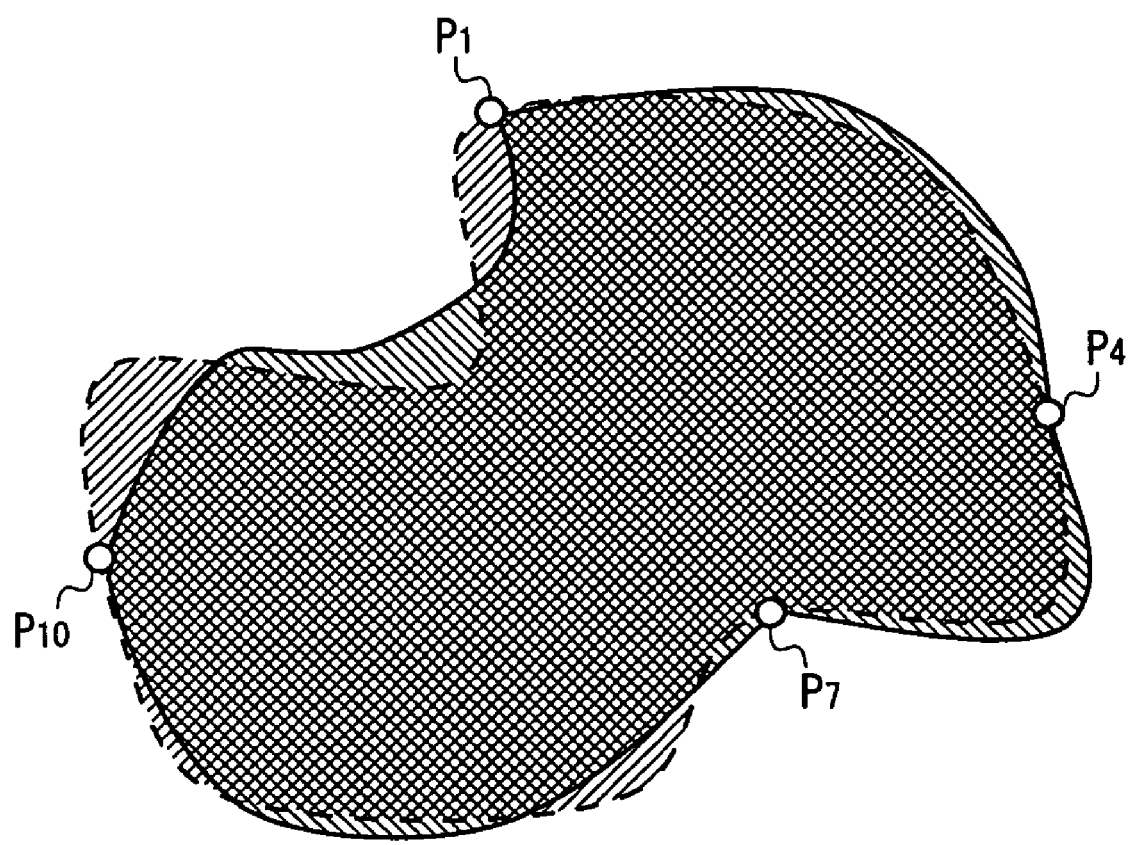
FIG. 37 is a schematic illustration of generation of a reconfigured domain.

Then, the collating section 316 generates a reconfigured white domain by solidly blotting out the regions defined by the Bezier curves Bc1, Bc2, Bc3 and Bc4 by means of a same single luminance value as shown in FIG. 37.

In this way, the collating section 316 is adapted to generate a reconfigured white domain that corresponds to white domain $WD_1$.

If control points are expressed by CP and a Bernstein function is expressed by $$B_i^n(t)$$

a Bezier curve of the n-th degree is defined by formula (14) below.

$$R(t) = \sum_{i=0}^{n} B_i^n(t) CP_i \tag{14}$$

The Bernstein function $$B_i^n(t)$$

in the above formula (14) is defined by formula (15) below:

$$B_i^n(t) = {_nC_i} \cdot t^i (1-t)^{n-i} \tag{15}$$
$$= \frac{n!}{(n-i)!i!} t^i (1-t)^{n-i},$$

where $0 \leq t \leq 1$.

Furthermore, the collating section 316 generates reconfigured white domains corresponding to the white domains $WD_2$ through $WD_n$ on the basis of the control point strings for the white domains $WD_2$ through $WD_n$ of the authenticating pattern code data D2 and also reconfigured black domains corresponding to the black domains $BD_1$ through $BD_n$ on the basis of the control point strings for the black domains $BD_1$ through $BD_n$ of the authenticating pattern code data D2 as in the case of the white domain $WD_1$.

Then, the collating section 316 computes the phase-limited correlation value $C_{POC}$ between the reconfigured white domains generated in the above described manner and the white domains WD ($WD_1$ through $WD_n$) of the white domain data D24 supplied from the pattern dividing/region defining section 313 and between the reconfigured black domains generated in the above described manner and the black domains BD ($BD_1$ through $BD_n$) of the black domain data D25 supplied from the pattern dividing/region defining section 313, using formula (16) below:

$$C_{POC}(x, y) = F^{-1}\left[\frac{F(R(x,y))F(D(x,y))}{|F(R(x,y))||F(D(x,y))|}\right], \tag{16}$$

where RD(x,y) represents the pixels of the reconfigured white domains and the reconfigured black domains, D(x, y) represents the pixels of the white domains WD and the black domains BD, F represents a two-dimensional Fourier transformation and $F^{-1}$ represents a two-dimensional inverse Fourier transformation.

When a phase-limited correlation value $C_{POC}$ that is not greater than a predetermined threshold value is obtained, the collating section 316 determines that the code-added printing paper XPc (FIG. 2) placed on the original table of the scanner section 4 is a copy of the original printing paper OP and transmits a copy prohibiting command to the scanner section (FIG. 4).

When, on the other hand, a phase-limited correlation value $C_{POC}$ that is greater than the predetermined threshold value is obtained, the collating section 316 determines that the code-added printing paper XPc (FIG. 2) placed on the original table of the scanner section 4 is the proper original printing paper OP and generates a copy authorizing command COM, which is then transmitted to the scanner section 4 (FIG. 4).

As a result, the scanner section 4 is driven to operate in a reflection mode and the printed contents of the code-added printing paper XPc (original printing paper OP) placed on the original table are transmitted to the printer section 5 as printed contents image data D4. Thus, the printed contents of the original printing paper OP (FIG. 2(A)) are copied on a sheet of paper by the printer section 5.

As will be appreciated from FIG. 38, a sharp peak appears when a phase-limited correlation exists (FIG. 38(A)). Therefore, the collating section 316 is notified of the computed phase-limited correlation value by way of a display section (not shown) in such an occasion. Thus, the collating section 316 can visually realize the phase-limited correlation value (the extent of properness) it acquires.

As described above in detail, with the fourth processing procedure, a plurality of control points are extracted from each of the white domains WD and the black domains BD as a pattern for generating Bezier curves approximating the outer peripheries of the domains and the pattern is stored on the original printing paper OP as authentication information. When the printed contents on a sheet of code-added printing paper XPc are to be copied, reconfigured white domains and reconfigured black domains that correspond respectively to the white domains WD and the black domains BD of the code-added printing paper XPc are generated on the basis of the pattern stored on the code-added printing paper XPc to verify the validity of the original printing paper OP by means of the reconfigured white domains and the reconfigured black domains.

Thus, with the fourth processing procedure, a plurality of control points approximating the outer periphery of each of the white domains WD and the black domains BD that constitute the pattern of the low range component pattern image IM2 are extracted as pattern. Therefore, if compared with the above described first through third processing procedures, it is possible for the fourth processing procedure to remarkably accurately reproduce the pattern of the low range component pattern image IM2 (FIG. 6(B)) as a pattern of reconfigured white domains and reconfigured black domains formed by the control points. Then, the accuracy of verification of validity will be remarkably improved.

Furthermore, with the fourth processing procedure, not only points on the outer periphery of each of the white domains WD and the black domains BD ($P_1$, $P_4$, $P_7$, $P_{10}$ in FIG. 34) but also points ($C_2$, $C_3$, $C_5$, $C_6$, $C_{C8}$, $C_9$, $C_{11}$, $C_{12}$ in FIG. 34) separated from corresponding points on the outer periphery by a predetermined distance either to the inside or to the outside of the outer periphery are extracted as pattern.

With this arrangement, it is possible to generate a pattern that is substantially same as the pattern stored on the original low range pattern image IM2 (FIG. 6(B)) by means of the reconfigured white domains and the reconfigured black domains generated from the control points. Then, it is possible to improve the accuracy of verification of validity remarkably.

Additionally, with the fourth processing procedure, a number of points corresponding to the white domain comprehensive area and those corresponding to the black domain comprehensive area are extracted as control points to approximate the outer periphery of each of the white domains WD and the black domains BD.

Thus, with the fourth processing procedure, the pattern to be stored on the original printing paper OP has a substantially constant data size and hence the pattern can be stored appropriately on the original printing paper OP regardless of the outcome of the pattern dividing/region defining process (the comprehensive area of the white domains WD and the black domains BD).

In the above description of the fourth processing procedure, the extraction means for determining a plurality of points to generate a curve approximating the contour of each region produced as a result of a pattern dividing operation on the basis of a number of points on the contour and extracting the plurality of points as pattern information is adapted to selectively determine the lattice size and the degree of the Bezier curve according to the domain comprehensive area of white domains WD and the domain comprehensive area of black domains BD and extract control point strings as pattern information for generating Bezier curves on the basis of the points on the outer periphery of each white domain WD and black domain BS that are intersections of the domain and a square lattice of the determined lattice size. However, alternatively, the lattice size and the degree of the Bezier curve may alternatively be determined as a function of the largest domain area of the white domains WD and the black domains BD or, still alternatively, fixed values may be selected in advance for the lattice size and the degree of Bezier curve.

Additionally, the points of intersection of a square lattice and each of the white domains WD and the black domains BD are selected in the above description. However, it may alternatively be so arranged that a reference point is selected on the outer periphery of each of the white domains WD and the black domains BD and the points of intersection of the outer periphery and a circle centered at the reference point are selected as new reference points so that the points of intersection of the outer periphery and circles centered respectively at the new reference points are selected as new reference points and so on. Then, it may additionally be so arranged that the diameter or the half diameter of the circle is selected as a function of the domain comprehensive area of the white domains WD and that of the black domains BD.

Figure 39:
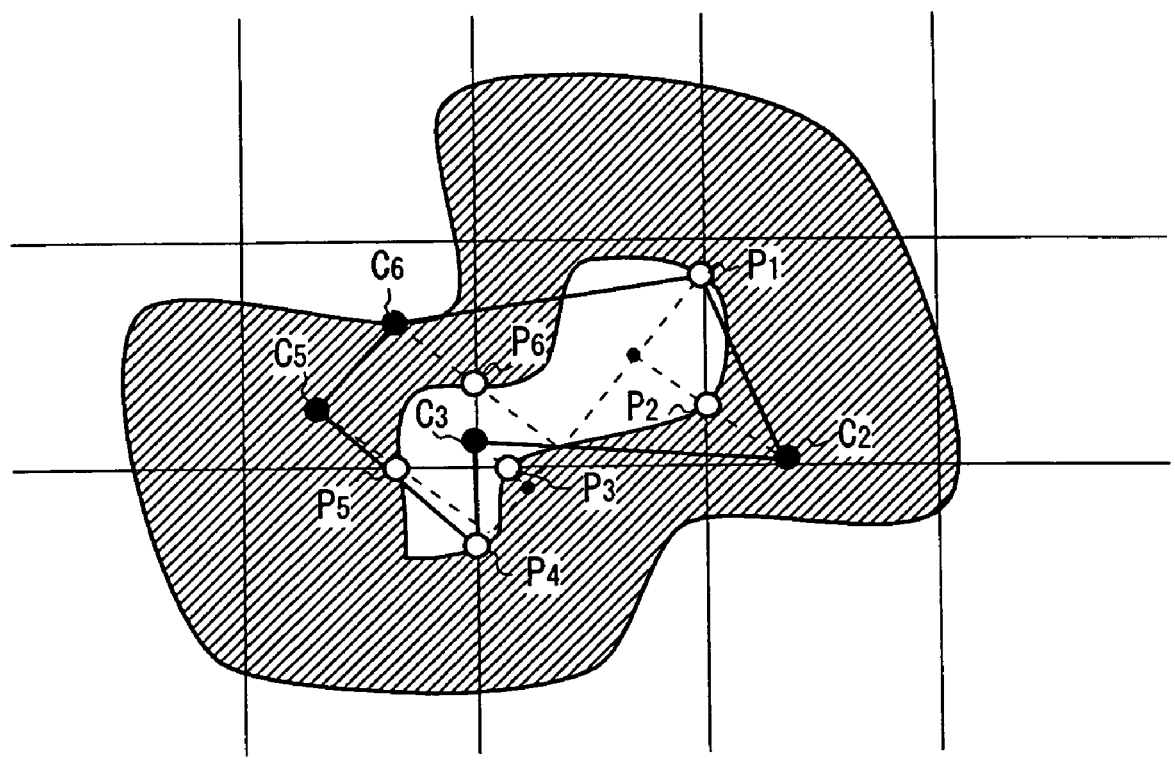
FIG. 39 is a schematic illustration of generation of Bezier curves in another embodiment.

While control point strings are extracted to generate a Bezier curve on the basis of the selected points on the outer periphery of each of the white domains WD and the black domains BD in the above description, control point strings may alternatively extracted to generate a Bezier curve on the basis of selected point on the contour of each of the white domains WD and the black domains BD. With the arrangement, it is possible to extract control point strings that can accurately reproduce the profile of each domain by means of a technique similar to the one described above by referring to FIG. 34 if a doughnut-shaped white domain WD (or black domain BD) is produced by dividing a pattern as shown in FIG. 39. The technique to be used for extracting points ($C_2$, $C_3$, $C_5$, $C_6$, $C_{C8}$, $C_9$, $C_{11}$, $C_{12}$ in FIG. 34) that are separated from corresponding points on the outer periphery by a predetermined distance either to the inside or to the outside of the outer periphery is not limited to the above described one and may be selected from various other similar techniques.

While control point strings are extracted as pattern information for generating Bezier curves in the above description, they may alternatively be extracted as pattern information for generating rational Bezier curves, B spline curves, rational B spline curves or some other similar curves. The use of such curves also provides the advantages of the above described fourth processing procedure.

Additionally, in the above description of the fourth processing procedure, the verification means for verifying the validity of a sheet of printing paper is adapted to generate Bezier curves from control point strings and then reconfigured white domains and reconfigured black domains by solidly blotting out the regions defined by the Bezier curves and computationally determine the phase-limited correlation between each of the reconfigured white domains and a corresponding domain according to the pattern information stored in a memory means. However, it may alternatively be so arranged as to generate rational Bezier curves, B spline curves, rational B spline curves or some other similar curves from control point strings. Still additionally, a technique other than the one using phase-limited correlations may alternatively be used for the purpose of the invention. The use of such a technique also provides the advantages of the above-described fourth processing procedure.

Authentication Process Sequence

Figure 40:
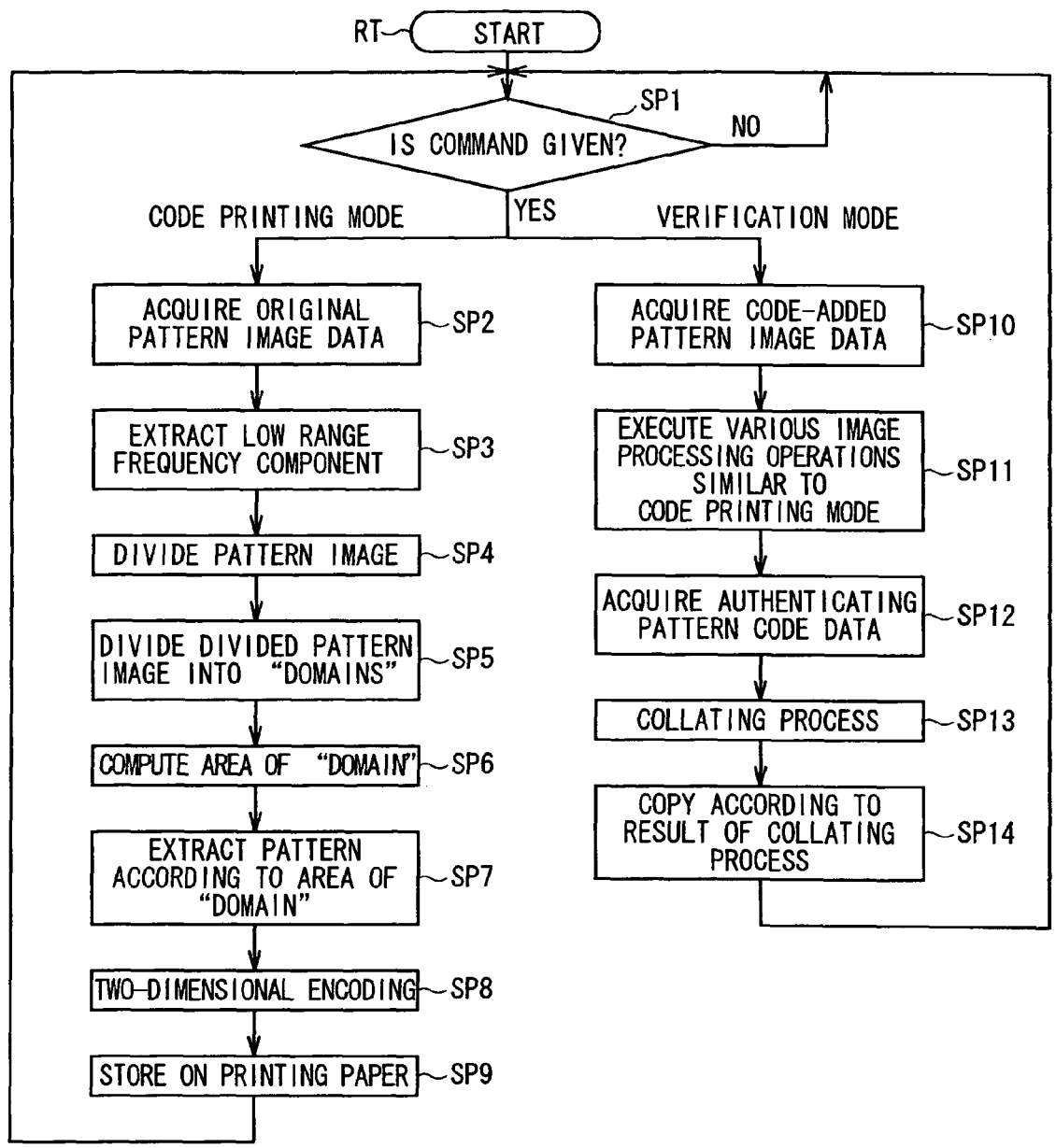
FIG. 40 is a flow chart of the sequence of an authentication process that can be used for the purpose of the present invention.

The control section 2 follows one of the first through fourth processing procedures according to the authentication process sequence RT as illustrated in FIG. 40.

As the main power source of the apparatus for preventing unauthorized copying is activated, the control section 2 starts the authentication process sequence RT at Step SP0 and then, in the next Step SP1, it waits for a printing command or a copying command for printing the authenticating pattern code BC (FIG. 2(A)).

If the control section 2 receives a printing command from the operating section (not shown) in Step SP1, it controls the scanner section 4 and acquires the original pattern image data D1 in the subsequent step, or Step SP2. Thereafter, in Step SP3, it generates a low range pattern image data D11 for a low range component pattern image IM2 (FIG. 7(A)) by executing a low range frequency component extracting process on the original pattern image data D1. In the next Step SP4, the control section 2 executes an image dividing/separating process on the low range pattern image data D11 to generate a white component pattern image data D12 for a white component pattern image WIM (FIG. 7(B)) and a black component pattern image data D13 for a black component pattern image BIM (FIG. 7(C)).

Subsequently, the control section 2 executes a pattern dividing/region defining process on the white component pattern image data D12 and the black component pattern image data D13 to generate a white domain data D14 for a plurality of white domains WD ($WD_1$ through $WD_n$) and a black domain data D15 for a plurality of black domains BD ($BD_1$ through $BD_n$) in Step SP5. Then, the control section 2 computationally determines the area of each of the white domains WD on the basis of the white domain data D14 and that of each of the black domains BD on the basis of the black domain data D15 in Step SP6.

Then, in Step SP7, the control section 2 sequentially executes a pattern extracting process on each of the white domains WD and the black domains BD, following the first (or second) processing procedure, the third processing procedure or the fourth processing procedure according to the threshold values selected in advance as references for selecting the procedure in order to generate an authenticating pattern data D16.

Actually, such threshold values include a first threshold value (to be referred to as low threshold value hereinafter), a second threshold value greater than the first threshold value (to be referred to as intermediate threshold value hereinafter) and a third threshold value greater than the second threshold value (to be referred to as high threshold value hereinafter). When the area of the domain to be processed is found in a first range smaller than the low threshold value or not smaller than the low threshold value but smaller than the intermediate threshold value, the control section 2 executes the pattern extracting process, following the third processing procedure, in order to generate data for expressing circle information values as pattern.

When, on the other hand, the area of the domain to be processed is found in a second range not smaller than the intermediate threshold value but smaller than the high threshold value, the control section 2 executes the pattern extracting process, following either the first processing procedure or the second processing procedure in order to generate data for expressing rectangle information values (ellipse information values) as pattern. When, finally, the area of the domain to be processed is found in a third range not smaller than the high threshold value, the control section 2 executes the pattern extracting process, following the fourth processing procedure in order to generate data for expressing control point strings for generating Bezier curves as pattern. The data generated for the individual white domains WD and the individual black domains BD are obtained as authenticating pattern data D16.

Thereafter, in Step SP8, the control section 2 executes a two-dimensional code producing process on the authenticating pattern data D16 to generate an authenticating pattern code data D2 and then, in Step S9, it controls the printer section 5 so as to store an authenticating pattern code BC on a sheet of printing paper according to the authenticating pattern code data D2. Then, the processing operation returns to Step SP1.

If, on the other hand, the control section 2 receives a copying command from the operating section (not shown) in Step SP1, it controls the scanner section 4 and acquires the code-added pattern image data D3 in the subsequent step, or Step SP10. Then, the control section 2 carries out an image processing operation on the code-added pattern image data D3, which is similar to the above-described image processing operation conducted on the original pattern image data D1 in Step S11.

More specifically, the control section 2 executes a low range frequency component extracting process, an image dividing/separating process and a pattern dividing/region defining process of the above described steps, or Step S3 through Step S5, and then computationally determines the area of each of the white domains WD on the basis of the white domain data D14 and that of each of the black domains BD on the basis of the black domain data D15 obtained as a result of the pattern dividing/region defining process as in Step SP6. Then, the control section 2 executes a pattern extracting process, following the preselected first or second processing procedure, only when the area of each of the domains to be processed is found in the first and second range as in the above-described Step SP7 to generate a comparative pattern data D26. In this way, the comparative pattern data D26 generated for the domains each of whose area is found in the first or second range and the white domain data D14 and the black domain data D15 generated for the domains each of whose area is found in the third range are acquired so as to be compared with the authenticating pattern code BC stored on the printing paper.

Thereafter, in the next step, or Step S12, the control section 2 controls the scanner section 4 so as to acquire the authenticating pattern code data D2 on the basis of the authenticating pattern code BC stored on the printing paper and then, in Step S13, it collates the authenticating pattern code data D2 and the corresponding data including the white domain data D14 and the black domain data 15 and the comparative pattern data D26. Then, in Step S14, the control section 2 controls the printer section 5 to copy the contents of the printing paper according to the result of the collation before it returns to Step SP1.

Thus, the control section 2 is adapted to execute the related processes, following one of the first through fourth processing procedures. Since the control section 2 is adapted to extract relatively larger domains from a pattern that characterize the pattern as pattern data, it is possible to emphatically extract the domains that characterize the pattern and reduce the time required to extract the remaining domains. However, the control section 2 may alternatively be so adapted as to extract domains from a pattern that are defined as middle-sized domains as detailed pattern data. Then, it is possible to extract the average characteristics of the domains of the pattern and reduce the time required to extract the domains.

Processing Operation of the Control Section of the Second Embodiment

Now, the processing operation of the control section 2 of the second embodiment will be described below.

While a pattern image is divided into domains and a characteristic quantity is extracted from each of the domains as pattern in the above-described first embodiment, the second embodiment differs from the first embodiment in that the pattern image is not divided but grasped as a whole to extract a pattern from the pattern image in the second embodiment.

Figure 41:
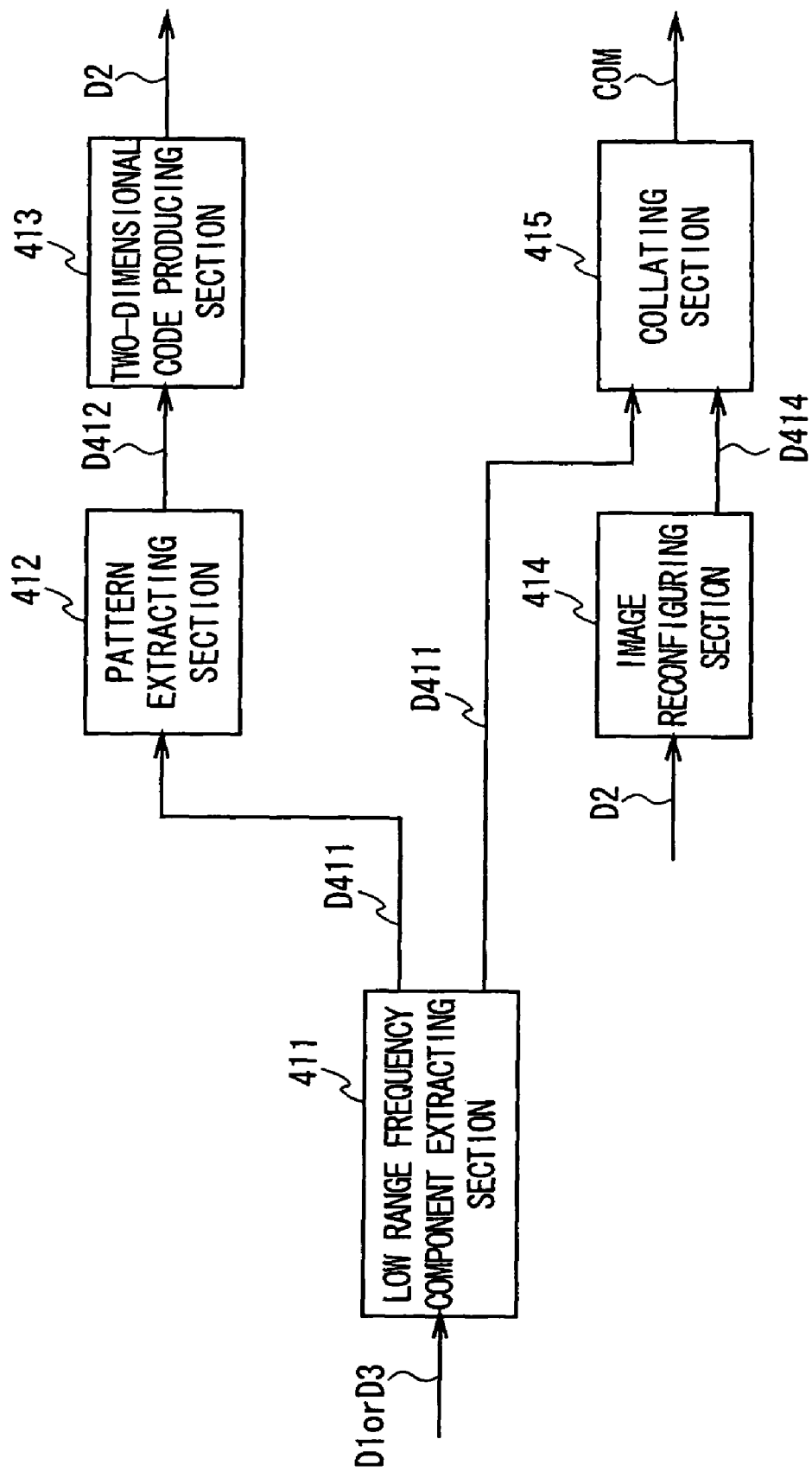
FIG. 41 is a schematic block diagram of the control section of the second embodiment, illustrating the processing procedure thereof.

FIG. 41 is a schematic block diagram of the control section 2 of the second embodiment of the invention. Referring to FIG. 41, the control section 2 comprises a low range frequency component extracting section 411 for extracting a pattern image of a low range frequency component (to be referred to as low range pattern image hereinafter) from a pattern image, a pattern extracting section 412 for extracting a pattern from the low range pattern image, a two-dimensional code producing section 413 for transforming the pattern into a two-dimensional bar code, an image reconfiguring section 414 for reconfiguring a low range pattern image from the pattern and a collating section 415 for verifying the validity of the code-added printing paper XPc (FIG. 2(B)), using the reconfigured pattern image (to be referred to as reconfigured low range pattern image hereinafter).

In a code printing mode, the control section 2 executes various processes on the original pattern image data D1 given from the scanner section 4 by means of the low range frequency component extracting section 411, the pattern extracting section 412 and the two-dimensional code producing section 413 and transmits the pattern code data D2 obtained as a result of executing the processes to the printer section 5.

In a verification mode, the control section 2 drives the collating section 415 to collate the outcome of the low range frequency component extracting process executed on the code-added pattern image data D3 given from the scanner section 4 by means of the low range frequency component extracting section 411 and the outcome of the image reconfiguring process executed on the pattern code data D2 given from the scanner section 4 by means of the image reconfiguring section 414.

Now, the low range frequency component extracting process of the low range frequency component extracting section 411, the pattern extracting process of the pattern extracting section 412, the two-dimensional code producing process of the two-dimensional code producing section 413, the image reconfiguring process of the image reconfiguring section 414 and the collating process of the collating section 415 will be described individually in greater detail below.

Low Range Frequency Component Extracting Process

The low range frequency component extracting section 411 acquires a region pattern image IM1 (FIG. 6(A)) of the specified region AR (FIGS. 2(A) and 2(B)) of the pattern image on the original printing paper OP (FIG. 2(A)) or the pattern image on the code-added printing paper XPc (FIG. 2(B)) and extracts a low range component pattern image IM2 (FIG. 6(B)) from the region pattern image IM1 as in the case of the above described low range frequency component extracting section 11 of the first embodiment.

In a code printing mode, the low range frequency component extracting section 411 transmits the generated low range pattern image data D411 to the pattern extracting section 412. In a verification mode, on the other hand, the low range frequency component extracting section 411 transmits the generated low range pattern image data D411 to the collating scanning 415.

Thus, the low range frequency component extracting section 411 is adapted to remove the various noise components generally contained in a high frequency component of an image such as the noises of the solid state image pickup element in the scanner section 4 by extracting the low range component pattern image IM2.

As a result, the low range frequency component extracting section 411 can avoid the degradation of the pattern extraction accuracy at the pattern extracting section 412 that is attributable to various noise components and hence improve the reliability of the outcome of the collation in the collating process of the collating section 415.

Pattern Extracting Process

Figures 42, 44:
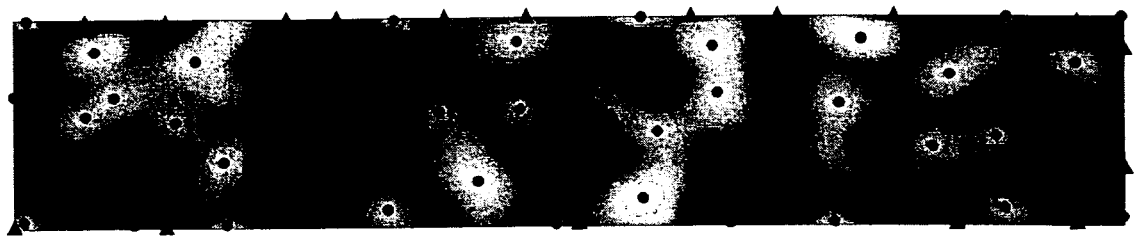
FIG. 42 is a schematic illustration of extraction of a pattern.
FIG. 44 is a schematic illustration of the data size of a minimal point or a maximal point.

Typically as shown in FIG. 42, the pattern extracting section 412 detects pixels showing the lowest luminance value (to be referred to as minimal points hereinafter) PS (PS$_1$ through PS$_n$) on the curved surface formed by the luminance values of the low range component pattern image IM2 and pixels showing the highest luminance value (to be referred to as maximal points hereinafter) PL (PL$_1$ through PL$_n$) on the curved surface and computes the average of the luminance values (to be referred to as luminance average hereinafter) of the low range component pattern image IM2.

As clear from FIG. 42, the minimal points PS (black dots in FIG. 42) are found substantially at the respective centers of regions formed by units of sets of adjacently located pixels, each showing a luminance value higher than a predetermined low luminance value, (to be referred to as white pixels hereinafter), whereas the maximal points PL (black triangles in FIG. 42) are found substantially at the respective centers of regions formed by units of sets of adjacently located pixels, each showing a luminance value lower than a predetermined high luminance value, (to be referred to as black pixels hereinafter). The minimal points PS and the maximal points PL are characteristic points of the pattern of the low range component pattern image IM2.

Thus, the outcome of the detection of the minimal points PS and the maximal points PL represents the pattern of the region pattern image IM1 (FIG. 6(A)) (or the characteristic pattern of the pattern contained in the region pattern image IM1).

Figure 43:
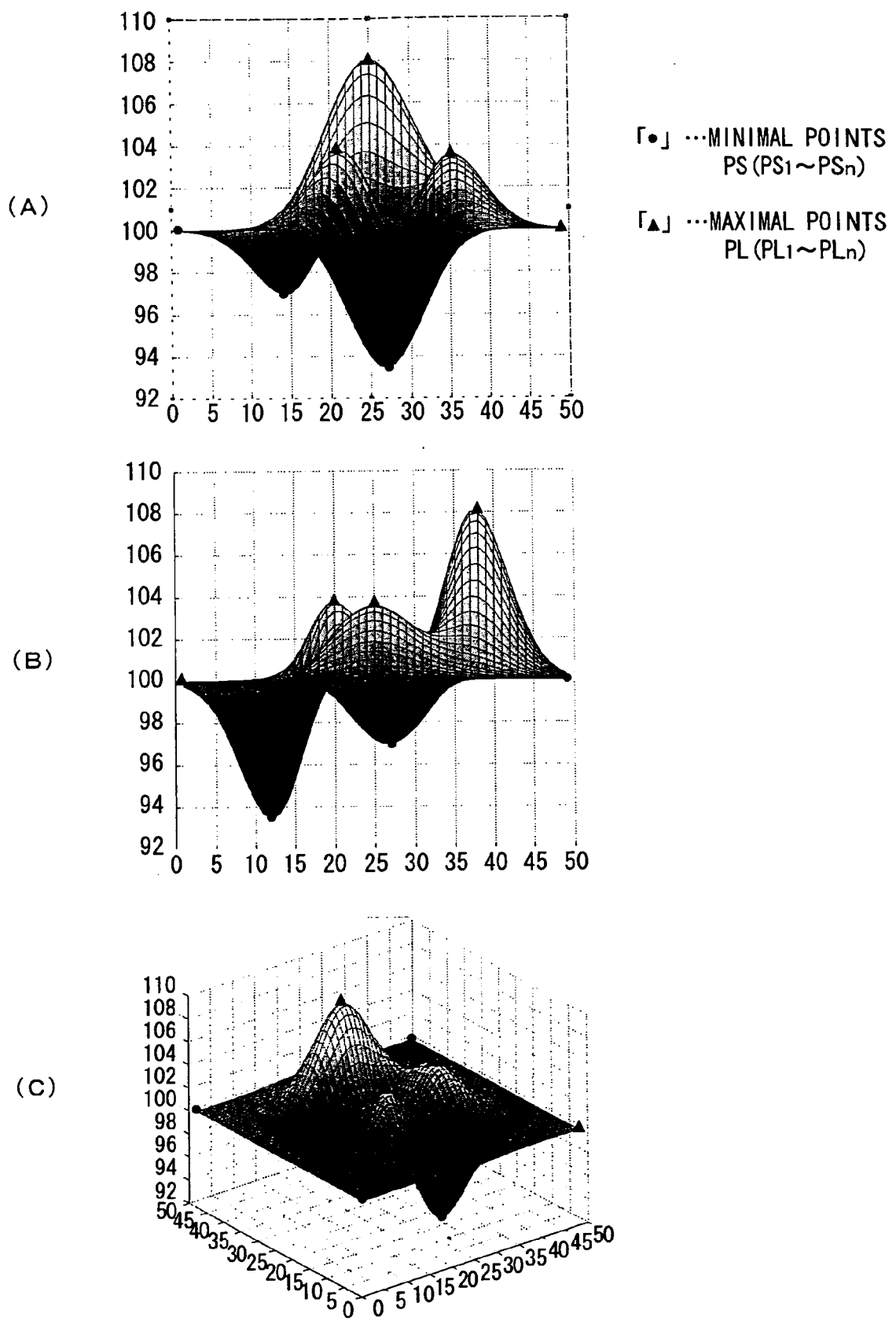
FIG. 43 is schematic illustrations of detection of minimal points and maximal points.

Actually, as shown in FIGS. 43(A) through 43C, the pattern extracting section 412 recognizes the transversal direction of the low range component pattern image IM2 according to the low range pattern image data D411 supplied from the low range frequency component extracting section 411 as x-axis, the longitudinal direction of the low range component pattern image IM2 as y-axis and the luminance values as z-axis. Note that FIGS. 43(A) through 43C show the spatial states formed by the luminance values of the low range component pattern image IM2. More specifically, FIG. 43(A) shows the spatial state of the front side and FIG. 43(B) shows spatial state of the lateral side, whereas FIG. 43C shows the spatial state of the slope.

The pattern extracting section 412 detects the minimal points PS and the maximal points PL in the low range component pattern image IM2 and computes the luminance average on the basis of the outcome of the recognition and transmits the positions of the minimal points PS, those of the maximal point PL, the luminance values, and the luminance average to the two-dimensional code producing section 413 as data (to be referred to as pattern data hereinafter) D412.

Thus, the pattern extracting section 412 is adapted to extract characteristics of a pattern as pattern data by way of simple computations.

If the data ranges as shown in FIG. 44 are defined respectively for a minimal point PS, a maximal point PL and a luminance value, the data size of a single minimal point PL or a maximal point PL is found to be about 40 [bits] in an experiment. Thus, the pattern extracting section 412 is adapted to characterize a pattern by means of a pattern data D412 having a small data size.

Two-Dimensional Code Producing Process

The two-dimensional code producing section 413 stores the pattern on the original printing paper OP as authenticating pattern code BC (FIG. 2(A)).

More specifically, the two-dimensional code producing section 413 discards the decimals of the pattern data D412 supplied to it and executes a two-dimensional barcode producing process on the pattern data D412 obtained by discarding the decimals according to the code character string information stored in the information storage memory in advance to generate pattern code data D2. Then, the two-dimensional code producing section 413 transmits the data to the printer section 5 at a predetermined timing.

As a result, the pattern code data D2 is printed as pattern code BC (FIG. 2(A)) at a predetermined position on the printing paper (original printing paper OP) placed on the printing paper table of the printer section 5 so as to record the authenticating pattern on the original printing paper OP (FIG. 2(A)).

It may be clear from FIG. 13 that any known binary data of about 1 to 3 [Kbytes] can be transformed into a two-dimensional bar code by means of a known two-dimensional bar code forming process. Therefore, the two-dimensional code producing section 413 can appropriately transform the pattern data D412 into a pattern code data D2 as clear from the outcome of the experiment illustrated in FIG. 44 if a known two-dimensional code is applied.

Image Reconfiguring Process

Figure 45:
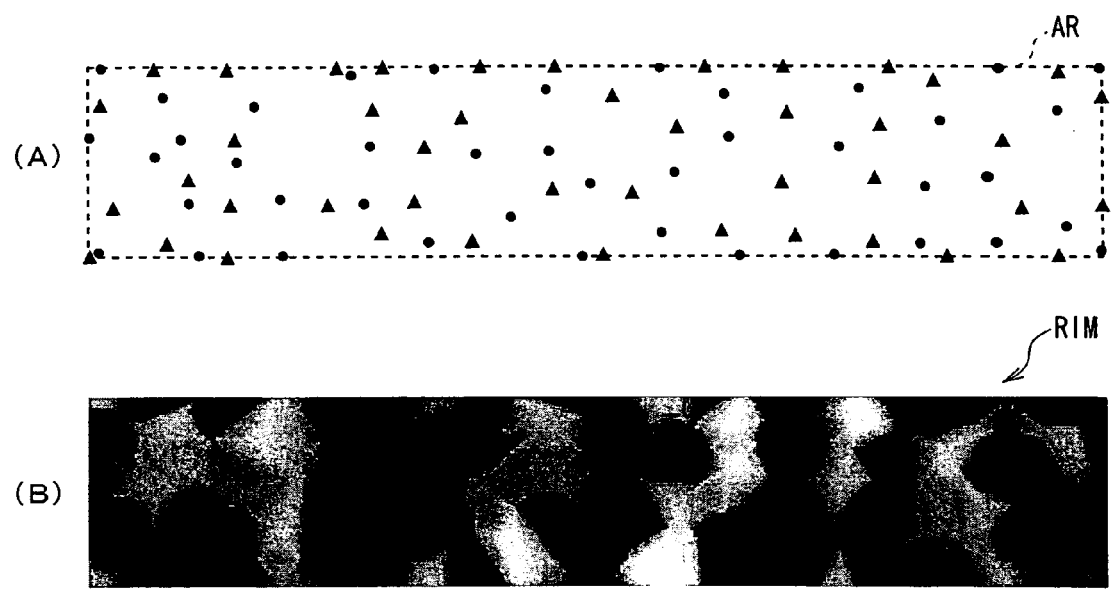
FIG. 45 is schematic illustrations of image reconfiguration.

The image reconfiguring section 414 generates a reconfigured low range pattern image RIM as shown in FIG. 45(B) from the minimal points PS (PS$_1$ through PS$_n$) and the maximal points PL (PL$_1$ through PL$_n$) of a specified region AR as shown in FIG. 45(A).

More specifically, the image reconfiguring section 414 recognizes the positional relationship of the specified region AR (FIG. 2) and each of the minimal points PS (PS$_1$ through PS$_n$) and the maximal points PL (PL$_1$ through PL$_n$) as shown in FIG. 45(A) according to the minimal points PS (PS$_1$ through PS$_n$) and the maximal points PL (PL$_1$ through PL$_1$) in the supplied pattern code data D2 and the region position information stored in the information storage memory in advance.

In this state, the image reconfiguring section 414 executes a Voronoi division process, using the minimal points PS and the maximal points PL it recognizes as reference points. More specifically, the image reconfiguring section 414 divides all the pixels of the specified region AR (FIG. 2) except the reference points (black circles and the black triangles in FIG. 45), regarding each of them as if it belongs to the reference point located closest to the pixel, to generate a plurality of small regions.

Then, the image reconfiguring section 414 generates a reconfigured low range pattern image RIM (FIG. 45(B)) by determining the luminance state of each small region in the specified region AR (FIG. 2) that are generated by way of the Voronoi division process according to the luminance information (the luminance values of the minimal points PS and the maximal points PL and the luminance average) of the pattern code data D2. Subsequently, the image reconfiguring section 414 transmits the reconfigured low range pattern image RIM to the collating section 415 as data (to be referred to as reconfigured low range pattern image data hereinafter).

Figure 47:
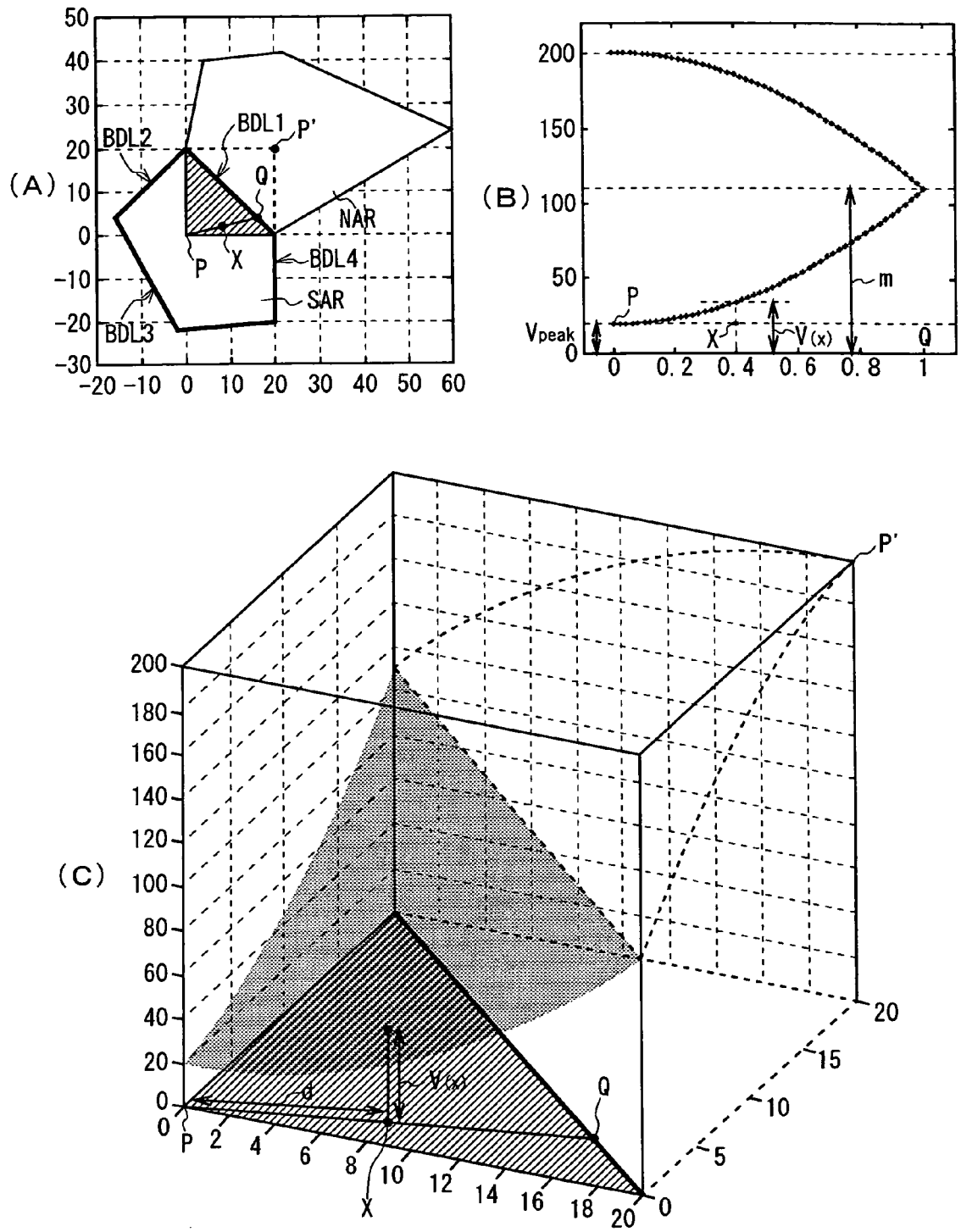
FIG. 47 is schematic illustrations of determination of a luminance value in a small region.

Now, the technique of determining the luminance state of each small region will be described specifically by referring to FIGS. 47(A) through 47(C). For the convenience of explanation, the luminance state of only a single small region is determined by the technique in the following description.

Referring to FIG. 47(A), the image reconfiguring section 414 determines the luminance state of the triangle (shaded area in FIG. 47(A)) defined by the boundary line BDL separating an object small region ARS to be processed (to be referred to as object small region hereinafter) and a small region NAR neighboring the object small region SAR (to be referred to as neighboring small region hereinafter) and the reference point in the object small region SAR (which is one of the minimal points PS$_1$ through PS$_n$ and the maximal points PL$_1$ through PL$_n$ (FIG. 42)), using the luminance value of the boundary line BDL and that of the reference point P.

Actually, as shown in FIGS. 47(B) and 47(C), if both the reference point P in the object small region SAR and the reference point P' in the neighboring small region NAR, the two small regions defining the boundary line BDL, are minimal points PS or maximal points PL, the image reconfiguring section 414 computes the average of the luminance values of the reference points P, P' and the luminance average of the pattern code data D2 as luminance value m of the boundary line BDL1.

If, on the other hand, the reference point P in the object small region SAR and the reference point P' in the neighboring small region NAR are of different types, the image reconfiguring section 414 computes average of the luminance values of the reference points P, P' as the luminance value m of the boundary line BDL1.

Then, if the pixel whose luminance value is to be determined (to be referred to as object pixel hereinafter) is X, the image reconfiguring section 414 determines the luminance value $V_{(X)}$ of the object pixel X by means of the exponential function of formula (17) below;

$$V_{(x)} = V_{peek} - (V_{peek} - m) \cdot d^2 \tag{17},$$

where d5 is the distance between the object pixel X and the reference point P and $V_{peek}$ is the luminance value of the reference point P, using the computed luminance value of the boundary line BDL1 and normalizing the distance PQ between the reference point P and the intersection Q of a prolonged line of the segment PX and the boundary line BDL as "1".

In this way, the image reconfiguring section 414 determines the luminance value of each of the pixels in the shaded triangle by means of the exponential function of the formula (17).

As a result, the image reconfiguring section 414 can determine the luminance value of each of the pixels from the reference point P to the boundary line BDL1 in such a way that the luminance values of the pixels are mildly differentiated as shown in FIGS. 47(B) and 47(C). Then, it is also possible to accurately reproduce a pattern image.

FIGS. 47(B) and 47(C) show that the luminance value m on the boundary line BDL1 is "110", while the reference point P is one of the minimal points PS$_1$, PS$_2$, . . . , PS$_n$ and the reference point P' in the neighboring small region NAR is one of the maximal points $PL_1$, $PL_2$, ..., $PL_n$. FIG. 47(B) two-dimensionally shows the luminance state between the reference points P and P' and FIG. 47(C) three-dimensionally shows the luminance state between the reference points P and P' as determined by the formula (1).

At the same time, the image reconfiguring section 414 is also adapted to determine the luminance state of the triangles formed respectively by the boundary lines BDL2 through 4 and the reference point P as in the case of the triangle formed by the boundary line BDL1 and the reference point P.

Figure 48:
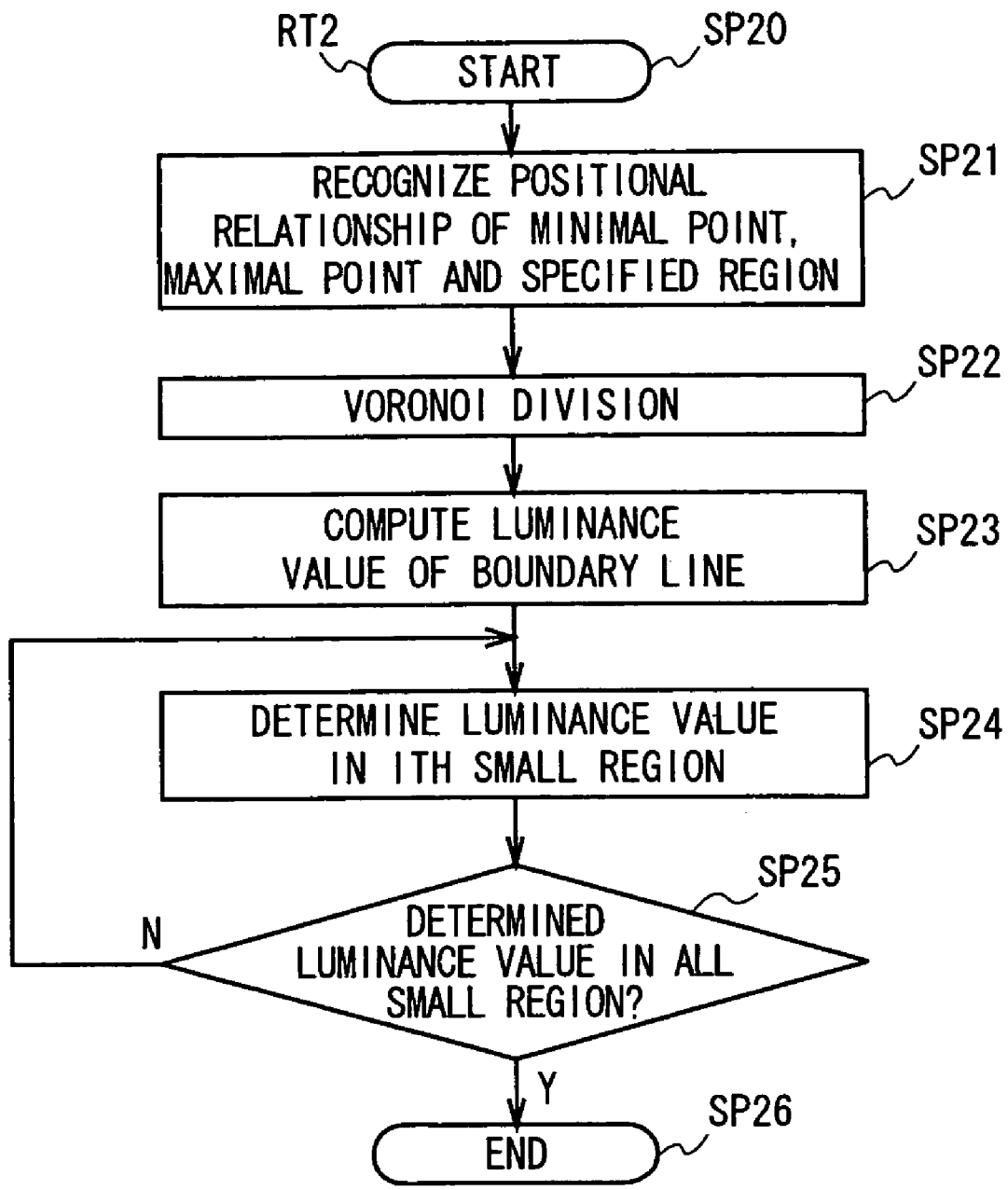
FIG. 48 is a flow chart of the sequence of an image reconfiguration process.

The above-described image reconfiguration process is executed by following the image processing sequence RT as shown in FIG. 48.

Referring to FIG. 48, as the pattern code data D2 is supplied from the scanner section 4 (FIG. 4), the image reconfiguring section 414 starts the image processing sequence RT from Step SP20 and then proceeds to Step SP21, where it recognizes positional relationship of each of the minimal points PS ($PS_1$ through $PS_n$), the maximal points PL ($PL_1$ through $PL_n$) and the specified region AR (FIG. 2) from the pattern code data D2. Then, the image reconfiguring section 414 proceeds to the next step, or Step SP22, where it executes a Voronoi division process to generate a plurality of small regions by dividing the inside of the specified region AR.

Then, the image reconfiguring section 414 proceeds to the next step, or Step SP23, where it computes all the luminance values m of the boundary lines BDL (FIG. 47) of the generated small regions, and subsequently proceeds to Step SP24, where it sequentially determines the luminance state of the inside of object small region SAR (the luminance value of each of the pixels in the object small region SAR) by means of the exponential function of the formula (17). Then, the image reconfiguring section 414 proceeds to Step SP25, where it determines if all the luminance states of all the small regions in the specified region AR are determined or not.

If the result of the determination is negative, the image reconfiguring section 414 returns to Step SP24, where it repeats the above process for the object small region SAR, which is one of the remaining small regions. If, on the other hand, the result of the determination is positive, the image reconfiguring section 414 recognizes the obtained reconfigured low range pattern image RIM as the next object to be processed and transmits the reconfigured low range pattern image RIM to the collating section 415 as reconfigured low range pattern image data D414. Thereafter, the image reconfiguring section 414 proceeds to Step SP26 to complete the image processing sequence RT.

In this way, the image reconfiguring section 414 is adapted to accurately reproduce the reconfigured low range pattern image RIM from the pattern (the minimal points PS and the maximal points PL) extracted from the low range component pattern image IM2 as will be clearly understood by comparing the low range component pattern image IM2 (FIG. 42) and the reconfigured low range pattern image RIM (FIG. 45(B)) that corresponds to the low range component pattern image IM2.

Collating Process

Figure 49:
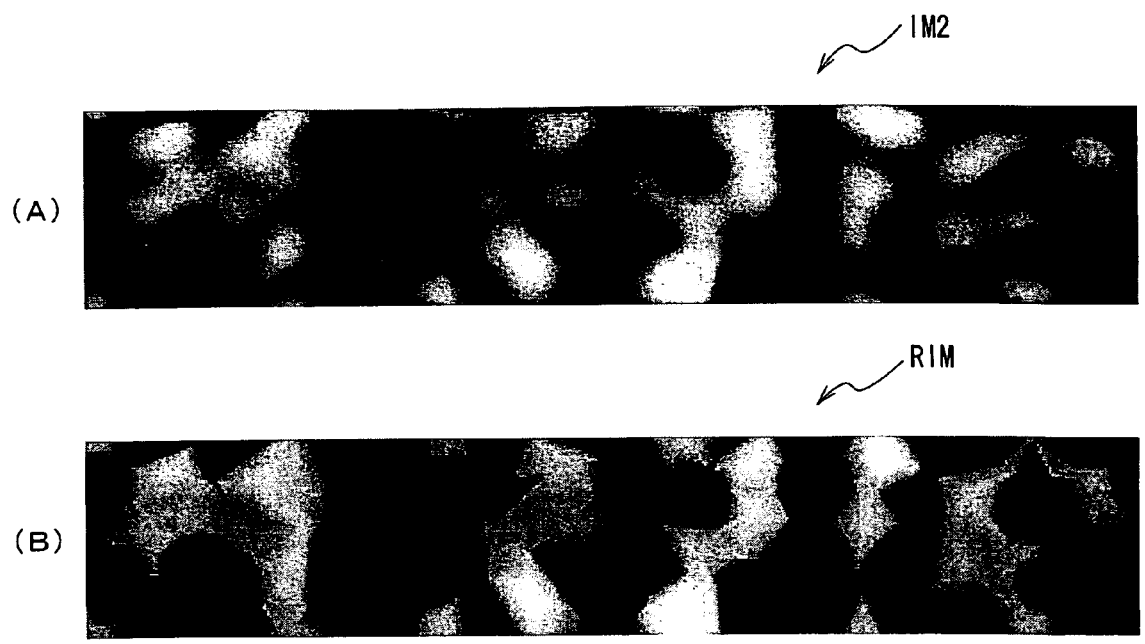
FIG. 49 is schematic illustrations of a low range pattern image and a reconfigured low range pattern image.

As shown in FIG. 49, the collating section 415 collates the reconfigured low range pattern image RIM and the low range component pattern image IM2 extracted from the code-added printing paper XPc (FIG. 2(B)).

More specifically, the collating section 415 executes a predetermined mutual correlation process on the reconfigured low range pattern image data D414 supplied from the image reconfiguring section 414 and the low range component pattern image data D411 supplied from the scanner section 4 by way of the low range frequency component extracting section 411 at the same time and computes the agreement rate between the reconfigured low range pattern image RIM and the low range component pattern image IM2 (FIG. 49).

If an agreement rate not higher than a predetermined threshold value is obtained, the collating section 415 determines that the sheet of code-added printing paper XPc (FIG. 2) placed on the original table of the scanner section 4 is a copied one and transmits a message of prohibiting copying the code-added printing paper XPc to the display section (not shown) of the scanner section 4.

If, on the other hand, an agreement rate higher than the predetermined threshold value is obtained, the collating section 415 determines that the sheet of code-added printing paper XPc (FIG. 2) placed on the original table of the scanner section 4 is a proper original printing paper OP and generates a copying authorizing command COM (FIG. 5), which is then transmitted to the scanner section 4 (FIG. 4).

Then, the scanner section 4 is driven to operate in a reflection mode and the printed contents of the code-added printing paper XPc (original printing paper OP) placed on the original table are transmitted to the printer section 5 as printed contents image data D4. As a result, the printer section 5 copies the printed contents of the original printing paper OP on a sheet of printing paper (FIG. 2(A)).

In this way, the collating section 415 is adapted to execute a collating process and authorize copying the printed contents printed on the original printing paper OP (FIG. 2(A)) only when an agreement rate higher than a predetermined threshold value is obtained as a result of the collation.

Thus, the control section 2 of the second embodiment does not divide the pattern image into domains but extracts a pattern by recognizing the pattern image as a whole. Thus, the second embodiment is adapted to reduce the processing load remarkably if compared with the first embodiment.

The Operations and the Advantages of the Embodiments

Thus, an apparatus for preventing unauthorized copying 1 according to the invention is adapted to extract a pattern (pattern characteristic quantity) from the pattern image of a sheet of original printing paper OP (FIG. 2(A)) and stores the pattern on the original printing paper OP as information on the object of authentication.

When copying the printed contents printed on a sheet of code-added printing paper XPc, the apparatus for preventing unauthorized copying 1 checks if the code-added printing paper XPc is original printing paper OP or not on the basis of the pattern stored on the code-added printing paper XPc.

Therefore, the apparatus for preventing unauthorized copying 1 can determine if the code-added printing paper XPc is an original or not by means of the pattern stored on the printing paper itself. Thus, it can prevent any unauthorized copying with ease without requiring the use of special paper.

Thus, the proprietor of the original printing paper OP can copy the original printing paper OP without paying particular attention to the problem of unauthorized copying when copying the original printing paper OP.

With the above described arrangement that the pattern (pattern characteristic quantity) extracted from the pattern image of original printing paper is stored on the original printing paper and the validity of the original printing paper OP is verified on the basis of the pattern stored on the printing paper XPc when the printed contents are to be copied, it is possible to determine if the printing paper XPc is an original or not by means of the pattern that the printing paper carries. Thus, it is possible to prevent any unauthorized copying with ease without requiring the use of special paper and hence protect the printed contents with ease.

Other Embodiments

While an image pickup means (scanner section 4) is used as acquiring means for acquiring pattern information on the basis of the pattern printed on printing paper by shooting the pattern and extracting the pattern from the picked up pattern image in each of the above described embodiments, the present invention is not limited thereto and alternatively the pattern may be visualized by means of a chemical agent or the like and information on the pattern may be acquired by electrophoresis.

While a scanner section 4 is used as image pickup means for shooting the pattern printed on printing paper in a transmission mode, in a reflection mode and in a code read mode in each of the above described embodiments, the present invention is by no means limited thereto. However, what is essential to the present invention is to irradiate the printing paper that carries a pattern and generate a signal of the pattern image by a solid state image pickup element and hence any of various alternative image pickup means may be used for the purpose of the present invention.

Additionally, while the extraction means for extracting a characteristic quantity of a pattern image is adapted to sequentially execute a low range frequency component process, an image dividing/separating process, a pattern dividing/region defining process and a pattern extracting process (1st Embodiment) or a low range frequency component process and a pattern extracting process (2nd Embodiment) in order to extract the pattern in the above description, the present invention is by no means limited thereto. In other words, it is not necessary for the purpose of the present invention to execute all the above listed processes and one or more than one other processes may be added. Any of the above listed process may be modified for the purpose of the invention.

For example, the first embodiment may be so modified that only the pattern dividing/region defining process and the pattern extracting process are executed to omit the low range frequency component process and the image dividing/separating process. Inversely, the first embodiment may be so modified that only the low range frequency component process and the image dividing/separating process are executed to extract a white component pattern image WIM (FIG. 7(B)) and a black component pattern image BIM (FIG. 7(C)) as pattern information that are obtained as a result as pattern information. Alternatively, the first embodiment may be so modified that only the low range frequency component process is executed to extract a low range component pattern image IM2 (FIG. 7(A)) that is obtained as a result. Additionally, it may alternatively be so arranged that the pattern image picked up by the image pickup means (scanner section 4) is divided into 5×5 image regions, for example, and only one of the extracted regions is finally extracted as pattern information. Still alternatively, it may be so arranged that the pattern of one of the extracted regions is divided to define smaller regions as in the pattern dividing/region defining process of the pattern dividing/region defining section 13 and subsequently a characteristic quantity is extracted from them.

While an appropriate pattern extracting process is selected depending on the area of the domain to be processed in the first embodiment, it may alternatively be so arranged that an appropriate pattern extracting process is selected depending on the degree of complexity of the pattern image. The degree of complexity may be defined by the number of pixels of the edges, for instance. On the other hand, the low range frequency component process of the second embodiment may be omitted.

While values obtained by approximating the profiles of domains to a rectangle, an ellipse or a circle (rectangle information values, ellipse information values, circle information values (characteristic quantities)) are used to extract the characteristics of a pattern image in the first embodiment, any other geometric shape may alternatively be used for approximation in order to extract characteristic quantities. Additionally, while characteristic quantities are extracted from a specified area AR (FIG. 2) of a pattern image in the first embodiment, they may alternatively be extracted from a plurality of specified areas or from the entire pattern image.

On the other hand, while minimal points PS (FIG. 42), maximal points PL (FIG. 42) and a luminance average are extracted in the second embodiment, only minimal points PS, maximal points PL or minimal point PS and maximal point PL may alternatively be extracted. Still alternatively, predetermined pixels showing any of various luminance values may be extracted as minimal points PS and/or maximal points PL. While characteristic quantities of a pattern image are extracted from a specified area AR (FIG. 2), they may alternatively be extracted from a plurality of specified areas or from the entire pattern image.

Figure 50:
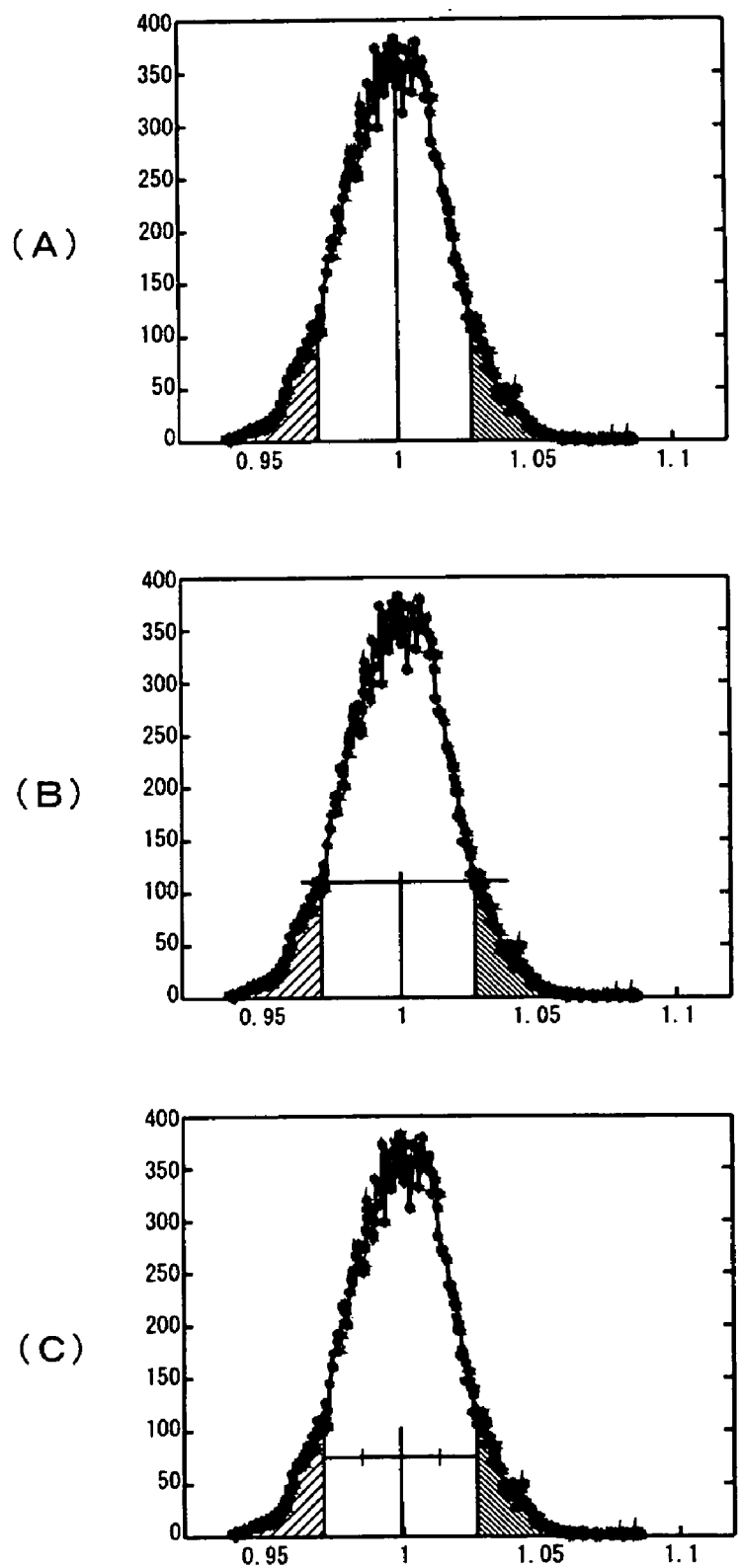
FIG. 50 is schematic illustrations of image separation using luminance histograms in another embodiment.

While a white component pattern image WIM and a black component pattern image BIM are separated so as to make the number of white pixels and that of black pixels take 20[%] of the entire pixels in a low range component pattern image IM2 (FIG. 7(A)) in the image dividing/separating process of the first embodiment, it may alternatively be so arranged that the luminance value at the center of a luminance range is determined in a luminance histogram and the pixels showing a luminance value not higher (or not lower) than the determined luminance value by a predetermined luminance value are separated for a white component pattern image WIM (or a black component pattern image BIM) as shown in FIG. 50(A). With this arrangement, the luminance value of the center may be that of the pixels whose number is largest or that of the middle point of the intersections of an arbitrarily selected number of times (number of pixels) and the histogram curve.

Alternatively, in the image dividing/separating process, the average luminance value of the luminance values of all the pixels of the low range component pattern image IM2 (FIG. 7(A)) may be determined and the pixels showing a luminance value not higher (or not lower) than the determined average luminance value by a predetermined luminance value may be separated for a white component pattern image WIM (or a black component pattern image BIM) as shown in FIG. 50(C).

What is essential is that the advantages of the above described embodiments can be achieved by separating images of a low luminance component and a high luminance component (a white component pattern image WIM and a black component pattern image BIM) so as to make them reflect the area ratio of the pattern image (low range component pattern image IM2) before the separation.

Figure 46:
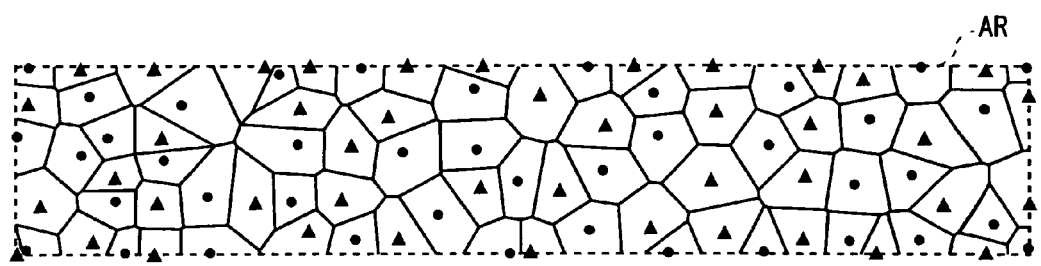
FIG. 46 is a schematic illustration of Voronoi division.

While a plurality of small regions are generated (FIG. 46) by dividing a specified region AR by Voronoi division, using minimal points PS (FIG. 42) and maximal points PL (FIG. 42) of a pattern as reference points and the luminance state of each small region is determined to make the luminance state between reference points P, P' in neighboring regions (FIG. 47(C)) mild by using the luminance values of the reference points in the reconfiguring process of the second embodiment, the present invention is by no means limited thereto and any of other known dividing techniques may be used to generate a plurality of small regions and the luminance state of each of the small regions may be determined by any of other known techniques.

For example, in place of using Voronoi division, the specified region AR may be divided by means of a table showing the correspondence between the positions/states of the minimal points PS (FIG. 42) and the maximal points PL (FIG. 42).

While the luminance state of each small region is determined by means of the exponential function of the formula (1) in order to make the luminance state between the reference points P, P' in neighboring regions (FIG. 47(C)) mild in the above description, a linear function or a table showing the correspondence between the inter-reference-point distance of the reference points P, P' and the luminance state between them may alternatively be used to determine the luminance state.

While the luminance value of the boundary line BD (FIG. 47) of neighboring small regions is computed, if necessary, by using the luminance average of the low range frequency component image IM2 before determining the luminance state of each small region by means of the exponential function of the formula (17) in the above description, the advantages of the embodiment can be achieved without using the luminance average.

While a pattern (pattern characteristic quantity) is printed on printing paper (original printing paper OP) as authenticating code (two-dimensional bar code) BC (FIG. 2(A)) in order to store pattern information on the printing paper in each of the above described embodiments, the present invention is by no means limited thereto and punched holes or raised letters like Braille may be arranged on the printing paper to reflect the pattern or the pattern (pattern characteristic quantity) may be drawn directly on the printing paper. What is essential here is that various pieces of pattern information acquired by the acquiring means are stored.

A pattern is collated and verified by means of any of the techniques described by referring to FIGS. 14 through 18, FIGS. 22 through 26 and FIGS. 30 through 32 as verification means for verifying the validity of printing paper on the basis of pattern information stored in a memory means in each of the above described embodiments, the present invention is by no means limited thereto. What is essential is to adopt a collating technique that matches the pattern information acquired by the acquiring means.

While the configuration as illustrated in FIG. 4 is used for an apparatus for preventing unauthorized copying in each of the above described embodiments, the present invention is by no means limited thereto any other appropriate configuration may be used for the purpose of the present invention.

A program for causing the control section to execute the various processes shown in FIG. 5 or part thereof may be installed in an existing apparatus or a newly manufactured apparatus for handling paper of a copying machine or the like.

INDUSTRIAL APPLICABILITY

The present invention can find applications in various mediums including mediums of exchange for commercial goods such as paper money, mediums of certification of contents such as certificates, mediums of storing information such as personal works and as other mediums.

The invention claimed is:

1. An apparatus for preventing unauthorized copying of printed contents printed on printing paper, said apparatus comprising:

acquisition means for acquiring pattern information according to a pattern carried by the printing paper, the acquisition means including
image pickup means for shooting the pattern,
dividing means for dividing a pattern image, obtained as a result of the shooting of the pattern by the image pickup means, into a low luminance component and a high luminance component and separating the low luminance component and high luminance component from each other, and
extraction means for extracting the pattern information from the pattern image, the extraction means extracting the pattern information from the low luminance component and the high luminance component separated from each other;
storage means for storing the pattern information acquired by the acquisition means on the printing paper; and
verification means for verifying validity of the printing paper according to the pattern information stored by the storage means.

2. The apparatus according to claim 1, wherein said acquisition means includes:
extraction means for extracting the pattern information from a low range frequency component.

3. The apparatus according to claim 1, wherein the extraction means divides the pattern image into the low luminance component and the high luminance component so as to make them show a given area ratio relative to the pattern image.

4. The apparatus according to claim 1, wherein said acquisition means includes:
dividing means for dividing the pattern image so as to define a plurality of regions, and
extracting means for extracting pattern information from each of the defined regions.

5. The apparatus according to claim 1, wherein said acquisition means includes:
dividing means for dividing the pattern image so as to define a plurality of regions, and
extracting means for extracting a characteristic quantity from each of the defined regions as pattern information.

6. The apparatus according to claim 1, wherein the verification means corrects the pattern information and verifies validity of the printing paper according to the corrected pattern information.

7. The apparatus according to claim 1, wherein said acquisition means includes:
dividing means for dividing the pattern image so as to define a plurality of regions, and
extracting means for extracting a characteristic quantity from each of the defined regions as pattern information, wherein
the verification means corrects the pattern information and verify validity of the printing paper according to the corrected pattern information.

8. A method, implemented by an unauthorized copying preventing apparatus, for preventing unauthorized copying of printed contents printed on printing paper, said method comprising:
a first step of acquiring pattern information according to a pattern carried by the printing paper, the first step including
shooting the pattern,
dividing, by the unauthorized copying preventing apparatus, a pattern image, obtained as a result of the shooting of the pattern, into a low luminance component and a high luminance component and separating the low luminance component and high luminance component from each other, and extracting, by the unauthorized copying preventing apparatus, the pattern information from the pattern image by extracting the pattern information from the low luminance component and the high luminance component separated from each other;

a second step of storing the acquired pattern information on the printing paper; and a third step of verifying validity of the printing paper according to the stored pattern information.

9. A non-transitory computer-readable medium storing computer readable instructions thereon that when executed by a control device cause the control device to perform a method comprising:

acquiring pattern information according to a pattern carried by printing paper carrying predetermined contents;

shooting the pattern;

dividing a pattern image, obtained as a result of the shooting, into a low luminance component and a high luminance component and separating the low luminance component and high luminance component from each other; and extracting the pattern information from the pattern image by extracting the pattern information from the low luminance component and the high luminance component separated from each other;

storing the extracted pattern information on the printing paper; and verifying validity of the printing paper according to the pattern information stored on the printing paper.

10. An apparatus for preventing unauthorized copying of printed contents printed on printing paper, said apparatus comprising:

image pickup means for picking up an image of a pattern carried by the printing paper;

dividing means for dividing the pattern image obtained as a result of an image pickup operation of the image pickup means to define regions of a predetermined unit, extracting means for extracting each of the regions as pattern information and showing a predetermined profile as pattern information;

storage means for storing the pattern information extracted by the extraction means on the printing paper; and verification means for verifying validity of the printing paper according to the pattern information stored by the storage means.

11. The apparatus according to claim 10, wherein the extraction means extracts pattern information showing each of the regions as a circle.

12. The apparatus according to claim 10, wherein the extraction means extracts pattern information showing each of the regions with a profile that varies as a function of a size of the region.

13. A method, implemented by an unauthorized copying preventing apparatus, for preventing unauthorized copying of printed contents printed on printing paper, said method comprising:

a first step of picking up an image of a pattern carried by the printing paper;

a second step of dividing a pattern image obtained as a result of an image pickup operation into a low luminance component and a high luminance component and separating the low luminance component and high luminance component from each other;

a third step of dividing, by the unauthorized copying preventing apparatus, the pattern image to define a plurality of regions;

a fourth step of extracting, by the unauthorized copying preventing apparatus, the pattern information from the pattern image by extracting the pattern information from the low luminance component and the high luminance component separated from each other;

a fifth step of extracting each of the regions as pattern information and showing a predetermined profile as pattern information;

a sixth step of storing the extracted pattern information on the printing paper; and a seventh step of verifying validity of the printing paper according to the stored pattern information.

14. A non-transitory computer-readable medium storing computer readable instructions thereon that when executed by a control device cause the control device to perform a method comprising:

dividing a pattern image obtained as a result of an image pickup operation to define a plurality of regions;

extracting each of the regions as pattern information and showing a predetermined profile as pattern information;

storing the extracted pattern information on printing paper; and verifying validity of the printing paper according to the pattern information stored on the printing paper.

15. An apparatus for preventing unauthorized copying of printed contents printed on printing paper, said apparatus comprising:

image pickup means for picking up an image of a pattern carried by the printing paper, the image pickup means including shooting the pattern;

dividing means for dividing a pattern image, obtained as a result of the shooting of the pattern by the image pickup means, into a low luminance component and a high luminance component and separating the low luminance component and high luminance component from each other, and extraction means for extracting characteristics of the pattern image picked up by the image pickup means, the extraction means extracting the characteristics from the low luminance component and the high luminance component separated from each other;

storage means for storing the characteristics extracted by the extraction means on the printing paper; and verification means for reconfiguring the pattern image according to the characteristics stored by the storage means and verifying validity of the printing paper according to a reconfigured pattern image.

16. The apparatus according to claim 15, wherein the extraction means extracts pixels showing a predetermined luminance value, and the verification means reconfigures the pattern image by generating a plurality of regions in a predetermined luminance state by referring to the pixels.

17. The apparatus according to claim 16, wherein the extraction means extracts pixels showing a predetermined luminance value out of a low frequency component image of the pattern image.

18. The apparatus according to claim 16, wherein the verification means generates a plurality of small regions by dividing a region containing pixels by using Voronoi division and determines the luminance state of each of the small regions using the luminance values of the pixels.

19. The apparatus according to claim 16, wherein the verification means generates a plurality of regions using the pixels as reference points, and determines the luminance state of each of the regions using the luminance values of the reference points so as to make the luminance state between the reference points in neighboring regions mild.

20. A method, implemented by an unauthorized copying preventing apparatus, for preventing unauthorized copying of printed contents printed on printing paper, said method comprising:
- a first step of picking up an image of a pattern carried by the printing paper by shooting the pattern;
- a second step of dividing, by the unauthorized copying preventing apparatus, a pattern image, obtained as a result of the shooting of the pattern, into a low luminance component and a high luminance component and separating the low luminance component and high luminance component from each other, and
- a third step of extracting, by the unauthorized copying preventing apparatus, characteristics of the pattern image by extracting the characteristics from the low luminance component and the high luminance component separated from each other;
- a fourth step of storing the extracted characteristics on the printing paper; and
- a fifth step of reconfiguring the pattern image according to the stored characteristics and verifying validity of the printing paper according to a reconfigured pattern image.

21. The method according to claim 20, wherein
pixels showing a predetermined luminance value are extracted from the pattern image as the characteristics in the first step, and
the pattern image is reconfigured by generating a plurality of regions showing a predetermined luminance state using the pixels as reference in the fifth step.

22. The method according to claim 21, wherein the pixels showing a predetermined luminance value are extracted from a low frequency component image of the pattern image as the characteristics in the first step.

23. The method according to claim 21, wherein a plurality of small regions are generated by dividing the regions containing pixels by using Voronoi division and the luminance states of the small regions are determined by using the luminance values of the pixels in the fifth step.

24. The method according to claim 21, wherein a plurality of regions are generated by using the pixels as reference points and the luminance state of each of the regions is determined by using the luminance values of the reference points so as to make the luminance state between the reference points in neighboring regions mild in the fifth step.

25. A non-transitory computer-readable medium storing computer readable instructions thereon that when executed by a control device cause the control device to perform a method comprising:
- acquiring pattern information according to a pattern carried by printing paper carrying predetermined contents;
- shooting the pattern
- dividing a pattern image, obtained as a result of the shooting, into a low luminance component and a high luminance component and separating the low luminance component and high luminance component from each other; and
- extracting characteristics of the pattern image by extracting the pattern information from the low luminance component and the high luminance component separated from each other;
- storing the extracted characteristics on the printing paper; and
- reconfiguring the pattern image according to the stored characteristics; and
- verifying validity of the printing paper according to the reconfigured pattern image.

26. An apparatus for preventing unauthorized copying of printed contents printed on printing paper, said apparatus comprising:
- an acquisition unit configured to acquire pattern information according to a pattern carried by the printing paper, the acquisition unit including
  - an image pickup unit configured to shoot the pattern,
  - a dividing unit configured to divide a pattern image into a low luminance component and a high luminance component and separate the low luminance component and high luminance component from each other
  - an extraction unit configured to extract the pattern information from a pattern image obtained as a result of the shooting by the image pickup unit, the extraction unit extracting the pattern information from the low luminance component and the high luminance component separated from each other;
- a storage unit configured to store the pattern information acquired by the acquisition unit on the printing paper; and
- a verification unit configured to verify validity of the printing paper according to the pattern information stored by the storage unit.

\* \* \* \* \*